(12) United States Patent
Kolcun et al.

(10) Patent No.: US 10,570,617 B2
(45) Date of Patent: Feb. 25, 2020

(54) ACOUSTIC STRUCTURAL BUILDING PANELS

(71) Applicant: TRI BMS, LLC, Spring City, PA (US)

(72) Inventors: John Michael Kolcun, Collegeville, PA (US); James John Kolcun, Collegeville, PA (US); Eric Anthony Kukoda, Lincoln University, PA (US); Arthur Balzereit, Collegeville, PA (US)

(73) Assignee: TRI BMS, LLC, Spring City, PA (US)

( * ) Notice: Subject to any disclaimer, the term of this patent is extended or adjusted under 35 U.S.C. 154(b) by 0 days.

(21) Appl. No.: 15/974,391

(22) Filed: May 8, 2018

(65) Prior Publication Data

US 2018/0328036 A1 Nov. 15, 2018

Related U.S. Application Data

(60) Provisional application No. 62/503,541, filed on May 9, 2017.

(51) Int. Cl.
| | | |
|---|---|---|
| *E04C 1/00* | (2006.01) |
| *E04C 2/292* | (2006.01) |
| *E04C 2/296* | (2006.01) |
| *E04B 1/86* | (2006.01) |
| *E04B 1/14* | (2006.01) |
| *E06B 3/70* | (2006.01) |
| *B32B 3/06* | (2006.01) |
| *B32B 5/18* | (2006.01) |
| *B32B 3/26* | (2006.01) |
| *E04C 2/00* | (2006.01) |

(52) U.S. Cl.
CPC ............... *E04C 2/292* (2013.01); *B32B 3/06* (2013.01); *B32B 3/266* (2013.01); *B32B 5/18* (2013.01); *E04B 1/14* (2013.01); *E04B 1/86* (2013.01); *E04C 2/296* (2013.01); *E06B 3/7015* (2013.01); *B32B 2266/0278* (2013.01); *B32B 2307/102* (2013.01); *B32B 2607/00* (2013.01); *E04C 2002/004* (2013.01); *E06B 2003/7023* (2013.01)

(58) Field of Classification Search
None
See application file for complete search history.

(56) References Cited

U.S. PATENT DOCUMENTS

| | | | |
|---|---|---|---|
| 1,295,368 A | 2/1919 | Pilkington | |
| 2,671,522 A | 3/1954 | Bourgeois | |
| 3,140,564 A | 7/1964 | Chanpman | |
| 3,214,565 A * | 10/1965 | Hager, Jr. | ............ F24D 13/022 181/295 |

(Continued)

*Primary Examiner* — Basil S Katcheves
(74) *Attorney, Agent, or Firm* — The Belles Group, P.C.

(57) ABSTRACT

Described herein is an acoustic structural panel having a first exposed major surface opposite a second exposed major surface and side surfaces extending between the first and second exposed major surfaces, the acoustic structural panel comprising a first protective layer comprising at least a portion of the first exposed major surface, a second protective layer comprising at least a portion of the second exposed surface, a core structure located between the first and second protective layers, the core structure comprising, a foam body; and a fibrous body, wherein the first major exposed surface of the acoustic structural panel comprises a plurality of apertures exposing the fibrous body.

20 Claims, 48 Drawing Sheets

(56) References Cited

U.S. PATENT DOCUMENTS

| | | | |
|---|---|---|---|
| 3,481,427 A | 12/1969 | Dobbs et al. | |
| 3,934,382 A | 1/1976 | Gartung | |
| 3,963,094 A | 6/1976 | Nowikas | |
| 4,090,335 A | 5/1978 | Curatolo | |
| 4,110,876 A * | 9/1978 | Weiss | D02G 1/161 |
| | | | 181/200 |
| 4,272,934 A | 6/1981 | Cowden et al. | |
| 4,391,073 A | 7/1983 | Mollenkopf et al. | |
| 4,423,574 A | 1/1984 | Pierre | |
| 4,491,362 A * | 1/1985 | Kennedy | B62D 29/046 |
| | | | 296/181.2 |
| 4,702,046 A | 10/1987 | Haugen et al. | |
| 4,785,598 A | 11/1988 | Stronach | |
| 5,424,118 A * | 6/1995 | McLaughlin | E04B 1/6183 |
| | | | 428/314.8 |
| 5,503,903 A * | 4/1996 | Bainbridge | B29C 43/203 |
| | | | 428/182 |
| 5,536,556 A * | 7/1996 | Juriga | B29C 43/203 |
| | | | 181/284 |
| 5,579,622 A | 12/1996 | DeVon et al. | |
| 5,644,872 A * | 7/1997 | Perdue | E04B 1/86 |
| | | | 181/284 |
| 6,698,543 B2 | 3/2004 | Golterman | |
| 7,063,184 B1 * | 6/2006 | Johnson | E04B 1/86 |
| | | | 181/210 |
| 7,178,630 B1 * | 2/2007 | Perdue | E04B 1/8209 |
| | | | 181/290 |
| 7,513,082 B2 * | 4/2009 | Johnson | E04B 2/7412 |
| | | | 52/144 |
| 8,857,565 B2 * | 10/2014 | Harrison | B44C 3/025 |
| | | | 156/285 |
| 9,091,060 B2 * | 7/2015 | Kuras | E04B 1/84 |
| 9,121,175 B2 * | 9/2015 | Fushiki | B32B 5/18 |
| 2011/0223372 A1 | 9/2011 | Metz | B32B 1/00 |
| | | | 428/80 |
| 2012/0152468 A1 | 6/2012 | Melhar | |
| 2013/0067842 A1 * | 3/2013 | Meersseman | B32B 7/12 |
| | | | 52/309.4 |
| 2014/0230336 A1 * | 8/2014 | Flener | B60J 5/0412 |
| | | | 49/472 |
| 2017/0218635 A1 * | 8/2017 | O'Leary | B32B 13/02 |
| 2019/0025015 A1 * | 1/2019 | Davis | F41H 5/04 |

* cited by examiner

ACOUSTIC STRUCTURAL BUILDING PANELS

CROSS-REFERENCE TO RELATED APPLICATIONS

This application claims the benefit of U.S. Provisional Application No. 62/503,541, filed on May 9, 2017. The disclosure of the above application is incorporated herein by reference.

BRIEF SUMMARY

According to some embodiments, the present invention an acoustic structural panel having a first exposed major surface opposite a second exposed major surface and side surfaces extending between the first and second exposed major surfaces, the acoustic structural panel comprising a first protective layer comprising at least a portion of the first exposed major surface; a second protective layer comprising at least a portion of the second exposed surface; a core structure located between the first and second protective layers, the core structure comprising a foam body; and a fibrous body; wherein the first major exposed surface of the acoustic structural panel comprises a plurality of apertures exposing the fibrous body.

In other embodiments, the present invention is directed to an acoustic structural panel having a first exposed major surface opposite a second exposed major surface and side surfaces extending between the first and second exposed major surfaces, the acoustic structural panel comprising: a first protective layer comprising at least a portion of the first exposed major surface; a second protective layer comprising at least a portion of the second exposed surface; a core structure located between the first and second protective layers, the core structure comprising a first body having a first major surface opposite a second major surface, whereby the first body does not allow for airflow between the first and second major surfaces of the first body under normal atmospheric conditions; and a second body having a first major surface opposite a second major surface, whereby the second body allows for airflow between the first and second major surfaces of the second body under normal atmospheric conditions; wherein the first major exposed surface of the acoustic structural panel comprises a plurality of apertures adjacent to the second body.

In other embodiments, an acoustic structure system comprising a first acoustic structural panel and a second acoustic structural panel, each of the first and second acoustic structural panels having a first exposed major surface opposite a second exposed major surface and side surfaces extending between the first and second exposed major surfaces, and each of the acoustic structural panels comprising: a first protective layer comprising a plurality of apertures; a second protective layer; and a core structure comprising a foam body and a fibrous body, the core structure located between the first and second protective layers; wherein the side surfaces of the first acoustic structural panel comprise a first side surface having a first interlocking profile and the side surfaces of the second acoustic structural panel comprise a second side surface having a second interlocking profile, wherein the first interlocking profile is complimentary to the second interlocking profile; and wherein the first acoustic structural panel and the second acoustic structural panel are joined together by the first interlocking profile engaging the second interlocking profile.

According to other embodiments, the present invention a method of installing an acoustic structure system comprising a) providing a first acoustic structural panel and a second acoustic structural panel, each of the first and second acoustic structural panels having a first exposed major surface opposite a second exposed major surface and side surfaces extending between the first and second exposed major surfaces, and each of the acoustic structural panels comprising: a first protective layer comprising a plurality of apertures; a second protective layer; and a core structure comprising a foam body and a fibrous body, the core structure located between the first and second protective layers; wherein the side surfaces of the first acoustic structural panel comprise a first side surface having a first interlocking profile and the side surfaces of the second acoustic structural panel comprise a second side surface having a second interlocking profile, wherein the first interlocking profile is complimentary to the second interlocking profile; and b) positioning the first acoustic structural panel adjacent to the second acoustic structural panel such that the first protective layer of the first acoustic structural panel and the first protective layer of the second acoustic structural panel fact the same direction; c) mating the first interlocking profile of the first acoustic structural panel with the second interlocking profile of the second acoustic structural panel.

Other embodiments of the present invention include an acoustic structure comprising an acoustic enclosure formed from a plurality of acoustic structural panels each having a first exposed major surface opposite a second exposed major surface and side surfaces extending between the first and second exposed major surfaces, each of the acoustic structural panels further comprising: a first protective layer comprising at least a portion of the first exposed major surface, a second protective layer comprising at least a portion of the second exposed surface, a core structure located between the first and second protective layers, the core structure comprising: a foam body; and a fibrous body; wherein the first major exposed surface of the acoustic structural panel comprises a plurality of apertures exposing the fibrous body; wherein the plurality of acoustic structural panels are coupled together to form at least a portion of the acoustic enclosure, the acoustic enclosure surrounding a cavity and the first exposed major surfaces of each acoustic structural panel facing the cavity.

In other embodiments, the present invention includes an acoustic wall comprising a first support a second support a plurality of acoustic structural panels positioned between the first and second supports, each of the acoustic structural panels having a first exposed major surface opposite a second exposed major surface and side surfaces extending between the first and second exposed major surfaces, the acoustic structural panel comprising: a first protective layer comprising at least a portion of the first exposed major surface; a second protective layer comprising at least a portion of the second exposed surface; a core structure located between the first and second protective layers, the core structure comprising: a foam body; and a fibrous body; wherein the first major exposed surface of the acoustic structural panel comprises a plurality of apertures exposing the fibrous body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
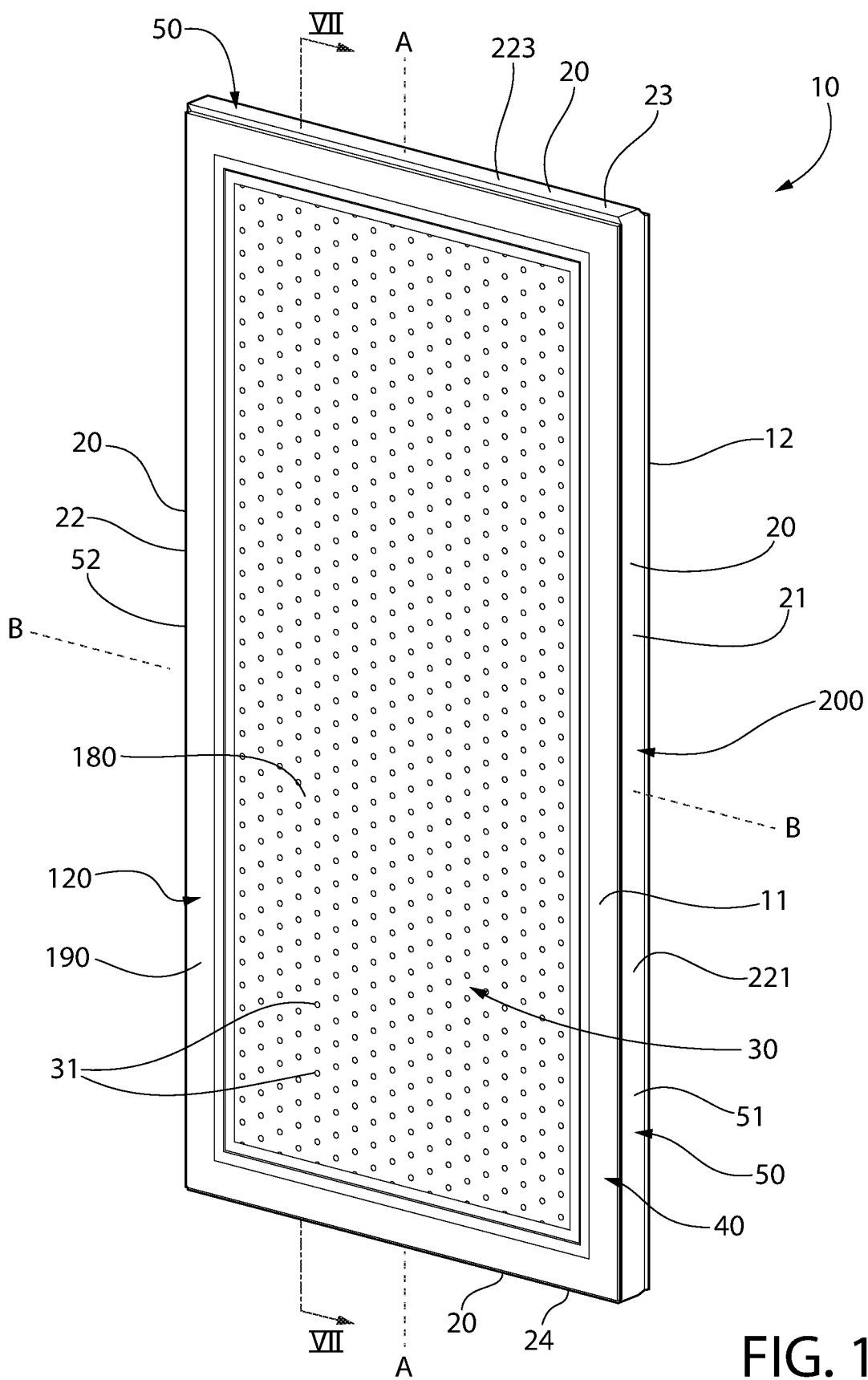
FIG. 1 is a front perspective view of an acoustic structural panel according to the present invention.
Figure 2:
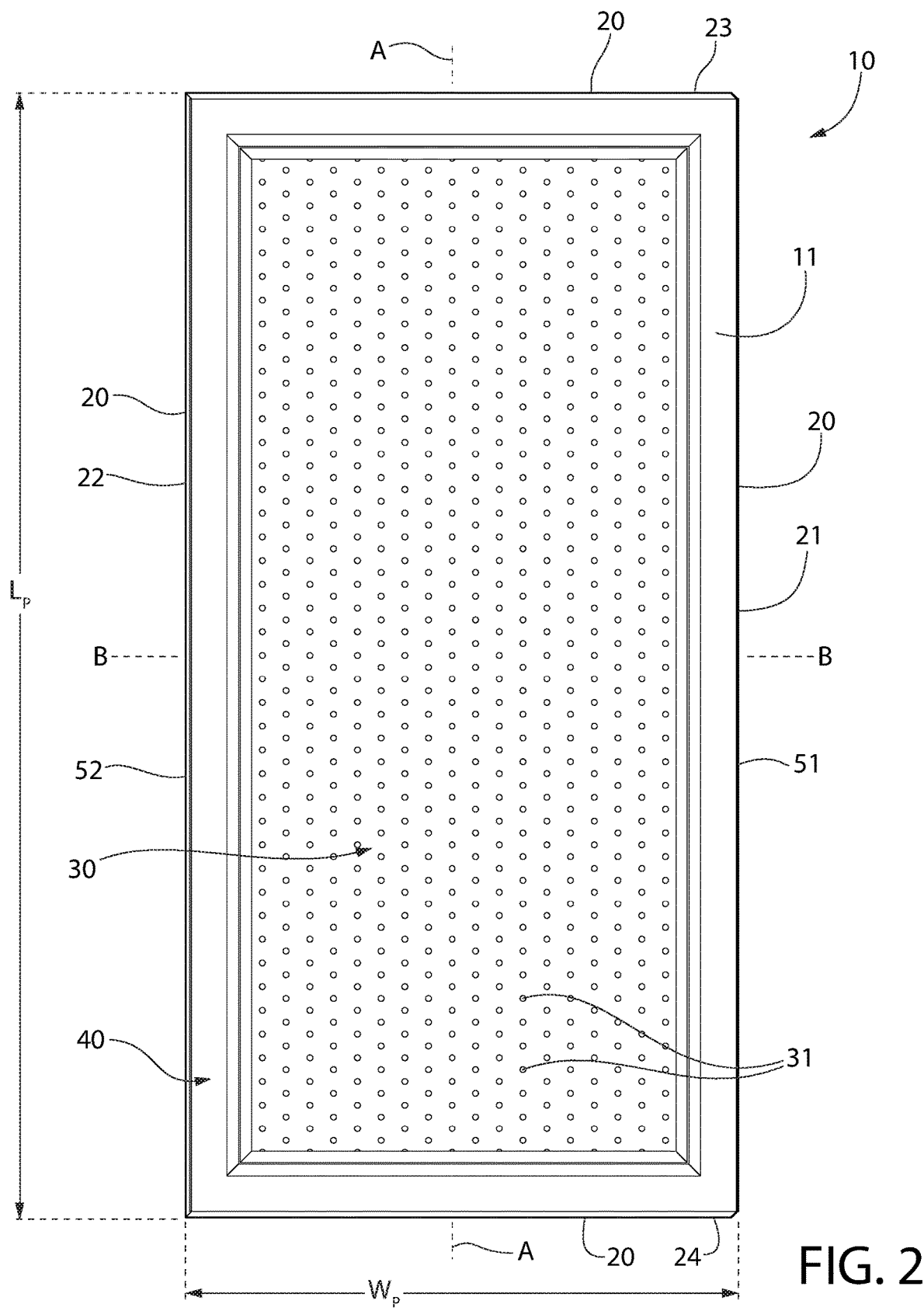
FIG. 2 is a front view of the acoustic structural panel according to the present invention.
Figure 3:
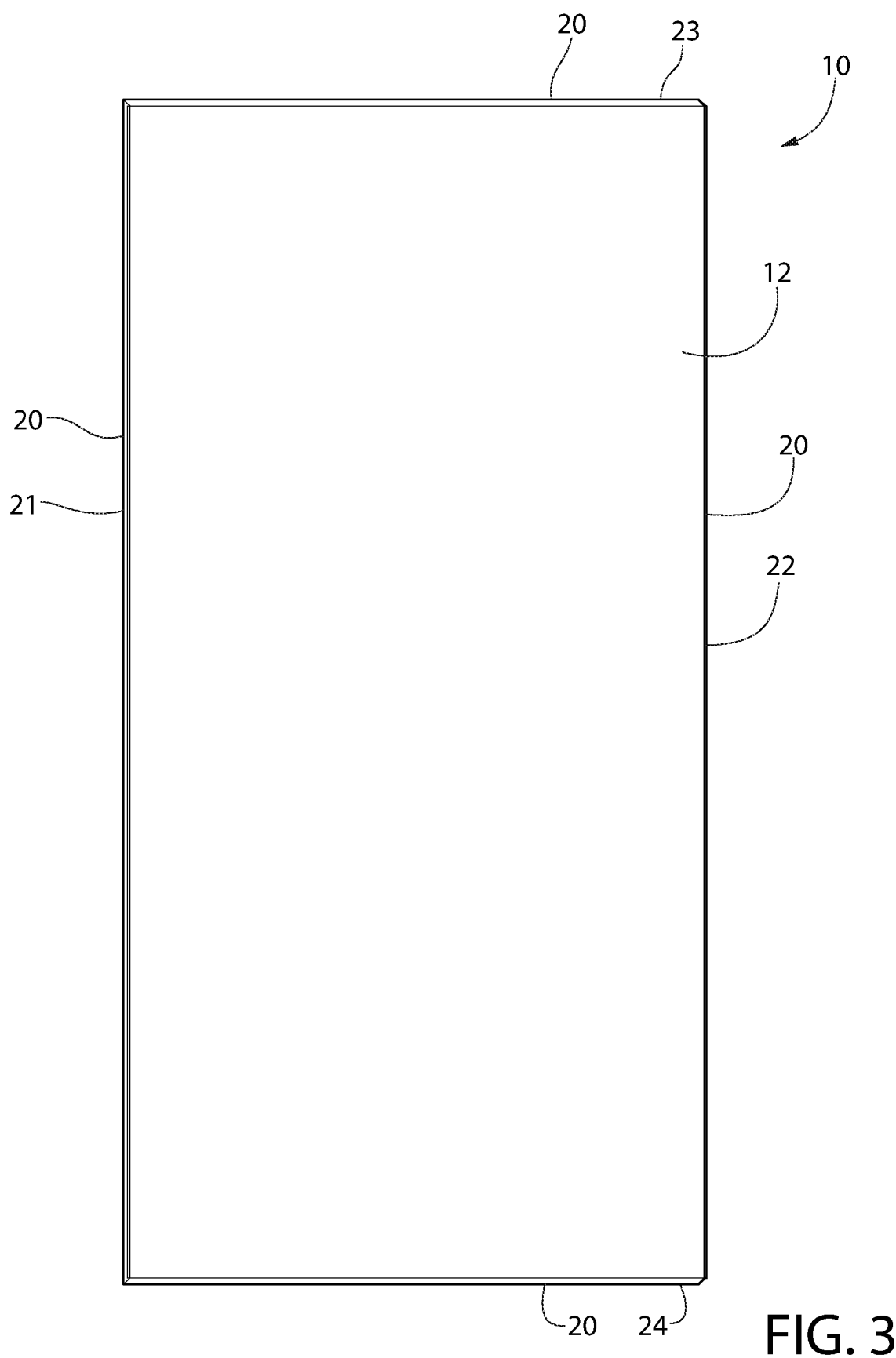
FIG. 3 is a rear view of the acoustic structural panel according to the present invention.
Figure 4:
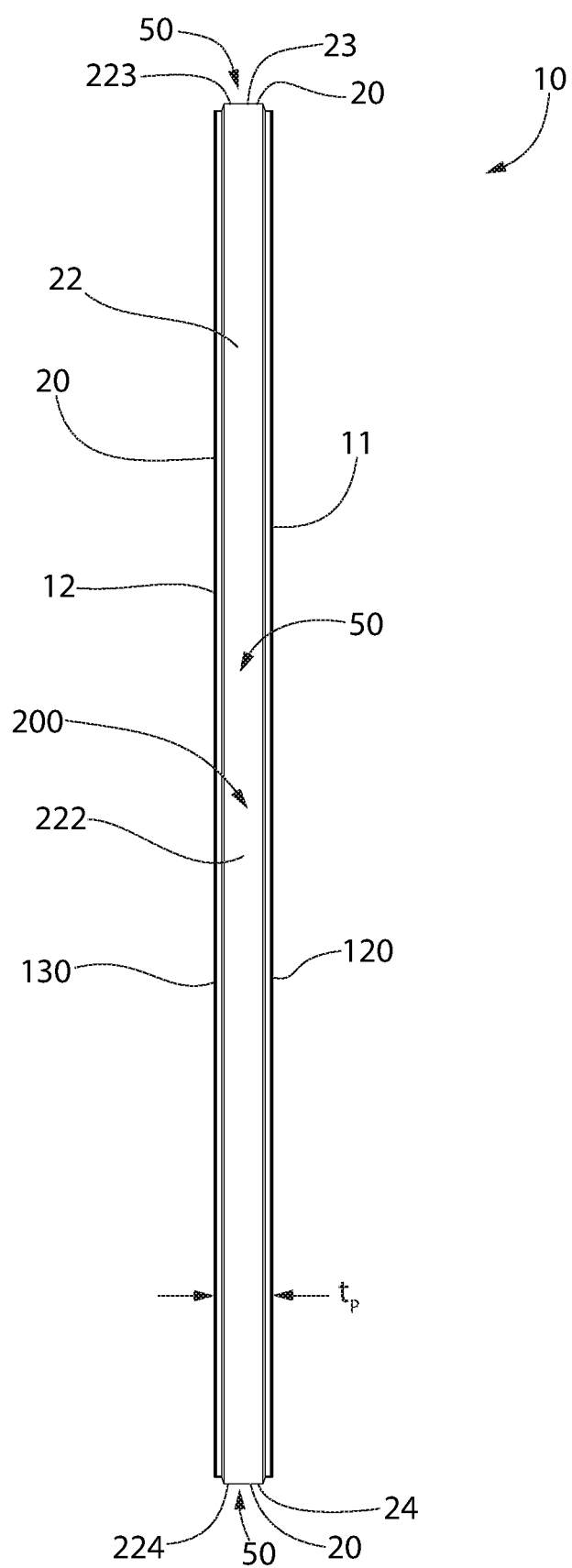
FIG. 4 is a side view of the acoustic structural panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Referring to FIGS. 1-5, the present invention is directed to an acoustic structural panel 10 (also referred to as "building panel") that exhibits both acoustical performance and structural properties that allow it to serve a dual purpose as a sound attenuating panel as well as structural element in a building structure—as discussed further herein.

The building panel 10 of the present invention may comprise a first exposed major surface 11 opposite a second exposed major surface 12 and a side surface 20 extending there-between. The side surface 20 may comprise a first side surface 21 opposite a second side surface 22 and a third side surface 23 opposite a fourth side surface 24. The first and second side surfaces 21, 22 may be substantially parallel to each other. According to the present invention, the term "substantially parallel" refers to an angle that is 0°±2° as measured between the two referenced surfaces. The third and fourth side surfaces 23, 24 may be parallel to each other.

The first side and second side surfaces 21, 22 may each independently intersect both the third and fourth side surface 23, 24. The third and fourth side surfaces 23, 24 may each independently intersect both the first and second side surface 21, 22. The third and fourth side surfaces 23, 24 may extend at an angle that is substantially perpendicular to the first and second side surface 21, 22. According to the present invention, the phrase "substantially perpendicular" refers to an angle that is 90°±2° as measured between the two referenced surfaces. The phrase "substantially orthogonal" may be used in place of "substantially perpendicular."

The building panel may extend longitudinally along a longitudinal axis A-A that intersects the third and fourth side edges 23, 24. The building panel may extend laterally along a lateral axis B-B that intersects the first and second side edges 21, 22.

As discussed further herein, the building panel 10 may be vertically oriented such that the longitudinal axis A-A of the building panel 10 extends normal to a ground surface. In such vertical orientation, the first side surface 21 may be a first vertical side surface 21 and the second side surface 22 being a second vertical side surface. In such embodiments, the third side surface 23 may be an upper side surface 23 and the fourth side surface 24 may be a lower side surface.

As discussed further herein, the building panel 10 may be vertically oriented such that the lateral axis B-B of the building panel 10 extends normal to a ground surface. In such horizontal orientation, the first side surface 21 may be a lower side surface 21 and the second side surface 22 being an upper side surface. In such embodiments, the third side surface 23 may be a first vertical side surface 23 and the fourth side surface 24 may be a second vertical side surface.

The building panel 10 may have a panel width $W_P$ as measured by the distance between the first and second side surfaces 21, 22 in a direction that is substantially perpendicular to the longitudinal axis A-A. The panel width $W_P$ may range from about 10 inches to about 50 inches—including all distances and sub-ranges there-between. The building panel 10 may have a panel length $L_P$ as measured by the distance between the third and fourth side surfaces 23, 24 in a direction that is substantially parallel to the longitudinal axis A-A. The panel length $L_P$ may range from about 4 feet to about 24 feet—including all distances and sub-ranges there-between. In a preferred embodiment, the panel length $L_P$ may range from about 8 feet to about 14 feet—including all distances and sub-ranges there-between.

A ratio of the panel length $L_P$ to panel width $W_P$ may range from about 1.8:1.0 to about 17.0:1.0-including all ratios and sub-ranges there-between. In a preferred embodiment, the ratio of the panel length $L_P$ to panel width $W_P$ may range from about 1.8:1.0 to about 4.0:1.0—including all ratios and sub-ranges there-between.

The building panel 10 may have a panel thickness $t_P$ as measured by the distance between the first exposed major surface 11 and the second exposed major surface 12. The panel thickness $t_P$ may range from about 2 inches to about 7 inches—including all distances and sub-ranges there-between. In a preferred embodiment, the panel thickness $t_P$ may range from about 2 inches to about 5 inches—including all distances and sub-ranges there-between.

A ratio of the panel length $L_P$ to panel thickness $t_P$ may range from about 72.0:1.0 to about 12.0:1.0-including all ratios and sub-ranges there-between. In a preferred embodiment, the ratio of the panel length $L_P$ to panel width $W_P$ may range from about 42.0:1.0 to about 20.0:1.0-including all ratios and sub-ranges there-between. A ratio of the panel width $W_P$ to panel thickness $t_P$ may range from about 36.0:1.0 to about 6.0:1.0-including all ratios and sub-ranges there-between. In a preferred embodiment, the ratio of the panel length $L_P$ to panel width $W_P$ may range from about 22.0:1.0 to about 10.0:1.0-including all ratios and sub-ranges there-between. In a preferred embodiment, a ratio of the panel length $L_P$ to panel width $W_P$ to panel thickness $t_P$ may range from about 48.0:23.0:1 to about 24.0:12.0:1.0-including all ratios and sub-ranges there-between.

The first exposed major surface 11 may have a first surface area as measured by the area that occupies the space between the side surfaces 20 on the first exposed major surface 11. The first exposed major surface 11 may comprise a vented portion 30 comprising a plurality of vent apertures 31 (also referred to as "holes" or "ports")—as described further herein. The vented portion 30 is perforated, thereby forming a discontinuous surface portion of the first exposed major surface 11, wherein the discontinuous nature is the result of the present of the plurality of vent apertures 31.

The first exposed major surface 11 may also comprise a perimeter portion 40 that at least partially circumscribed the vented portion 30 on the first major surface. The perimeter portion 40 may be continuous. The term "continuous" refers a surface being non-perforated and substantially free of open apertures. A surface may be continuous and comprise one or more apertures so long as such apertures are masked or occupied—for example, an aperture containing a fastener or connection hardware therein, as discussed in greater detail herein.

The vented portion 30 may be about 30% to about 99% of the first surface area of the first exposed major surface 11—including all percentages and sub-ranges there-between. The perimeter portion 40 may be about 1% to about 70% of the first surface area of the first exposed major surface 11—including all percentages and sub-ranges there-between.

Figure 5:
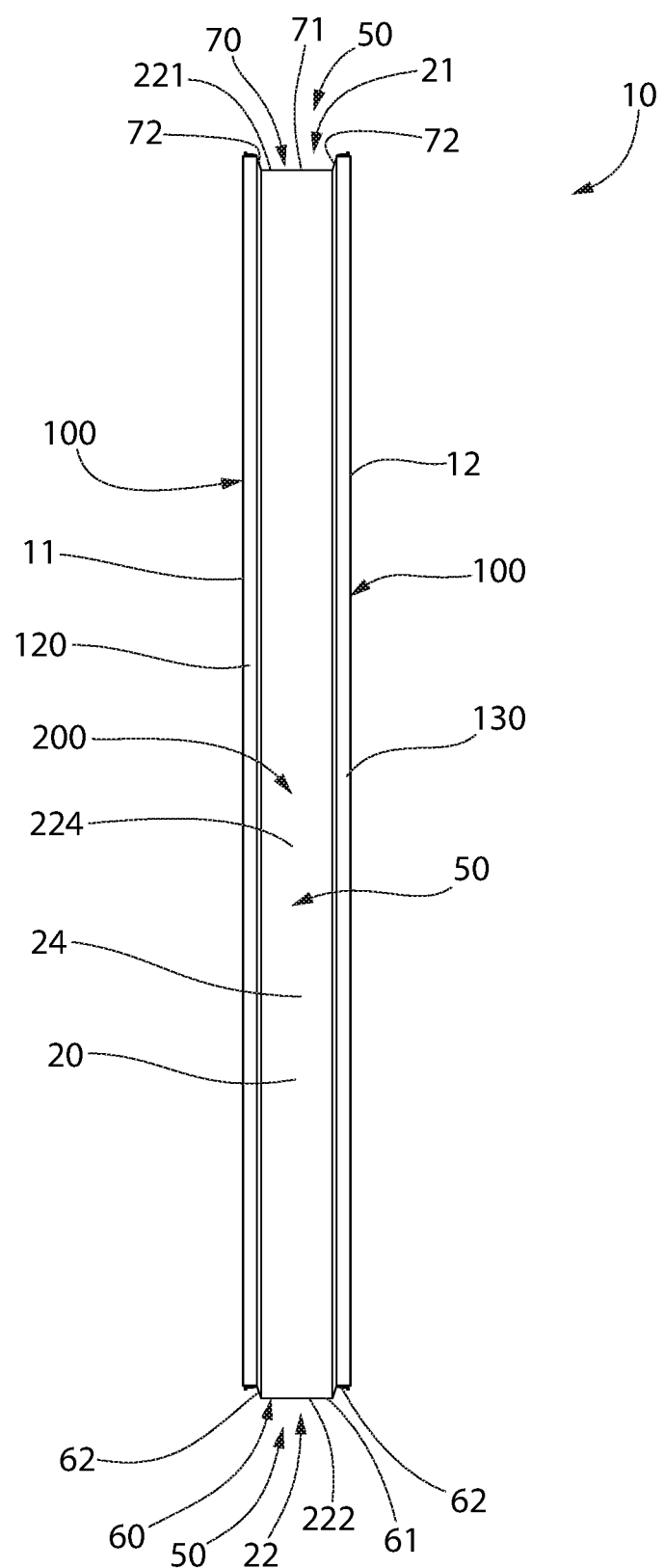
FIG. 5 is a side view of the acoustic structural panel according to the present invention.
Figure 6:
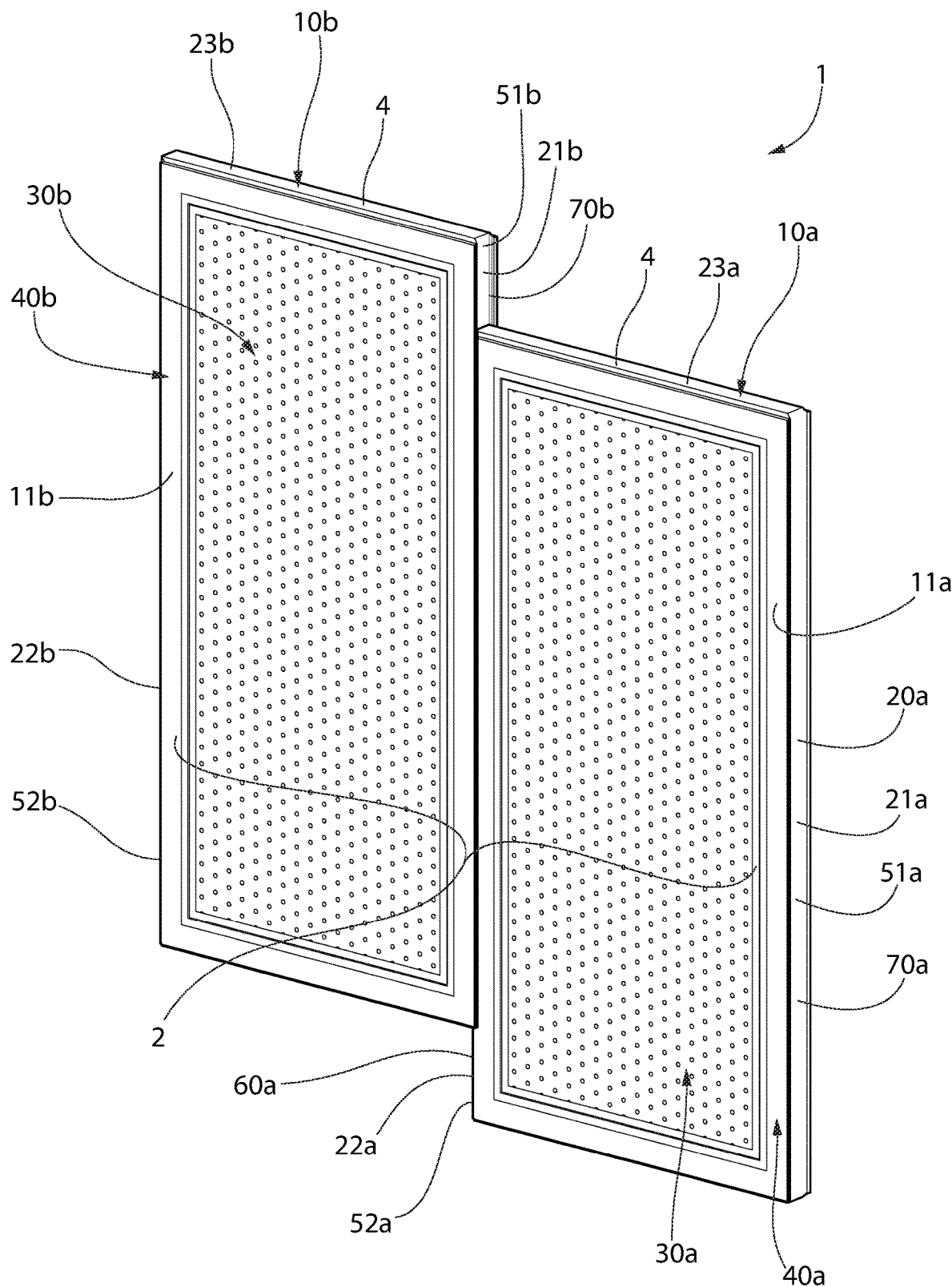
FIG. 6 is a front perspective view of an acoustic structure system according to the present invention.
Figure 6A:
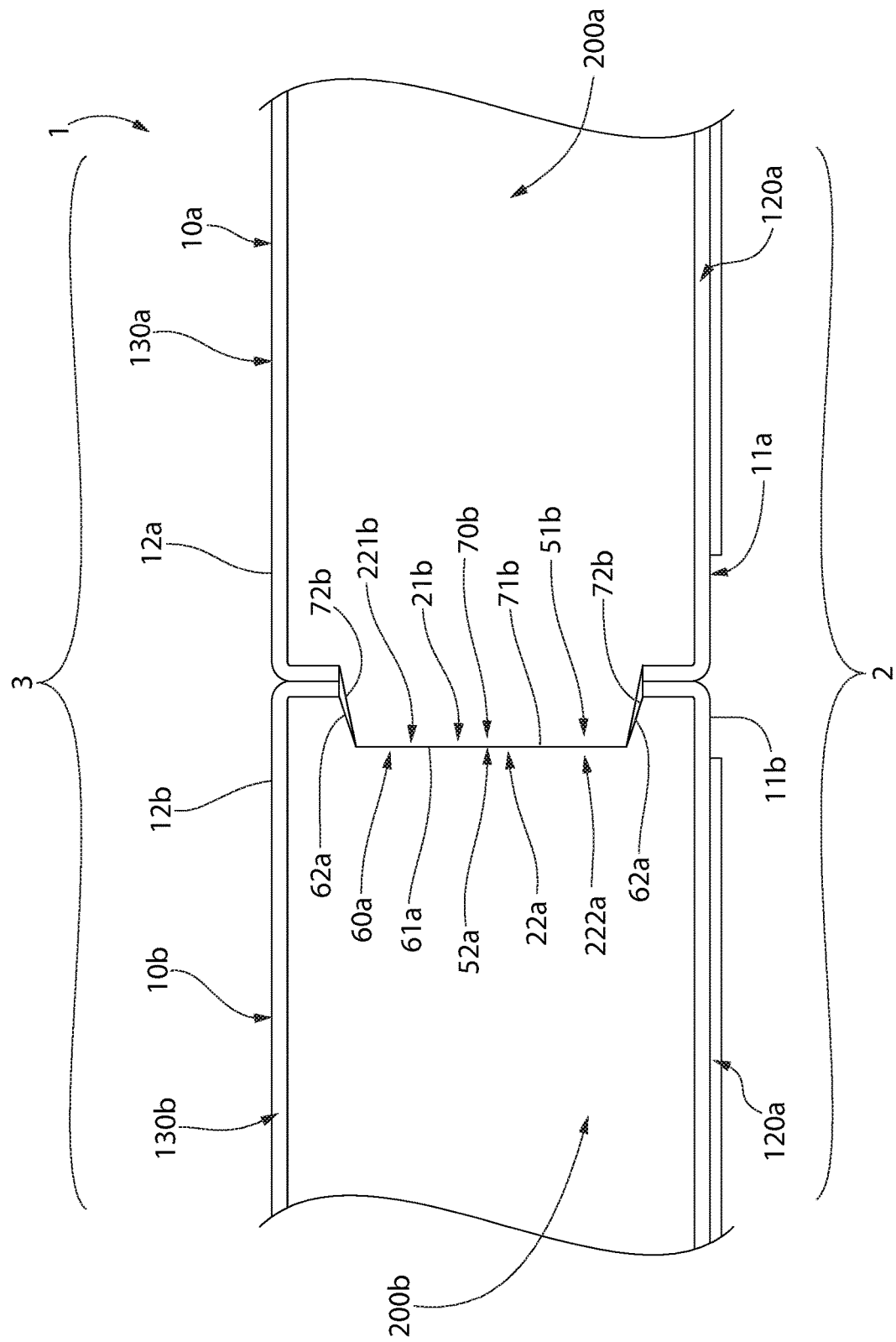
FIG. 6A is a close-up side view of the acoustic structure system shown in FIG. 6.

The building panels 10 may comprise one or more interlocking profiles 50. Referring now to FIGS. 5, 6 and 6A, the side surfaces 20 may comprise an interlocking profile 50 (also referred to herein as an "interlocking geometry"). The term "interlocking profile" refers to surface geometry forming complimentary shapes that facilitate the coupling together a plurality of the building panels 10 to form an acoustic structural panel system 1 (also referred to herein as a "panel system" 1).

Non-limiting examples of interlocking profiles 50 include tongue and groove, shiplap, dovetail, mortise and tenon, butt joint, and the like. Each building panel 10 may comprise the interlocking profile 50 on the first exposed major surface 11, the side surface 20, as well as combinations thereof so that an array and/or combination of building panels 10 can be positioned adjacent to each other to form a continuous wall or housing—as discussed in greater detail herein.

Referring now to FIG. 5, for a single acoustic panel 10, the first side surface 21 may comprise a first interlocking profile 51 and the second side surface 22 may comprise a second interlocking profile 52, whereby the first and second interlocking profiles 51, 52 complement each other. In a non-limiting example, the first interlocking profile 51 of the first side surface 21 may comprise a groove 70 and the second interlocking profile 52 of the second side surface 22 may comprise a tongue 60 that is complimentary in shape to the groove 70 of the first interlocking profile.

The groove 70 may comprise a groove floor 71 and groove walls 72. The groove floor 71 may be inset on the first side surface 21. The tongue 60 may be a flange having a flange face 61 located between flange walls 62. The flange face 61 may protrude outward on the second side surface 22.

Referring now to FIGS. 6 and 6A, the panel system 1 of the present invention may comprise a plurality of building panels 10. Specifically, the system 1 may comprise at least a first building panel 10a and a second building panel 10. The first and second building panels 10a, 10b are like the previously discussed the building panel 10, and the description of the building panel 10 above generally applies to the first and second building panels 10a, 10b described below except that a letter suffix of a, b, c, d . . . etc., will be used to differentiate each individual of the plurality of building panels.

In a non-limiting example, the first and second building panels 10a, 10b may each have a first interlocking profile 51a, 51b on the first side surface 21a, 21b that comprises a groove 70a, 70b and a second interlocking profile 52a, 52b on the second side surface 22a, 22b that comprises a tongue 60a, 60b that is complimentary in shape to the groove 70a, 70b of the first interlocking profile 51a, 51b. Under this configuration a first and second building panels 10a, 10b may be positioned adjacent to each other such that the groove 70b of the first interlocking profile 51b of the first side surface 21b of the second building panel 10b mates with the tongue 70a of the second interlocking profile 52a of the second side surface 22a of the first building panel 10a, to create a continuous acoustic structural wall.

The panel system 1 may comprise the first side surface 21a of the first building panel 10a at least partially abutting and making direct contact with the second side surface 22b of the second building panel 10b. Under such configuration, the groove floor 71a of the first building panel 10a may mate with and contact the flange face 61b of the second building panel 10b. Under such configuration, the groove walls 72a of the first building panel 10a may also mate with and contact the flange walls 62b of the second building panel 10b.

Once mated together, the first exposed major surface 11a of the first building panel 10a and the first exposed major surface 11b of the second building panel 10b may combine to make a front major surface 2 of the panel system 1. Similarly, the second exposed major surface 12a of the first building panel 10a and the second exposed major surface 12b of the second building panel 10b may combine to make a rear major surface 3 of the panel system 1. At least a portion of the side surface 20 of the first building panel 10a and the side surface 20 of the second building panel 10b may combine to make a perimeter edge 4 of the panel system 1.

Each of the side surfaces 20 of the building panel 10 may further comprise a gasket that form a seal between adjacent building panels. The gasket may be formed from a polymeric material. Non-limiting examples of polymeric material include PVC, polytetrafluorothylene ("PTFE"), rubber, thermoplastic elastomer ("TPE"). For adjacent building panels 10 positioned adjacent to each other, the gasket present on the side surface 20 may help forma moisture and/or air-tight seal there-between.

According to the present invention, the building panel 10 of the present invention is self-support and exhibit strength sufficient for a self-supporting structure to be formed from only one or more of the building panels 10 used in combination. As discussed further herein, the building panel 10 may exhibit sufficient strength for a self-supporting structure to be formed, whereby the first exposed major surface 11 of the building panel 10 forms the interior surface of an enclosure and the second exposed major surface 12 of the building panel 10 forms the exterior surface of the enclosure.

Figure 7:
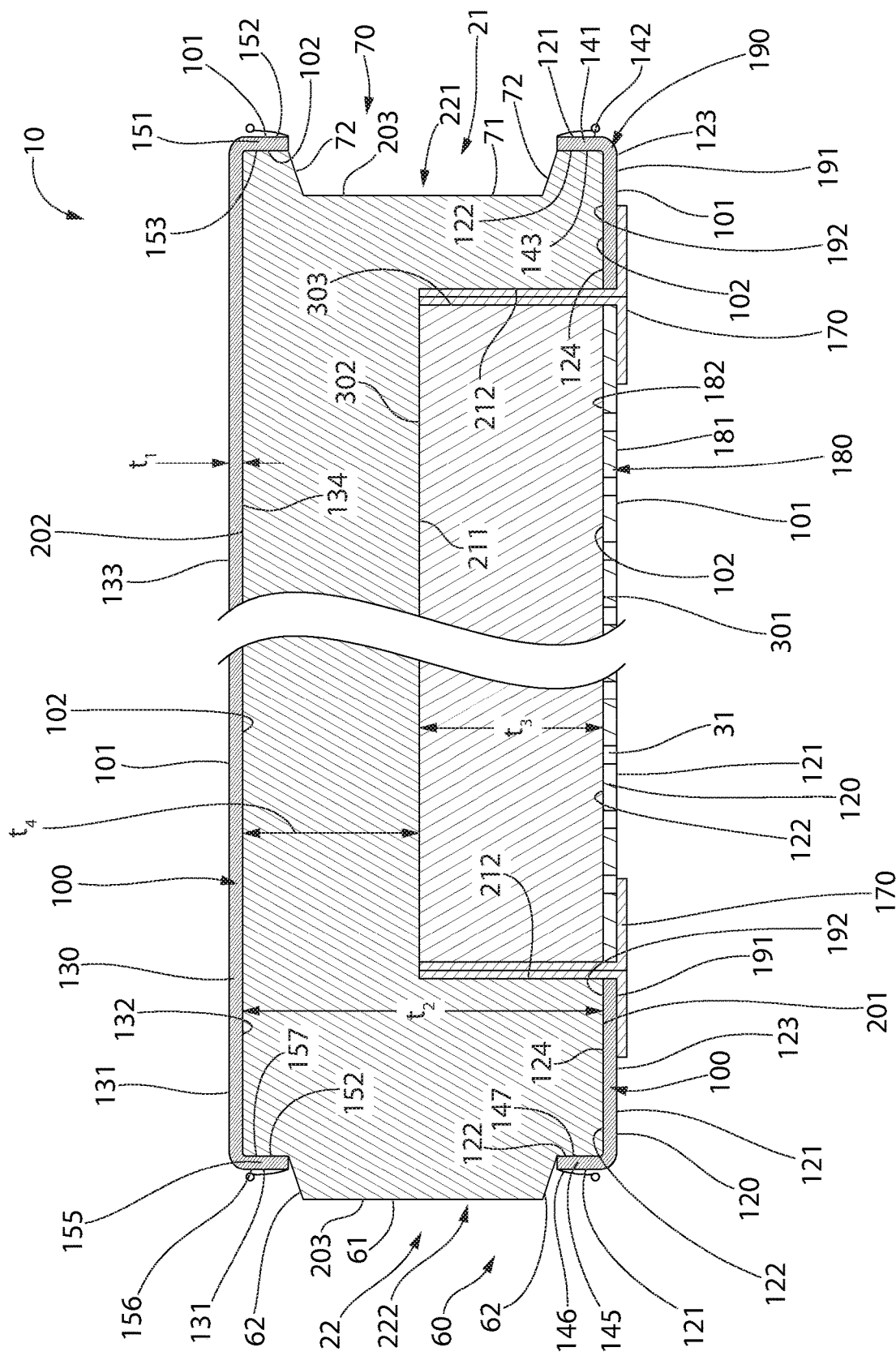
FIG. 7 is a cross-sectional view of the acoustic structural panel along line VII-VII as set forth in FIG. 1.
Figure 8:
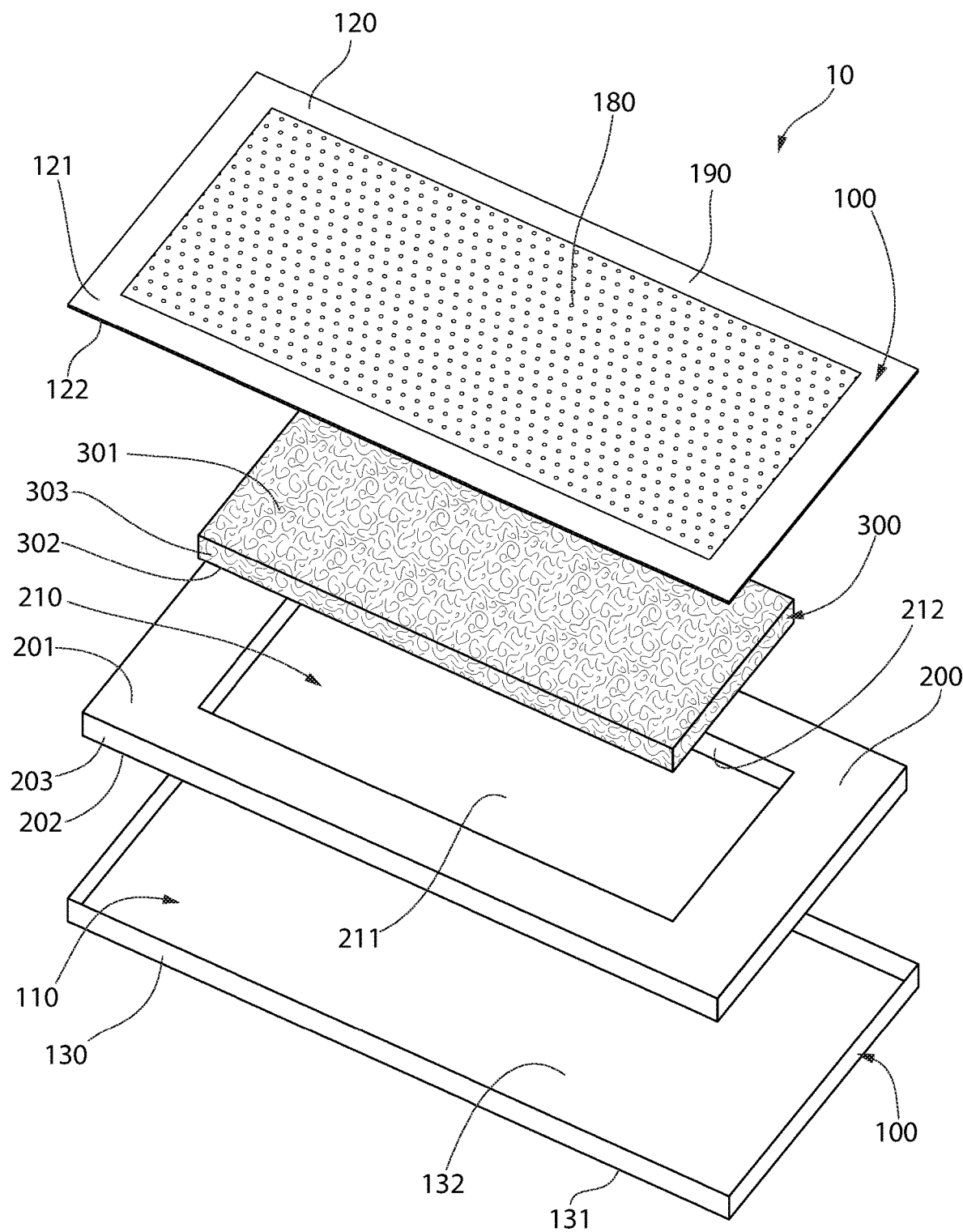
FIG. 8 is an exploded view of the acoustic structural panel according to the present invention.

Referring now to FIGS. 7 and 8, the building panel 10 of the present invention may be formed from a combination of materials that, together, provide the sound attenuation and structural integrity that allow the building panel 10 to function as the acoustic and structural panel. Specifically, the building panel 10 may be formed from a shell 100 and a core structure, the core structure formed from a foam layer 200, and a fibrous layer 300.

The shell 100 may comprise a chamber 110 formed by a first protective layer 120, a second protective layer 130.

Each of the first protective layer 120 and second major layer 130 may be formed from a metal, ceramic, composite material (e.g., polymer and ceramic), or other inorganic materials such as fiberglass, and combinations thereof. In a non-limiting embodiment, the metal may be steel, stainless steel, aluminum, aluminum-zinc alloy (also referred to as "galvalume"), aluminum-zinc alloy coated sheet steel metal, galvanized tin, and combinations thereof. In some embodiments, the shell 100 may further comprise and anti-microbial coating.

The shell 100 may comprise an outer surface 101 opposite an inner surface 102. The shell 100 may have a shell thickness $t_1$ as measured by the distance between the outer surface 101 and the inner surface 102. The shell thickness $t_1$ may range from about 15 mils to about 150 mils—including all distances and sub-ranges there-between.

The first protective layer 120 may have an outer surface opposite an inner surface 122. The first protective layer 120 may have a thickness as measured between the outer and inner surfaces 121, 122 that is substantially equal to the shell thickness $t_1$. The first protective layer 120 may comprise a first major surface 123 opposite a second major surface 124. The first major surface 123 of the first protective layer 120 may form at least a portion of the outer surface 121 of the first protective layer 120. The second major surface 124 of the first protective layer 120 may form at least a portion of the inner surface 122 of the first protective layer 120. The first major surface 123 of the first protective layer 120 may form at least a portion of the first exposed major surface 11 of the building panel 10. The outer surface 121 of the first protective layer 120 may form at least a portion of the first exposed major surface 11 of the building panel 10.

The first protective layer 120 may comprise a first lip 141 that is opposite a second lip 145 across the longitudinal axis A-A. The first lip 141 of the first protective layer 120 may be located toward a first edge of the first protective layer 120 proximate to the first side surface 21 of the building panel 10, and the second lip 145 of the first protective layer 120 may be located toward a second edge of the first protective layer 120 proximate to the second side surface 22 of the building panel 10.

The first lip 141 of the first protective layer 120 may extend from the second major surface 124 of the first protective layer 120 in a direction toward the second protective layer 130. Specifically, the first lip 141 of the first protective layer 120 may extend substantially perpendicular to the second major surface 124 of the first protective layer 120, whereby a plane extending along the longitudinal axis A-A and the lateral axis B-B intersects both the first lip 141 and the foam body 200.

The first lip 141 of the first protective layer 120 may comprise an outer surface 142 opposite an inner surface 143, wherein the outer surface 121 of the first protective layer 120 comprises the outer surface 142 of the first lip 141. The inner surface 122 of the first protective layer 120 may comprise the inner surface 143 of the first lip 141 of the first protective layer 120. The outer surface 142 of the first lip 141 of the first protective layer 120 may extend substantially perpendicular to the first major surface 123 of the first protective layer 120. The outer surface 142 of the first lip 141 of the first protective layer 120 may form at least a portion of the first side surface 21 of the building panel 10.

The second lip 145 of the first protective layer 120 may extend from the second major surface 124 of the first protective layer 120 in a direction toward the second protective layer 130. Specifically, the second lip 145 of the first protective layer 120 may extend substantially perpendicular to the second major surface 124 of the first protective layer 120, whereby a plane extending along the longitudinal axis A-A and the lateral axis B-B intersects both the second lip 145 and the foam body 200.

The second lip 145 of the first protective layer 120 may comprise an outer surface 146 opposite an inner surface 147, wherein the outer surface 121 of the first protective layer 120 comprises the outer surface 146 of the second lip 142 of the first protective layer 120. The inner surface 122 of the first protective layer 120 may comprise the inner surface 147 of the second lip 145 of the first protective layer 120. The outer surface 146 of the second lip 145 of the first protective layer 120 may extend substantially perpendicular to the first major surface 123 of the first protective layer 120. The outer surface 146 of the second lip 145 of the first protective layer 120 may form at least a portion of the second side surface 22 of the building panel 10.

The first protective layer 120 may comprise a central region 180 that is circumscribed by a perimeter region 190. The central region 180 of the first protective layer 120 may form the vented portion 30 of the building panel 10 and the perimeter region 190 of the first protective layer 120 may form the perimeter portion 40 of the building panel 10. The central region 180 comprises an outer surface 181 that is opposite an inner surface 182, and the perimeter region 190 comprises an outer surface 191 that is opposite an inner surface 192. The outer surface 181 of the central region 180 may form at least a portion of the outer surface 121 of the first protective layer 120. The inner surface 182 of the central region 180 may form at least a portion of the inner surface 122 of the first protective layer 120. The outer surface 191 of the perimeter region 190 may form at least a portion of the outer surface 121 of the first protective layer 120. The inner surface 192 of the perimeter region 190 may form at least a portion of the inner surface 122 of the first protective layer 120.

The apertures 30 of the building panel 10 may be formed into the central region 180 of the first protective layer 120, whereby the apertures extend continuously from the inner surface 182 to the outer surface 181 of the central region 180 of the first protective layer 120. The perimeter region 190 of the first protective layer 190 may be substantially free of perforations and/or open apertures.

The central region 180 and the perimeter region 190 may be formed from a singular sheet of material, whereby the central region 180 is formed by punching perforations to form the apertures 30. In another embodiment, the central region 180 may be formed from a first sheet of material and the perimeter region 190 may be formed from a second sheet of material, whereby the first sheet of material forming the central region 180 is secured to building panel 10 by one or more fasteners 170 and/or surrounds. In a non-limiting example, the fastener 170 maybe a strip of L-shaped trim, T-shaped trim, Z-shaped trim, or the like. In such embodiments, the fastener 170 may be removable such that the sheet forming the central region 180 may be removed from the building panel 10.

The second protective layer 130 may have an outer surface 131 opposite an inner surface 132. The second protective layer 130 may have a thickness as measured between the outer and inner surfaces 131, 132 that is substantially equal to the shell thickness $t_1$. The second protective layer 130 may comprise a first major surface 133 opposite a second major surface 134. The first major surface 133 of the second protective layer 130 may form at least a portion of the outer surface 131 of the second protective layer 130. The second major surface 134 of the second protective layer 130 may form at least a portion of the inner surface 132 of the second protective layer 130. The first major surface 133 of the second protective layer 130 may form at least a portion of the second exposed major surface 12 of the building panel 10. The outer surface 131 of the second protective layer 130 may form at least a portion of the second exposed major surface 12 of the building panel 10.

The second protective layer 130 may comprise a first lip 151 that is opposite a second lip 155 across the longitudinal axis A-A. The first lip 151 of the second protective layer 130 may be located toward a first edge of the second protective layer 130 proximate to the first side surface 21 of the building panel 10, and the second lip 155 of the second protective layer 130 may be located toward a second edge of the second protective layer 130 proximate to the second side surface 22 of the building panel 10.

The first lip 151 of the second protective layer 130 may extend from the second major surface 134 of the second protective layer 130 in a direction toward the first protective layer 120. Specifically, the first lip 141 of the second protective layer 130 may extend substantially perpendicular to the second major surface 134 of the second protective layer 130, whereby a plane extending along the longitudinal axis A-A and the lateral axis B-B intersects both the first lip 151 of the second protective layer 130 and the foam body 200.

The first lip 151 of the second protective layer 130 may comprise an outer surface 152 opposite an inner surface 153, wherein the outer surface 131 of the second protective layer 130 comprises the outer surface 152 of the second lip 151. The inner surface 132 of the second protective layer 130 may comprise the inner surface 153 of the first lip 151 of the second protective layer 130. The outer surface 152 of the first lip 151 of the second protective layer 130 may extend substantially perpendicular to the first major surface 133 of the second protective layer 130. The outer surface 152 of the first lip 151 of the second protective layer 130 may form at least a portion of the first side surface 21 of the building panel 10.

The second lip 155 of the second protective layer 130 may extend from the second major surface 134 of the second protective layer 130 in a direction towards the first protective layer 120. Specifically, the second lip 155 of the second protective layer 130 may extend substantially perpendicular to the second major surface 134 of the second protective layer 130, whereby a plane extending along the longitudinal axis A-A and the lateral axis B-B intersects both the second lip 155 of the second protective layer 130 and the foam body 200.

The second lip 155 of the second protective layer 130 may comprise an outer surface 156 opposite an inner surface 157, wherein the outer surface 131 of the second protective layer 130 comprises the outer surface 156 of the second lip 155 of the second protective layer 130. The inner surface 132 of the second protective layer 130 may comprise the inner surface 157 of the second lip 152 of the second protective layer 130. The outer surface 156 of the second lip 155 may extend substantially perpendicular to the first major surface 133 of the second protective layer 130. The outer surface 156 of the second lip 155 may form at least a portion of the second side surface 22 of the building panel 10.

The first lip 141 of the first protective layer 120 and the first lip 151 of the second protective layer 130 may extend toward each other. The second lip 145 of the first protective layer 120 and the second lip 155 of the second protective layer 130 may extend toward each other.

The foam layer 200 may form a foam body that is located within the chamber 110 formed by the shell 100. The foam body may comprise a first major surface 201 opposite a second major surface 202 and a side surface 203 extending there-between. The foam layer 200 may have a foam thickness $t_2$ as measured by the distance between the first major surface 201 and the second major surface 202. The foam thickness $t_2$ may range from about 1 inch to about 6 inches—including all distances and sub-ranges there-between. In a preferred embodiment, the foam thickness $t_2$ may range from about 1 inch to about 4 inches—including all distances and sub-ranges there-between.

The foam body of the foam layer 200 may further comprise a depression 210 that is formed into the first major surface 201 of the foam body. The depression extends from the first major surface 201 to a depression floor 211 along a direction moving from the first major surface 201 to the second major surface 202. The depression 210 may also be referred to as an "open cavity" 210 that is formed into the first major surface 201 of the foam body 200, whereby the cavity floor 211 may also be referred to as a "cavity floor" 211.

The depression 210 may be circumscribed by an upstanding wall 212 formed by the foam body. The depression 210 may extend to a depression depth $t_3$ as measured by the distance between the first major surface 201 of the foam body of the foam layer 200 and the depression floor 211 of the foam layer 200. The depression depth $t_3$ may range from about 0.5 inches to about 4.5 inches—including all distances and sub-ranges there-between. In a preferred embodiment, the depression depth t3 may range from about 1 inch to about 2 inches—including all distances and sub-ranges there-between. The portion of the foam layer 200 present between the second major surface 202 and the depression floor 210 may be a reduced thickness $t_4$ ranging from about 0.5 to about 3.5-including all distances and sub-ranges there-between. In a preferred embodiment, the reduced thickness $t_4$ may range from about 2 inches to about 3 inches—including all distances and sub-ranges there-between.

A ratio between the depression depth $t_3$ and the foam thickness $t_2$ may range from about 0.2:1 to about 0.9:1-including all ratios and sub-ranges there-between.

The foam layer 200 may be formed from closed-celled foam. The close-celled foam does not allow for airflow between the first and second major surfaces of the first body under normal atmospheric conditions. The foam layer 200 may be formed from a foamable composition that is capable of being poured to shape in a mold, whereby the foamable composition then foams to form the closed-cell foam in the shape of the foam layer 300. Non-limiting examples of suitable foam that may form the foam layer 200 include urethane foam. The foam layer 200 may have a substantially uniform density. The density of the foam layer 200 may range from about 0.5 $lb/ft^3$ to about 6 $lb/ft^3$—including all densities and sub-ranges there-between. In a preferred embodiment, the density of the foam layer 200 may range from about 0.5 $lb/ft^3$ to about 4 $lb/ft^3$—including all densities and sub-ranges there-between.

The side surfaces 203 of the foam layer 200 may comprise a first side surface 221 opposite a second side surface 222 and a third side surface 223 opposite a fourth side surface 24. The first and second side surfaces 221, 222 of the foam layer 200 may be substantially parallel to each other. The third and fourth side surfaces 223, 224 of the foam layer 200 may be parallel to each other.

The first side and second side surfaces 221, 222 of the foam layer 200 may each independently intersect both the third and fourth side surface 223, 224 of the foam layer 200. The third and fourth side surfaces 223, 224 of the foam layer 200 may extend at an angle that is substantially perpendicular to the first and second side surface 221, 222 of the foam layer 200.

The first side surface 21 of the building panel 10 may comprise at least a portion of the first side surface 221 of the foam layer 200. The second side surface 22 of the building panel 10 may comprise at least a portion of the second side surface 222 of the foam layer 200. The third side surface 23 of the building panel 10 may comprise at least a portion of the third side surface 223 of the foam layer 200. The fourth side surface 24 of the building panel 10 may comprise at least a portion of the fourth side surface 224 of the foam layer 200.

Specifically, the foam layer 200 may be formed such that the side surfaces 203 comprise edge geometry that conforms to the interlocking profile 50 of the side surfaces 20 of the building panel 10. Specifically, each of the side surfaces 203 of the foam layer 200 may be formed such that the first, second, third, and/or fourth side surfaces 221, 222, 223, 224 of the foam layer 200 comprise an edge geometry that corresponds to the interlocking profile 50 of each of the first, second, third, and/or fourth interlocking profiles 51, 52, 53, 54 of the building panel 10.

In a non-limiting example, the first side surface 221 of the foam layer 200 may be formed to comprise a groove 70 including the groove floor 71 and groove walls 72. In another non-limiting example, the second side surface 222 of the foam layer 200 may be formed to comprise a tongue 60 including the flange face 61 and the flange walls 62. In another non-limiting example, the third side surface 223 and the fourth side surface 224 of the foam layer 200 may each be formed to comprise either a tongue 60 or groove 70. Therefore, the groove floor 71, groove walls 72, flange face 61, and flange walls 62 may at least be partially formed by one or more of the closed-celled foam materials.

The fibrous layer 300 may form a fibrous body that is also located within the chamber 110 formed by the shell 100. The fibrous body may comprise a first major surface 301 opposite a second major surface 302 and a side surface 303 extending there-between. The fibrous layer 300 may have a fibrous thickness as measured by the distance between the first major surface 301 and the second major surface 302 of the fibrous layer 300. The fibrous thickness may be substantially equal to the depression depth $t_3$ of the foam layer 200. In other embodiments, the fibrous thickness may be less than the depression depth $t_3$ of the foam layer 200.

A ratio between the fibrous layer thickness and the foam thickness $t_2$ may range from about 0.2:1 to about 0.9:1- including all ratios and sub-ranges there-between.

The fibrous layer 300 may be formed from a fibrous material. Non-limiting examples of fibrous material include inorganic fiber—such as mineral wool (also referred to as slag wool), rock wool, stone wool, glass fibers, and combinations thereof. In some embodiments, the fibrous layer 300 may further comprise a binder (e.g., polyurethane binder, epoxy binder, a latex), a filler (e.g., talc, calcium carbonate) and/or additive (e.g., fungicide). The fibrous layer 300 may have a substantially uniform density. The density of the fibrous layer 300 may range from about 3 lb/ft$^3$ to about 10 lb/ft$^3$—including all densities and sub-ranges there-between. In a preferred embodiment, the density of the fibrous layer 300 may range from about 4 lb/ft$^3$ to about 8 lb/ft$^3$—including all densities and sub-ranges there-between.

The building panel 10 may be assembled such that the foam layer 200 and the fibrous layer 300 are positioned between the first and second protective layers 120, 130. The second major surface 202 of the foam layer 200 faces the inner surface 131 of the second protective layer 130. Specifically, the second major surface 202 of the foam layer 200 may face the second major surface 134 of the second protective layer 130. An adhesive may be applied between the second major surface 202 of the foam layer 200 and the second major surface 134 of the second protective layer 130, thereby adhesively bonding the two surfaces together. Non-limiting examples of adhesive include pressure sensitive adhesive, hot-melt adhesive, epoxy, and combinations thereof.

The building panel 10 may be assembled such that a portion of the first side surface 221 of the foam layer 200 faces the inner surface 153 of the first lip 151 of the second protective layer 130 and a portion of the second side surface 222 of the foam layer 200 faces the inner surface 157 of the second lip 155 of the second protective layer 130. Adhesive may be applied between the portion of the first side surface 221 of the foam layer 200 and the inner surface 153 of the first lip 151 and/or applied between the portion of the second side surface 222 of the foam layer 200 and the inner surface 157 of the second lip 155, thereby adhesively bonding the surfaces together.

The building panel 10 may be assembled such that the first major surface 201 of the foam layer 200 faces the inner surface 121 of the first protective layer 120 of the shell 100. An adhesive may be applied between the first major surface 201 of the foam layer 200 and the inner surface 121 of the first protective layer 120 of the shell 100—thereby adhesively bonding the two surfaces together.

In particular, the building panel 10 may be assembled such that the first major surface 201 of the foam layer 200 faces the inner surface 191 of the perimeter region 190 of the first protective layer 120 of the shell 100. An adhesive may be applied between the first major surface 201 of the foam layer 200 and the inner surface 191 of perimeter region 190 of the first protective layer 120 of the shell 100—thereby adhesively bonding the two surfaces together.

The fibrous layer 300 may sit within the depression 210 of the foam layer 200 such that the second major surface 302 of the fibrous layer 300 faces the depression floor 211 of the foam layer 200. In some embodiments, second major surface 302 of the fibrous layer 300 may directly contact the depression floor 211 of the foam layer 200. Although not pictured in FIG. 7, some embodiments of the present invention include one or more intermediate layers positioned between the second major surface 302 of the fibrous layer 300 and the depression floor 211 of the foam layer 200. Non-limiting examples of intermediate layers include reinforcing layers.

The fibrous layer 300 may sit within the depression 210 of the foam layer 200 such that the upstanding walls 212 of the foam layer 200 face the side surfaces 303 of the fibrous layer 300. In some embodiments, the side surfaces 303 of the fibrous layer 300 may directly contact the upstanding walls 212 of the foam layer 200. In other embodiments, the upstanding walls 212 of the foam layer 200 and the side surfaces 303 of the fibrous layer 300 may be offset by one or more fasteners 170 or intermediate layers.

According to the present invention, the building panel 10 may be assembled such that the first major surface 301 of the fibrous layer 300 faces the inner surface 121 of the first protective layer 120 of the shell 100. According to the present invention, the interface between the first major surface 301 of the fibrous layer 300 and the inner surface 121 of the first protective layer 120 may be substantially free of adhesive. The first major surface 301 of the fibrous layer 300 may be in free-floating contact with the inner surface 121 of the first protective layer 120.

In particular, the first major surface 301 of the fibrous layer 300 may face the inner surface 181 of the central region 180 of the first protective layer 120 of the shell 100. According to the present invention, the interface between the first major surface 301 of the fibrous layer 300 and the inner surface 181 of the central region 180 may be substantially free of adhesive. The first major surface 301 of the fibrous layer 300 may be in free-floating contact with the inner surface 181 of the central region.

Additionally, the fibrous layer 300 may sit within the depression 210 of the foam layer 200 such that the first major surface 301 of the fibrous layer 300 and the first major surface 201 of the foam layer 200 face the same direction. Specifically, the fibrous layer 300 may sit within the open cavity 210 of the foam layer 200 such that the first major surface 301 of the fibrous layer 300 and the first major surface 201 of the foam layer 200 face the inner surface 122 of the first protective layer 120. The side surface 303 of the fibrous layer 300 may face the upstanding wall 212 of the foam layer 200.

Although not pictured, some embodiments of the present invention include one or more intermediate layers may be positioned between second protective layer 130 and the second major surface 202 of the foam layer 200. Although not pictured, some embodiments of the present invention include one or more intermediate layers may be positioned between first protective layer 120 and the first major surface 201 of the foam layer 200. Although not pictured, some embodiments of the present invention include one or more intermediate layers may be positioned between upstanding walls 212 and/or cavity floor 211 and the second major surface 302 and/or side surface 303 of the fibrous layer 300. The intermediate layers may be added to added structural integrity to the overall building panel 10.

Non-limiting examples of material that may form the intermediate layer may include sheetrock, gypsum board, sheet metal, mass loaded vinyl, a laminated material (e.g., vinyl layers), polyvinylchloride ("PVC"), fiberglass, and combinations thereof. According to some embodiments, an adhesive may be applied between the intermediate layer and the adjacent layer.

According to the present invention, the first major surface 11 of the building panel 10 may comprise the first protective layer 120 of the shell 100. The second major surface 12 of the building panel 10 may comprise the second protective layer 130 of the shell 100. The side surface 20 of the building panel 10 may comprise the side surface 140 of the shell 100. The side surface 20 of the building panel 10 may further comprise at least a portion of the side surface 203 of the foam layer 200.

According to the present invention, the plurality of apertures 30 expose at least a portion of the first major surface 301 of the fibrous layer 300 to the first exposed major surface 11 of the building panel 10. As such, the building panel 10 may be formed from materials suitable for providing mechanical strength for the building panel 10 to function as a structural panel (i.e., the shell 100 and foam layer 200) while simultaneously providing an exposed major surface 11 that exhibits airflow characteristics suitable for the building panel to function as a noise reducing panel.

As discussed, the first protective layer 120 of the shell 100 may comprise the vented portion 30 of the first major surface 11. The vent apertures 31 present on the vented portion 30 are open channels that extend entirely between the inner and outer surface 121, 122 of the first protective layer 120. Under this configuration, at least a portion of the first major surface 301 of the fibrous layer 300 is directly adjacent to the vented portion 30 of the first major surface 11 such that the plurality of vent apertures 31 are immediately adjacent to the fibrous layer 300. The result is the fibrous layer 300 being at least partially and directly exposed to the exterior environment that surrounds the building panel 10 via the vent apertures 31 present on the vented portion 30 of the first protective layer 120 of the shell 100. Under such configuration, the airflow directly into the building panel 10—specifically directly into the fibrous layer 300—is possible for air moving in a direction that extends from the first major surface 11 to the second major surface 12 of the building panel 10.

Such airflow allows the building panel 10 to exhibit sound attenuation of a noise generating from a noise source when the building panel 10 is positioned such that the first major surface 11 of the building panel 10 is at least partially facing the noise source.

Sound attenuation is a characteristic of the building panel 10 that represents the building panel's 10 ability to reduce the amount of sound on a specific side of the building panel 10—e.g., sound generated on the first majors side of the building panel 10. The sound reduction may be useful in creating an enclosure environment that a specific level of sound deadening is required. One measurement of the sound attention ability is the Noise Reduction Coefficient (NRC) rating as described in ASTM test method C423. This rating is the average of sound absorption coefficients at four ⅓ octave bands (250, 500, 1000, and 2000 Hz), where, for example, a system having an NRC of 0.80 has about 80% of the absorbing ability of an ideal absorber. A higher NRC value indicates that the material provides better sound absorption and reduced sound reflection. The building panel 10 of the present invention exhibits an NRC of at least 0.75, more specifically, at least 0.85. The building panel 10 of the present invention exhibits an NRC of at least 0.9.

Sound attenuation of the building panel 10 may effectuated by the vent apertures 31 present on the vented portion 30 of the building panel 10. The vent apertures 31 may have a diameter ranging from about 62 mils to about 300 mils—including all distances and sub-ranges there-between. In a preferred embodiment, the vent apertures 31 present on the vented portion 30 may have a diameter ranging from about 125 mils to about 190 mils—including all distances and sub-ranges there-between.

The vent apertures 31 may be present on the vented portion 30 in a frequency such that the open area formed from the vent apertures 31 occupy about 20% to about 60% of the total surface area of the vented portion 30—including all amounts and sub-ranges there-between. In a preferred embodiment, the vent apertures 31 may be present in a frequency such that the open area formed from the vent apertures 31 occupy about 30% to about 50% of the total surface area of the vented portion 30—including all amounts and sub-ranges there-between.

Figure 8A:
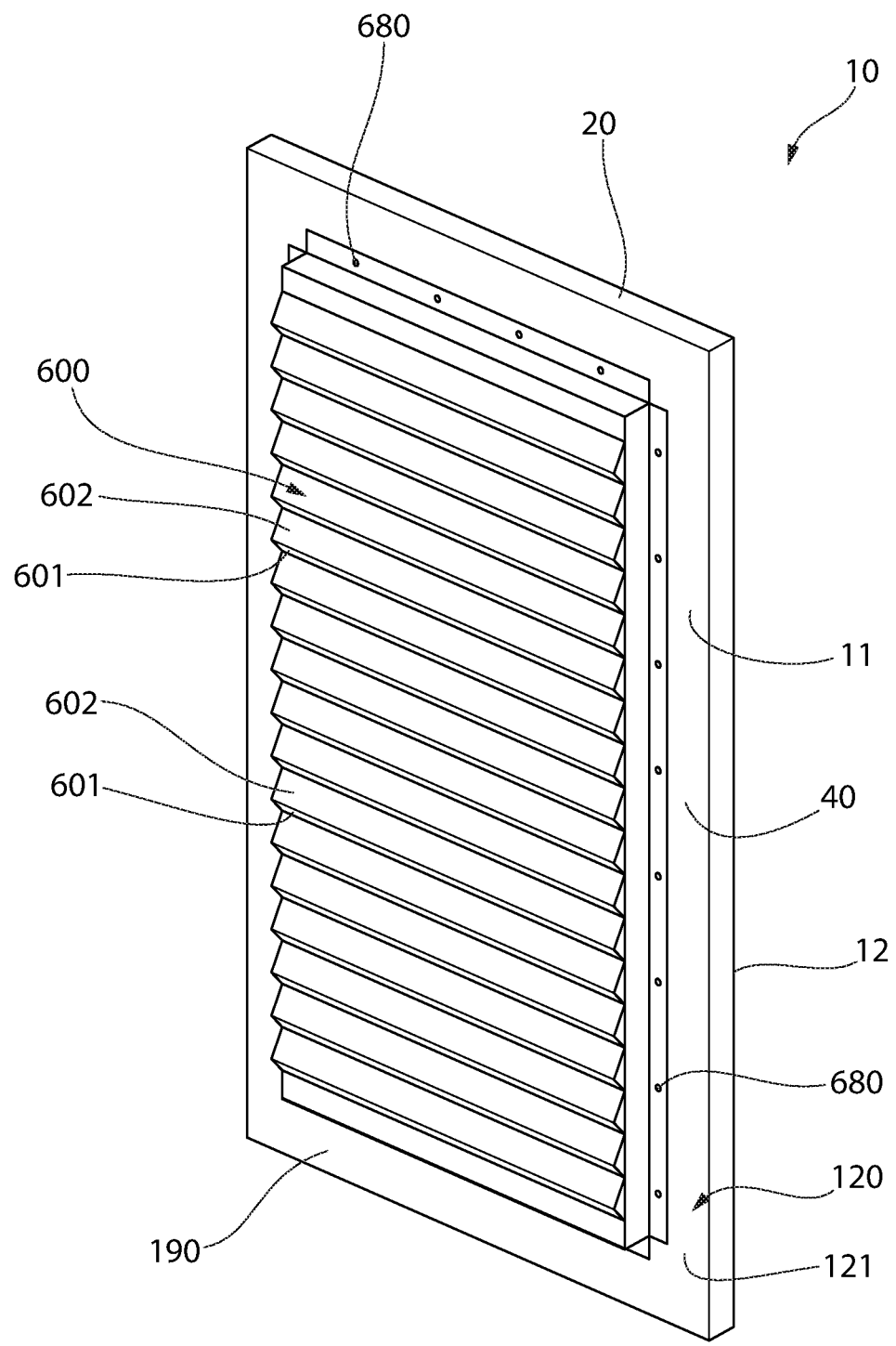
FIG. 8A is a front perspective view of the acoustic structural panel according to another embodiment of the present invention.
Figure 8B:
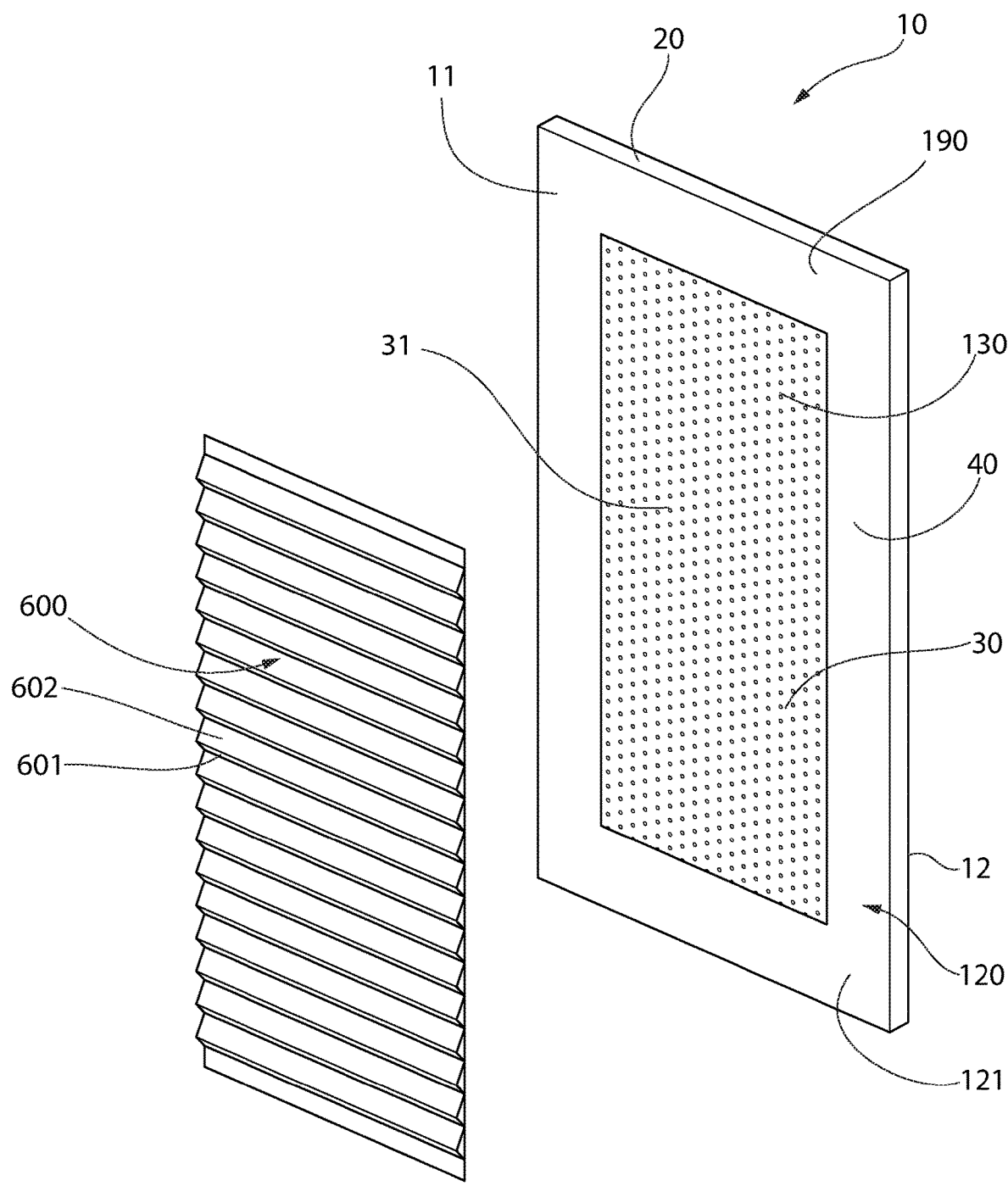
FIG. 8B is an exploded view of the acoustic structural panel according to FIG. 8A.

Referring now to FIGS. 8A and 8B, the building panel of the present invention may further comprise a louvred cover 600. The louvred cover 600 may comprise an array of inclined blades 602 offset by a plurality of vented portions 602. The louvred cover 600 may be attached to the outer surface 121 of the first protective layer 120, thereby forming a portion of the first exposed major surface 11 of the building panel 10. The louvred cover 600 may be attached to the first protective layer 120 by one or more fasteners 680.

The louvred cover 600 may be sized and positioned within the building panel 10 such that the louvred cover 600 at least partially concealed the central region 180 of the first protective layer 120 such that the inclined blades 602 at least partially masks the vented portion 30 of the building panel 10 in a vertical direction, thereby protecting the portions of fibrous layer 300 exposed via the vent apertures 30. The vented portions 602 allow for sufficient airflow for the vented portion 30 of the building panel 10 to still be able to receive and absorb airflow, thereby providing noise reducing to the surrounding environment.

Figure 9:
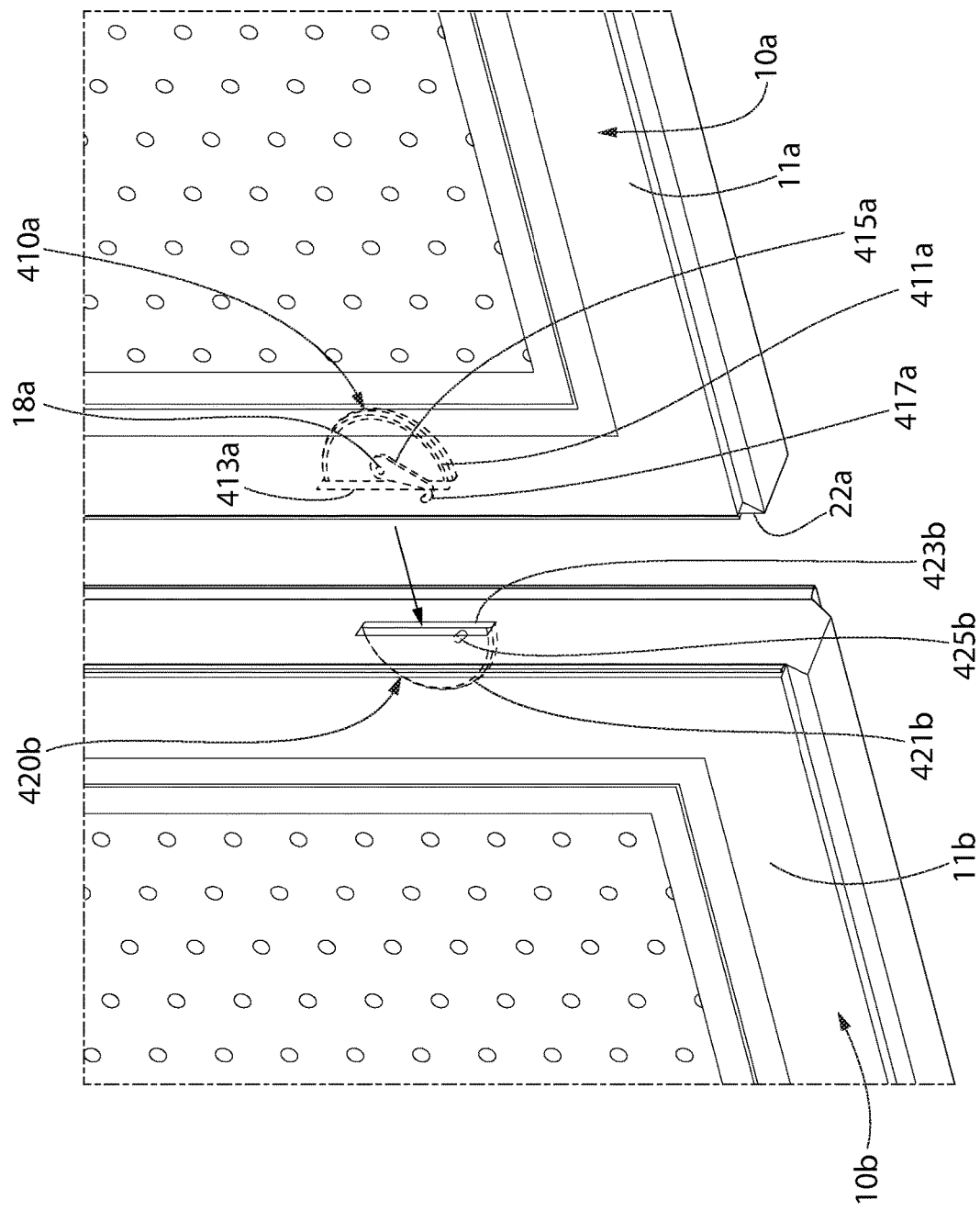
FIG. 9 is a close-up perspective view of an acoustic structure system according to another embodiment of the present invention in an unlocked state.
Figure 9A:
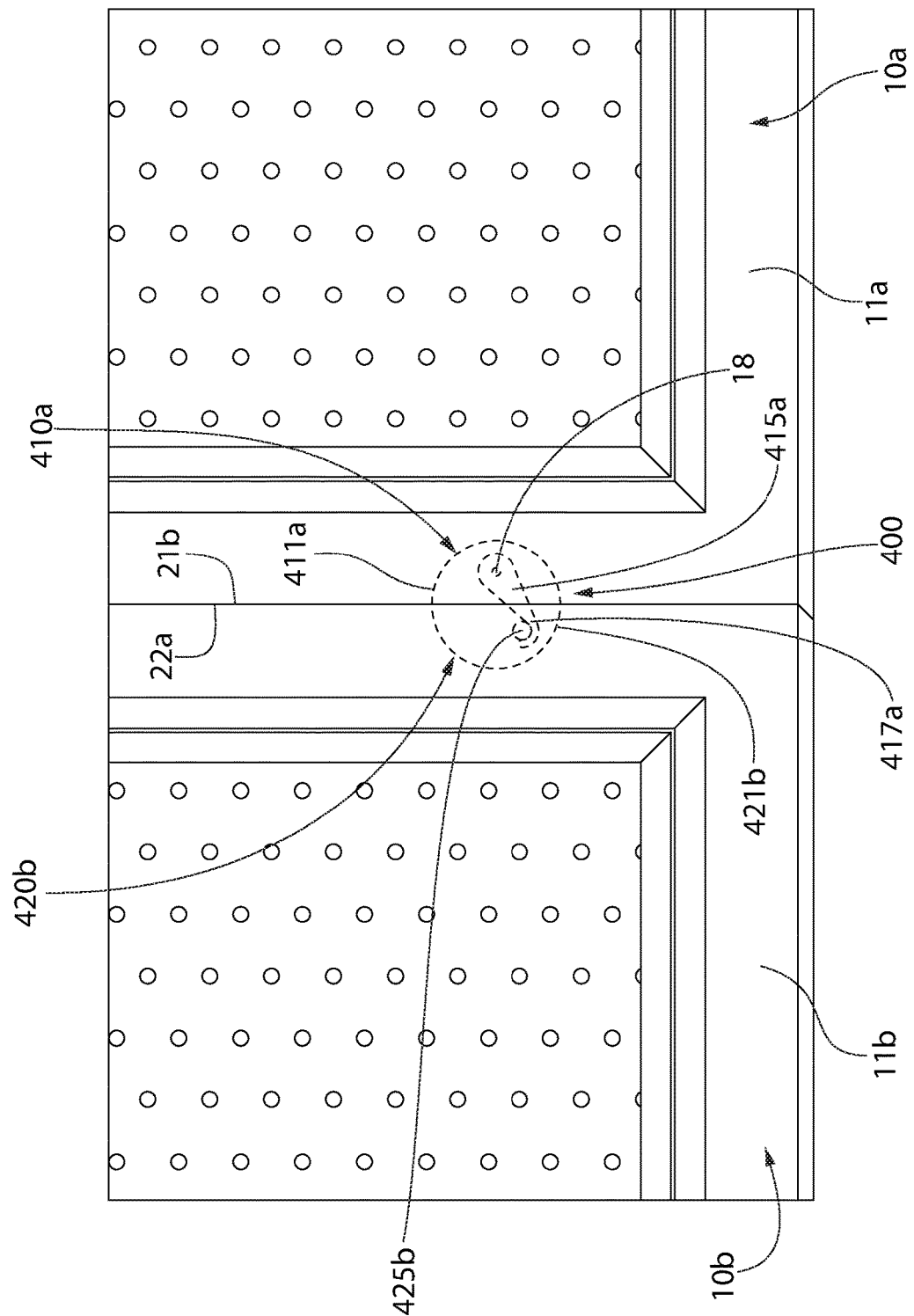
FIG. 9A is a close-up view of an acoustic structure system of FIG. 9 in a locked state.
Figure 10A:
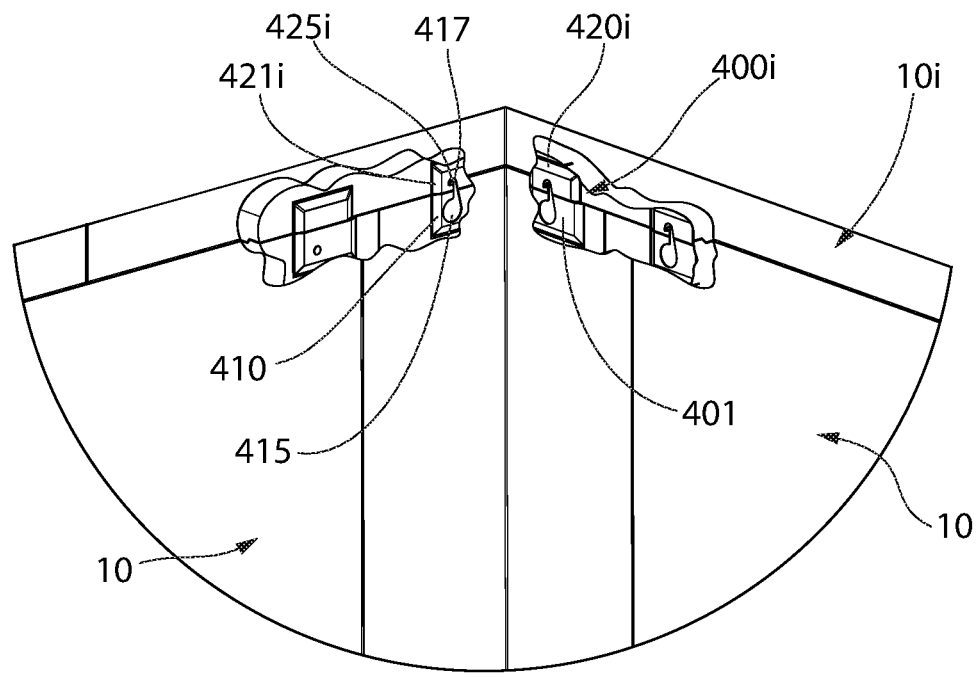
FIG. 10A is an exploded close-up view of an enclosure of region XA of FIG. 21 comprising the acoustic structural panels according to the present invention in a locked-state.
Figure 10B:
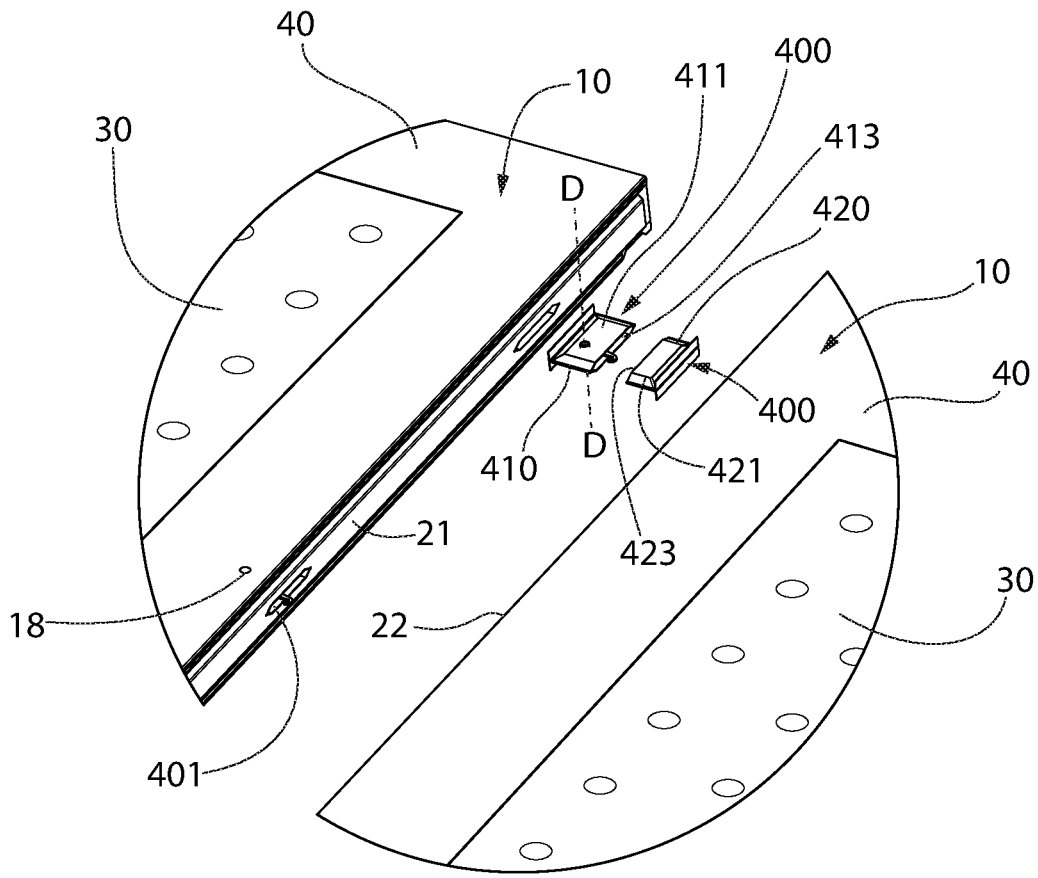
FIG. 10B is an exploded close-up view of an enclosure comprising the acoustic structural panels according to the present invention.
Figure 11:
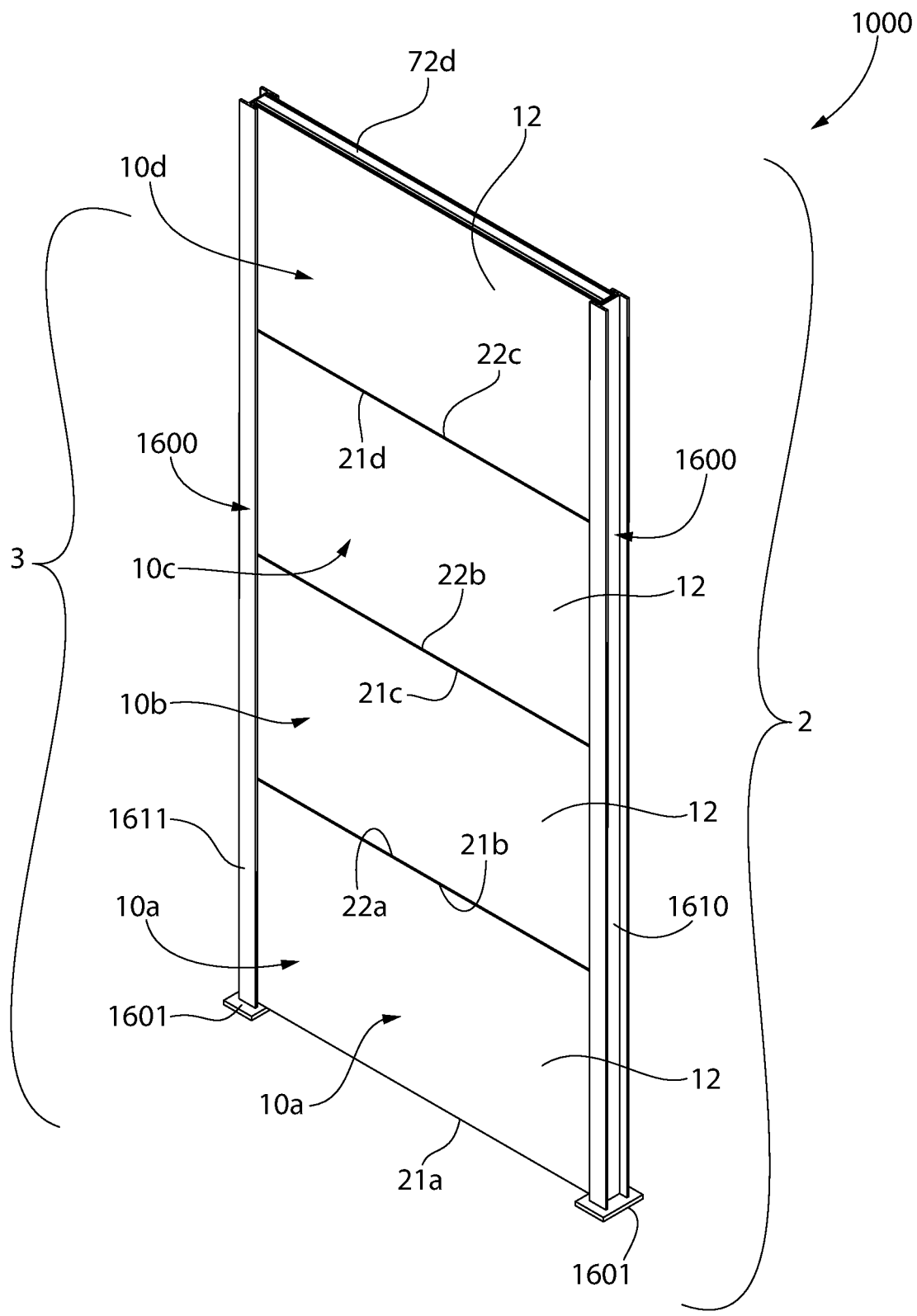
FIG. 11 is a rear perspective view of an acoustic wall according to another embodiment of the present invention.
Figure 12:
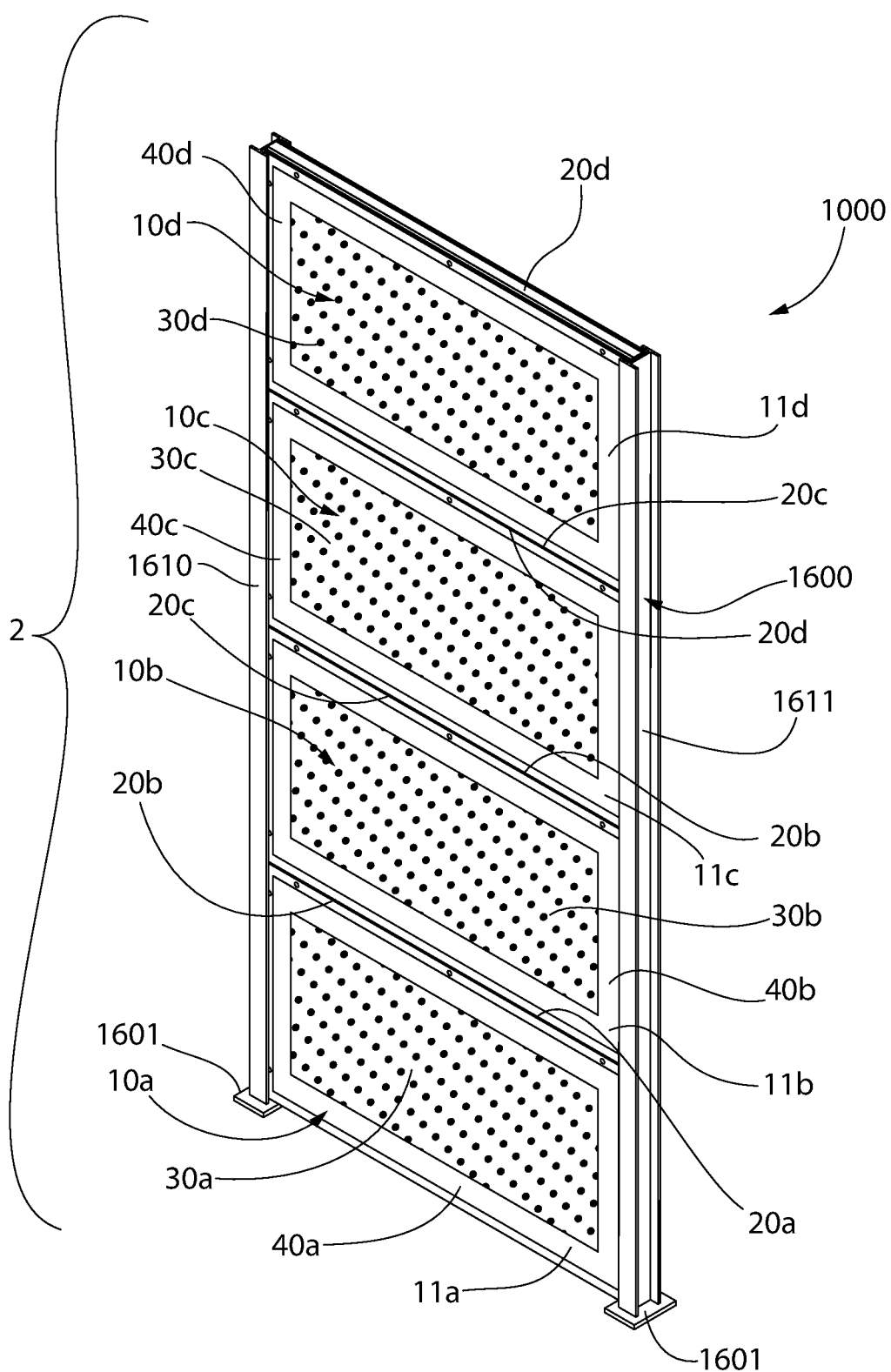
FIG. 12 is a front perspective view of the acoustic wall of FIG. 11.

Referring now to FIGS. 9, 9A, and 10, the building panels 10 of the present invention may further comprise a locking feature 400 present on at least one of the side surfaces 20 of the building panel 10. The locking feature 400 may be provided to prevent the two adjacent building panels 10 from separating from each other once in an installed state— i.e., a fully formed system 1. The locking feature 400 may be altered between an unlocked state (as shown in FIG. 11) and a locked state (as shown in FIG. 12), whereby in the unlocked state a first and second building panel 10a, 10b, may be pulled apart relative to each other. In a locked state, the first and second building panel 10a, 10b, are coupled together by mechanical fastener that prevents relative movement between the two. Non-limiting examples of the locking feature include cam hook and post fasteners.

In a non-limiting example, the locking feature 400 may comprise a first locking feature 410 and a second locking feature 420. The first locking feature 410 may be present on a first or second side surface 21, 22 of the building panel 10 and the second locking feature 420 may be present on the opposite of the second or first side surface 22, 21 of the same building panel 10. As discussed in greater detail herein, the first locking feature 410 may be present on a third or fourth side surface 23, 24 of the building panel 10 and the second locking feature 420 may be present on the opposite of the fourth or third side surface 24, 23 of the same building panel 10. As discuss in greater detail herein, the first major exposed surface 11 of the building panel 10 may also comprise the locking feature 400. In some embodiments, the perimeter region 40 of the first exposed major surface 11 may comprise the first locking feature 410. In some embodiments, the perimeter region 40 of the first exposed major surface 11 may comprise the second locking feature 420.

In a non-limiting embodiment, the first locking feature 410 includes include a first housing 411 and a cam hook 415 (also referred to as a "latch" 415), the cam hook 415 at least partially located within the first housing 411. The first housing 411 surrounds a first open-ended cavity (also referred to a "first cavity"), whereby a first opening 413 on the first housing 411 exposes the first cavity to the exterior of the first locking feature 410. The first housing 411 may be located inset from the first side surface 21 of the building panel 10, whereby the first opening 413 is substantially flush with the first side surface 21.

The cam hook 415 is located at least partially within the first cavity. The cam hook 415 is rotatable relative to the first housing 411. Specifically, the cam hook 415 may be rotatable about a locking axis D-D such that the cam hook 415 may be located entirely within the first housing or at least a portion of the cam hook 415 may extend beyond the first opening 413 and be located external the first housing 410. Specifically, the cam hook 415 may comprise a hook portion 417 that can be locked entirely within the first housing 410 or, when the cam hook 415 is rotated about the locking axis D-D, the hook portion 417 is located external the first housing 411.

In a non-limiting embodiment, the second locking feature 420 includes a second housing 421 and a post fastener 425 (also referred to as a "pin" 425), the post fastener 425 is located within the second housing 421. The second housing 421 surrounds a second open-ended cavity (also referred to a "second cavity"), whereby a second opening 423 on the second housing 421 exposes the second cavity to the exterior of the second locking feature 420. The second housing 421 may be located inset from the second side surface 22 of the building panel 10, whereby the second opening 423 is substantially flush with the second side surface 22.

The post fastener 425 is located entirely within the second cavity. The post fastener 425 is fixed relative to the second housing 421. The first and second locking features 410, 420 may be arranged such that the post fastener 425 extends along a longitudinal axis that is arrange in a substantially parallel orientation to the locking axis D-D of the first locking feature 410. The second housing 421 may be configured to receive the hook portion 417 of the cam hook 415 via the second opening 423 of the second housing 421.

In a non-limiting example, a first and second building panels 10a, 10b, may be placed adjacent to each other and the first side surface 21b of the second building panel 10b that comprises the second locking feature 420b may abut the second side surface 22a of the first building panel 10a that comprises the first locking feature 410a. Once the first and second side surfaces 21b, 22a of the first and second building panels 10a, 10b are abutted, the first and second locking features 410a, 420b may be altered from the unlocked state (as shown in FIG. 9) to the locked state (FIG. 9A), whereby the first and second locking features 410a, 420b are in mechanical engagement.

In the unlocked state, the hook portion 417a of the first locking feature 410a of the first building panel 10a may be located entirely within the first housing 411a of the first building panel 410a. In the unlocked state, the hook portion 417a may at least partially extend beyond the first opening 413a of the first locking features 410a of the first building panel 10a, thereby extending beyond the second side surface 22a of the second building panel 10b. In the unlocked state, the hook portion 417a of the first locking features 410a of the first building panel 10a may be completely external the second housing 421b of the second locking feature 420b of the second building panel 10b. In other embodiments, in the unlocked state, the hook portion 417a of the first locking feature 420a of the first building panel 10a may be located at least partially within the second housing 421b of the second locking feature 420b of the second building panel 10b so long as the hook portion 417a of the first locking feature 410a of the first building panel 10a does not pull against the post fastener 425b of the second locking feature 420b of the second building panel 10b. In the unlocked state, the first building panel 10a may be able to move relative to the second building panel 10b. Specifically, in the unlocked state, the first side surface 21b of the second building panel 10b may be able to move relative to the second side surface 22a of the first building panel 10a.

In locked state, the hook portion 417a of the first locking feature 410a of the first building panel 10a may be located within the second housing 421b of the second building panel 10b. As such, in the locked state, the hook portion 417a of the first locking feature 410a of the first building panel 10a may be external the first housing 411a of the first locking feature 410a of the first building panel 10a. In the locked state, the hook portion 417a of the first locking feature 410a of the first building panel 10a may pull against the post fastener 425b of the second locking feature 420b of the second building panel 10b, thereby pulling together the adjacent interlocking profiles 50 of the first and second building panel 10a, 10b. In a non-limiting example, in the locked state, the hook portion 417a of the first locking feature 410a of the first building panel 10a may pull against the post fastener 425b of the second locking feature 420b of the second building panel 10b, thereby bringing into contact the first side surface 21b of the second building panel 10b and the second side surface 22a of the first building panel 10a, thereby preventing relative movement between the first and second building panels 10a, 10b. Specifically, in the locked state, the first side surface 21b of the second building panel 10b may be prevented from moving relative to the second side surface 22a of the first building panel 10a.

The building panels 10 of the present invention may further comprise one or more tool apertures 18. The tool apertures 18 are configured to receive a tool that converts the locking feature 400 between the locked-state and the unlocked-state. Specifically, the tool apertures 18 may be configured to receive a tool that converts the first locking feature 410 between the locked-state and the unlocked-state by rotating (either directly or indirectly) the cam hook 415 about the locking axis D-D between the locked and unlocked states.

In a non-limiting embodiment, the tool apertures 18 may be located on the first exposed major surface 11 of the building panel 10. In other embodiments, the tool apertures 18 may be located on the second exposed major surface 11 of the building panel 10. The took apertures 18 may be located entirely within the perimeter region 40 of the first exposed major surface 11 of the building panel 10.

In the locked state, the first lip 141 of the first protective layer 120 of a first building panel 10 may be in abutting contact with the second lip 145 of the first protective layer 120 of a second building panel. In the locked state, the first lip 151 of the second protective layer 130 of a first building panel 10 may be in abutting contact with the second lip 155 of the second protective layer 130 of a second building panel.

Although not pictured, in other embodiments, a gasket or other sealing material may be located between the first and second lips of the first and second adjacent building panels. In such embodiments, locking the first and second locking features 410, 420 together may compress the gasket or sealing material, thereby forming a water-tight seal between adjacent first and second building panels.

In the locked state, the flange face 61 of the foam layer 200 of a first building panel may be in abutting contact with the groove floor 71 of a second building panel. In the locked state, the flange walls 62 of the foam layer 200 of the first building panel may be in abutting contact with the groove walls 72 of the second building panel.

Although not pictured, in other embodiments, a gasket or other sealing material may be located between the groove floor 71 and flange face 61 and/or between flange walls 62 and the groove walls 72. In such embodiments, locking the first and second locking features 410, 420 together may compress the gasket or sealing material, thereby forming a water-tight seal between adjacent first and second building panels.

The foregoing discussion of the first and second locking feature 410, 420 was set forth with respect to side surfaces 20 of the adjacent building panel 10—however, such discussion also applies to first and second locking features 410, 420 that may be located on the first and/or second exposed major surfaces 11, 12 of the building panel 10.

Referring now to FIGS. 11-16, the present invention further includes an acoustic wall 1000 comprising a plurality of the building panels 10a, 10b, 10c, 10d, etc. in a vertically oriented configuration. The acoustic wall 1000 of the present invention may comprise a vertical support 1600 comprising at least a first vertical support 1610 and a second vertical support 1611. Non-limiting examples of the first and second vertical support 1610, 1611 include I-beams. Each of the first and second vertical supports 1610, 1611 may comprise a base section 1601 located at the bottom of each of the first and second vertical supports 1610, 1611. In a non-limiting example, the base section 1601 may be a plate structure extending substantially perpendicular to the I-beam.

The acoustic wall 1000 includes at least a first building panel 10a and a second building panel 10b, whereby the second building panel 10b sits atop the first building panel 10a, thereby creating a vertically oriented stack of first and second building panels 10a, 10b. The acoustic wall 1000 may further comprise a third building panel 10c, a fourth building panel 10d, and etc. arranged in the vertically stacked arrangement.

In a non-limiting example, the first and second sides 21, 22 of one building panel 10 may contact the first and second sides 21, 22 of an adjacent vertically stacked building panel 10. In such arrangement, the third and fourth sides 23, 24 may be located at least partially within a channel section formed by the first and second vertical supports 1610, 1611. Under this arrangement, the third and fourth sides 23, 24 of the building panels may be at least partially masked by the first and second vertical supports 1610, 1611.

Each of the first major exposed surfaces 11 of the building panels may face the same direction—i.e., a first direction. Each of the second major exposed surfaces 12 of the building panels may face the same direction—i.e., a second direction. According to the present invention, the first direction faces a noise source such that the vented portions 30 of the first major exposed surfaces 11 may face the noise source, thereby helping to reduce the perceivable amount of sound when located adjacent to the second exposed major surface 12 as less sound may penetrate through the wall and extend the second direction. Additionally, in having the vented portions 30 of the first major exposed surfaces 11 face the noise source, the perceivable amount of sound may also be reduced for an observed located adjacent to the first exposed major surfaces 11, as the vented portion helps reduce the amount of sound that bounces back in the first direction.

Figure 16:
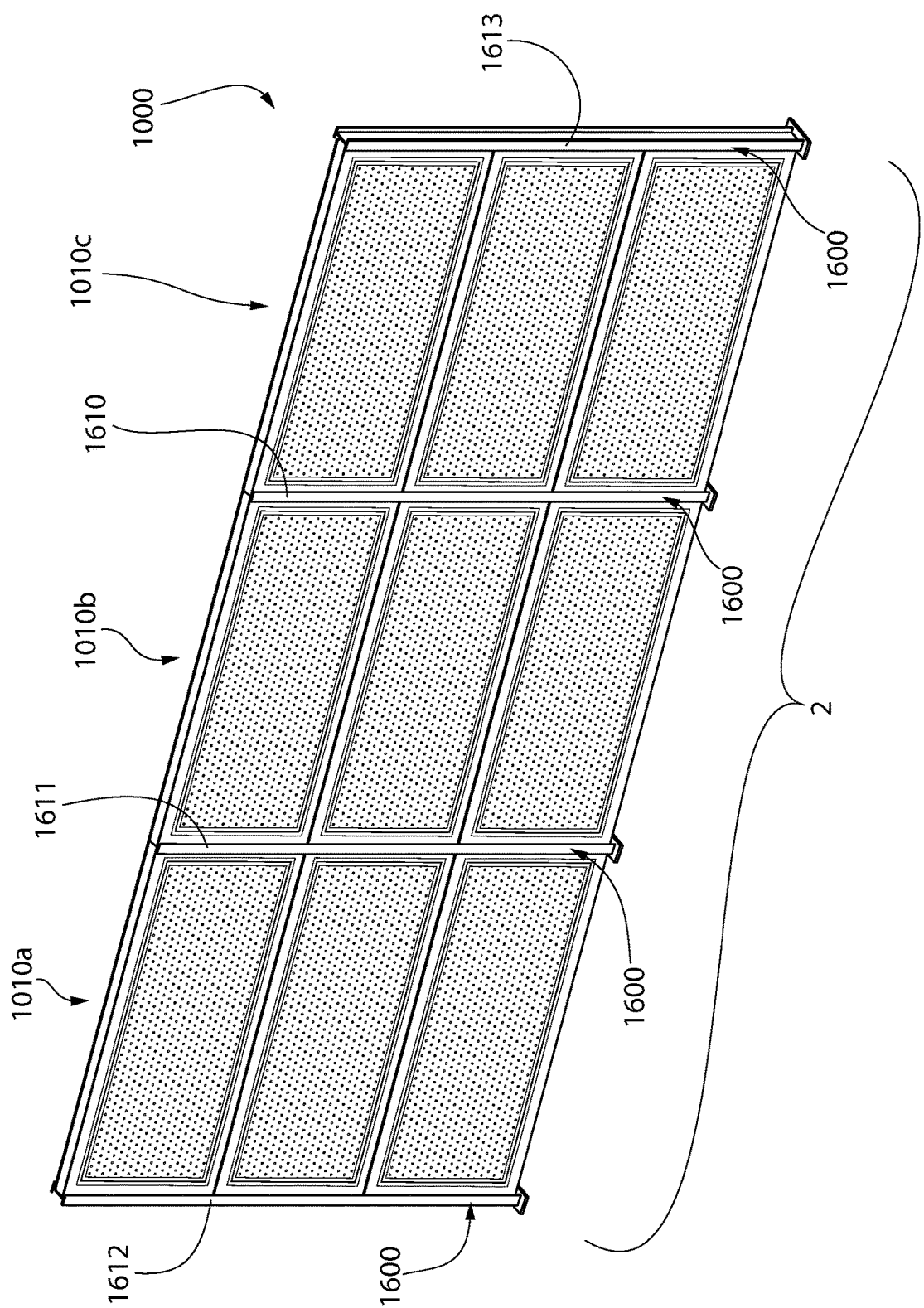
FIG. 16 is a front perspective view of an acoustic wall according to another embodiment of the present invention.
Figure 17:
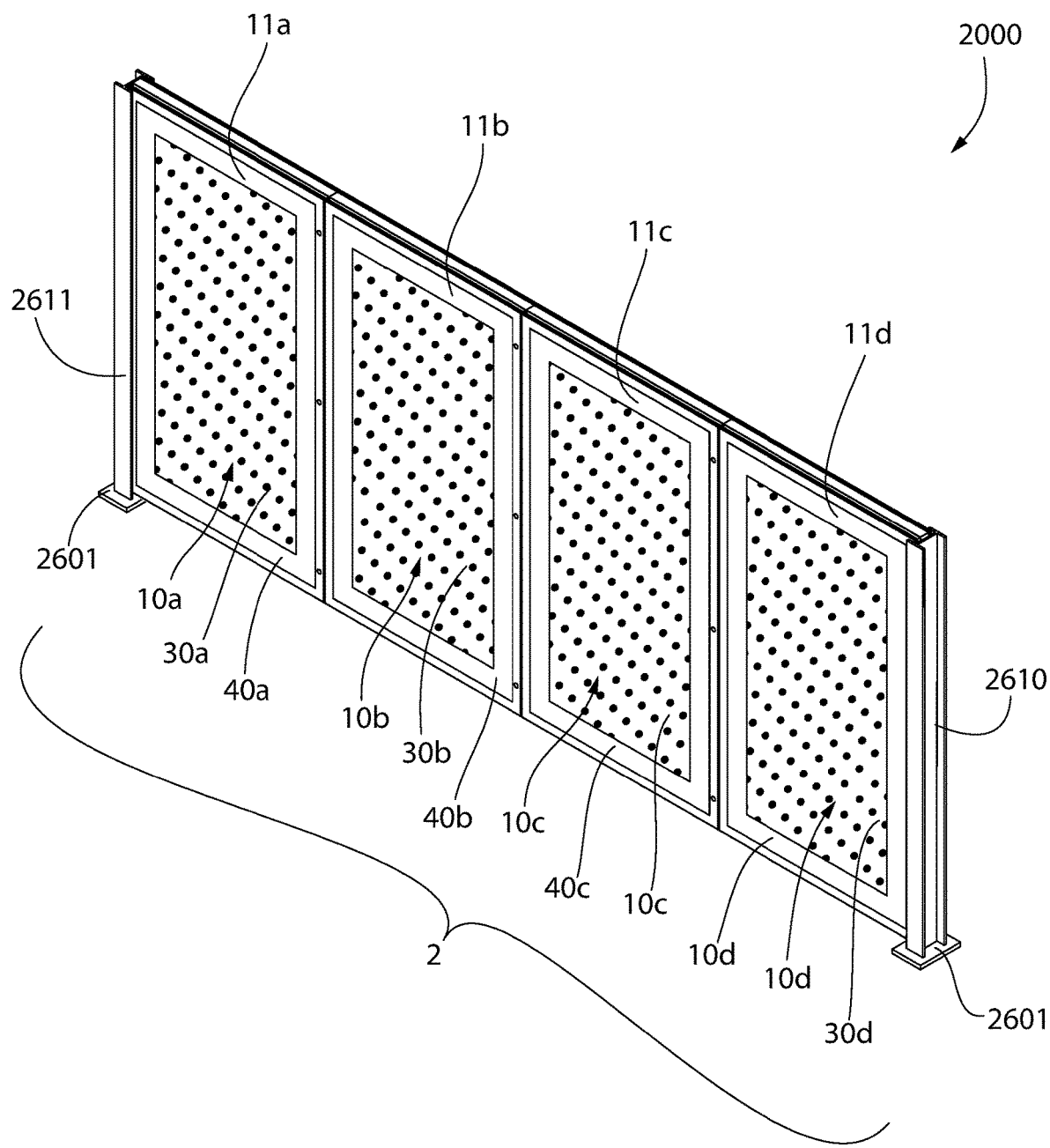
FIG. 17 is a front perspective view of an acoustic wall according to another embodiment of the present invention.

Referring now to FIG. 16, the acoustic wall 1000 may be formed from a plurality of vertical supports 1610, 1611, 1612, 1613, whereby the acoustic wall 1000 further comprises a first vertical stack 1010a of a plurality of building panel 10 and at least a second vertical stack 1010b of a plurality of building panels 10.

Figure 13:
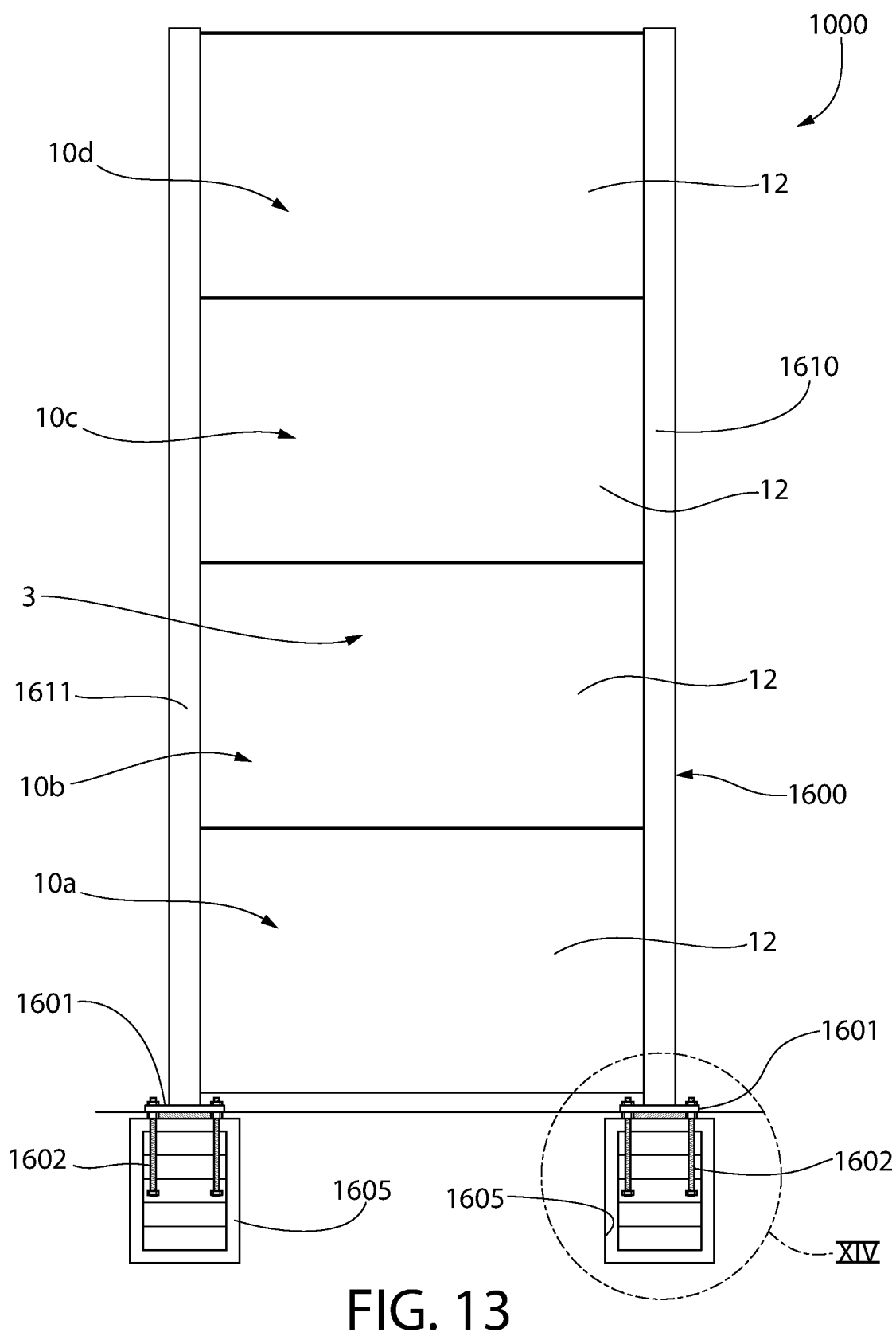
FIG. 13 is a rear view of the acoustic wall of FIG. 11.
Figure 14:
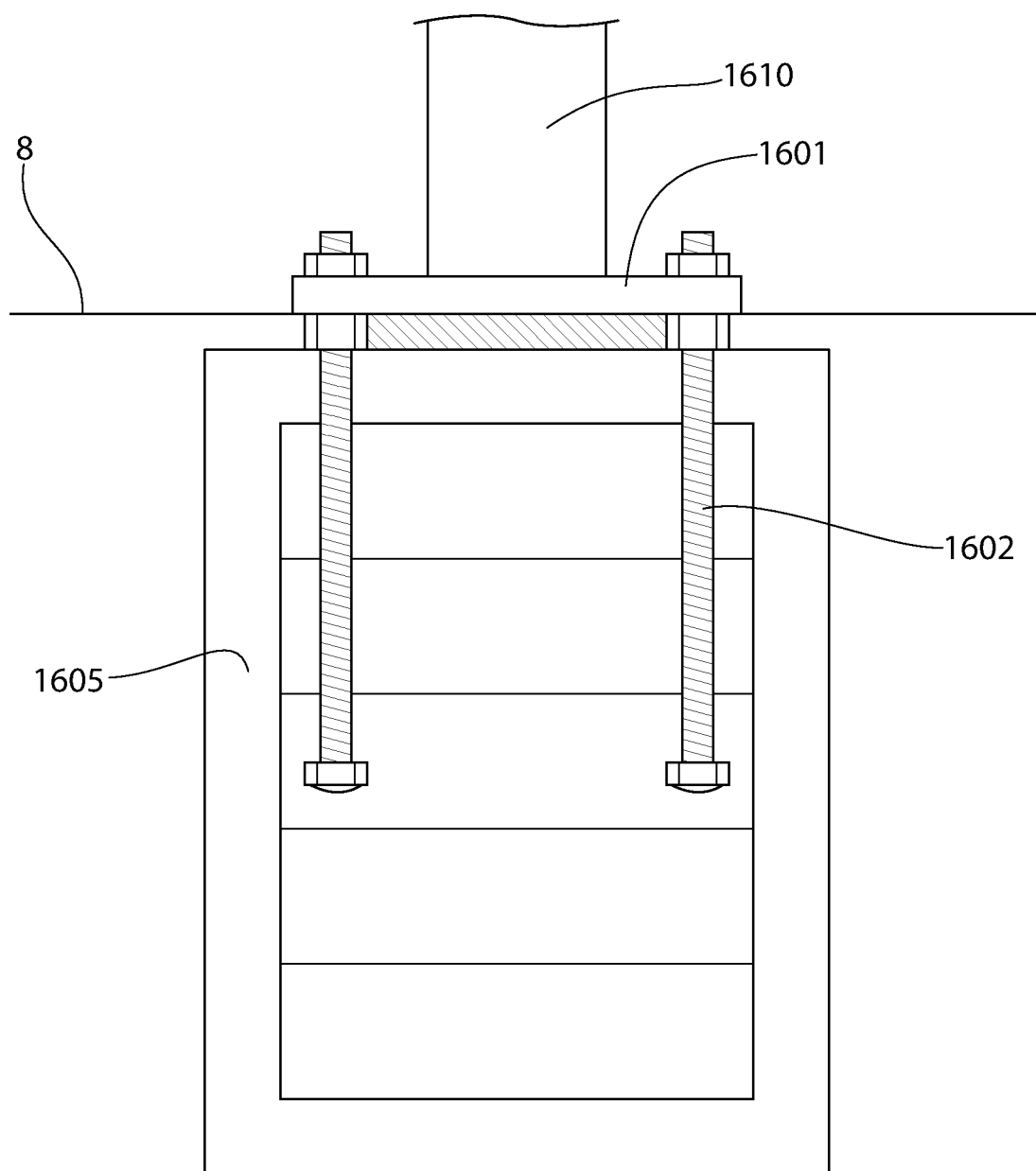
FIG. 14 is a close-up view of region XIV of FIG. 13.
Figure 15:
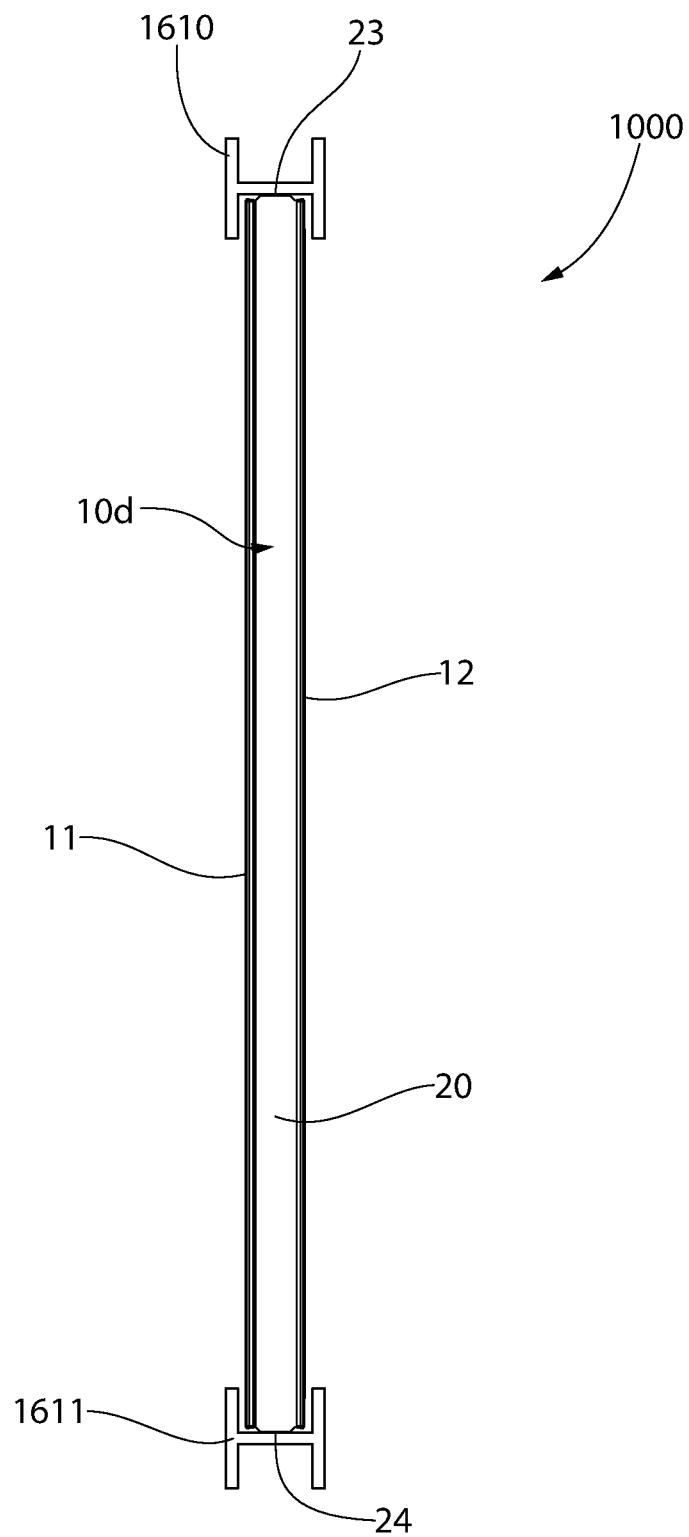
FIG. 15 is a top view of the acoustic wall of FIG. 11.

Referring now to FIGS. 13 and 14, the acoustic wall 1000 may be secured to into a ground 8 by one or more fasteners 1602 extending from the base section 1601 of each vertical support 1610, 1611, 1612, 1613 into a foundation element 1605. The foundation element 1605 may be a poured concrete body, a steel body—such as a steel base.

Referring now to FIGS. 17-20, the present invention further includes an acoustic wall 2000 comprising a plurality of the building panels 10a, 10b, 10c, 10d, etc. in a horizontally oriented configuration. The acoustic wall 2000 of the present invention may comprise a vertical support 2600 comprising at least a first vertical support 2610 and a second vertical support 2611. Non-limiting examples of the first and second vertical support 2610, 2611 include I-beams. Each of the first and second vertical supports 2610, 2611 may comprise a base section 2601 located at the bottom of each of the first and second vertical supports 2610, 2611. In a non-limiting example, the base section 2601 may be a plate structure extending substantially perpendicular to the I-beam.

The acoustic wall 2000 includes at least a first building panel 10a and a second building panel 10b, whereby the second building panel 10b at least partially overlaps in a horizontal direction to the first building panel 10a, thereby creating a horizontally oriented array of first and second building panels 10a, 10b. The acoustic wall 2000 may further comprise a third building panel 10c, a fourth building panel 10d, and etc. arranged in the horizontally oriented array.

In a non-limiting example, the first and second sides 21, 22 of a first building panel may contact the first and second sides 21, 22 of an adjacent horizontally overlapping building panel 10. In such arrangement, the third and fourth sides 23, 24 of each building panel may extend between the first and second vertical supports 1610, 1611.

Each of the first major exposed surfaces 11 of the building panels may face the same direction—i.e., a first direction. Each of the second major exposed surfaces 12 of the building panels may face the same direction—i.e., a second direction. According to the present invention, the first direction faces a noise source such that the vented portions 30 of the first major exposed surfaces 11 may face the noise source, thereby helping to reduce the perceivable amount of sound when located adjacent to the second exposed major surface 12 as less sound may penetrate through the wall and extend the second direction. Additionally, in having the vented portions 30 of the first major exposed surfaces 11 face the noise source, the perceivable amount of sound may also be reduced for an observed located adjacent to the first exposed major surfaces 11, as the vented portion helps reduce the amount of sound that bounces back in the first direction.

Figure 18:
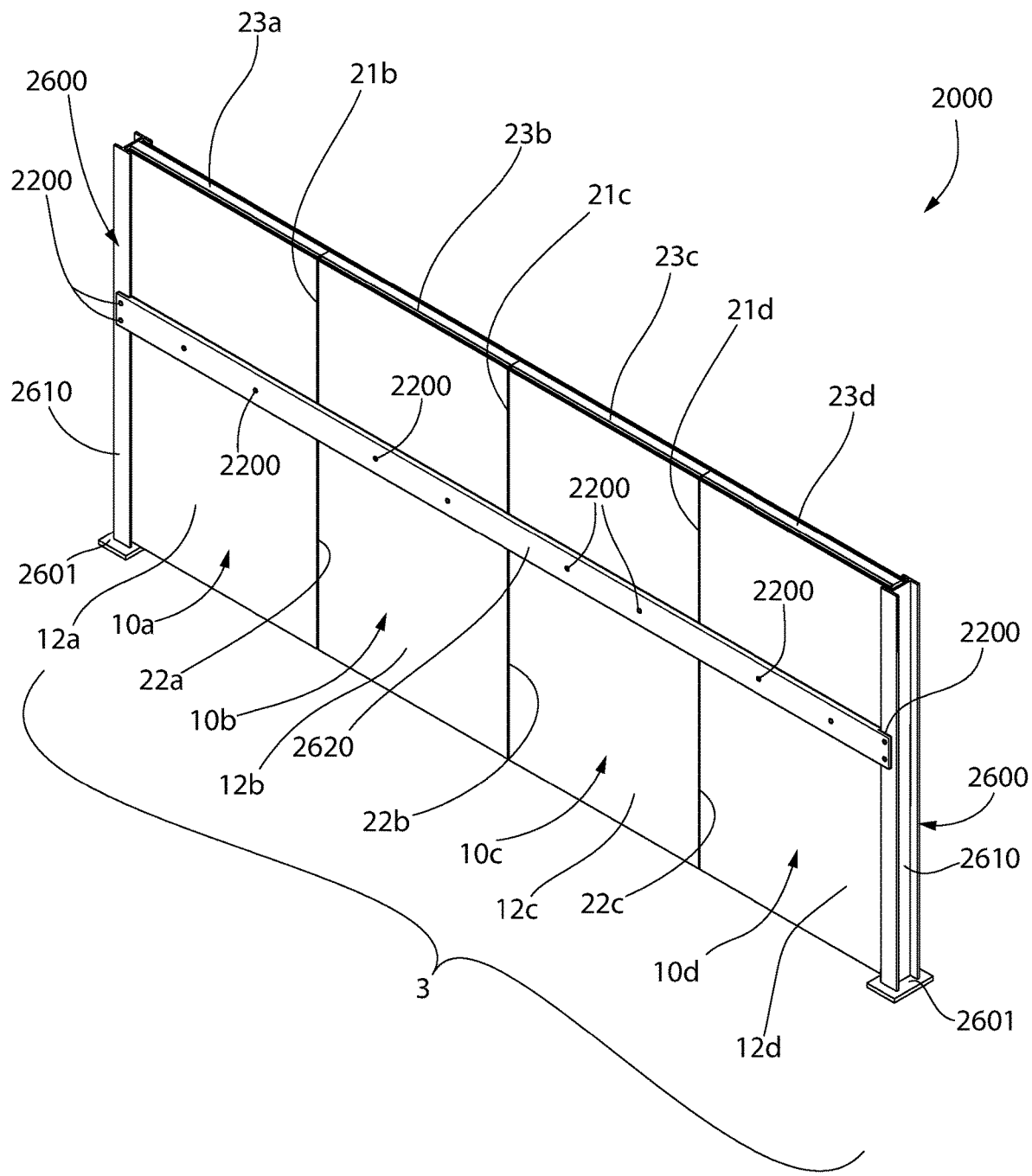
FIG. 18 is a rear perspective view of an acoustic wall according to FIG. 17.
Figure 19:
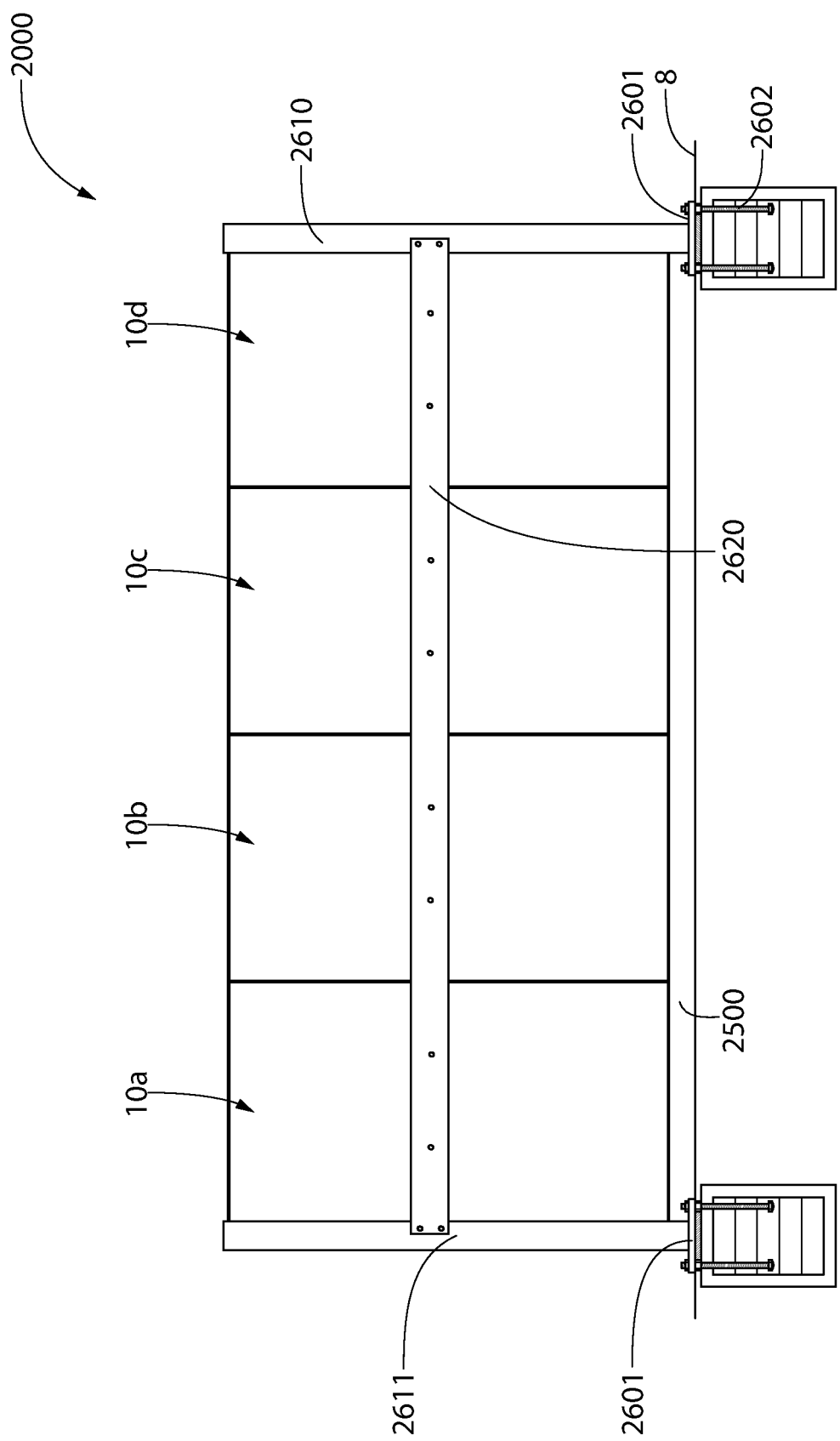
FIG. 19 is rear view of the acoustic wall according to FIG. 17.
Figure 20:
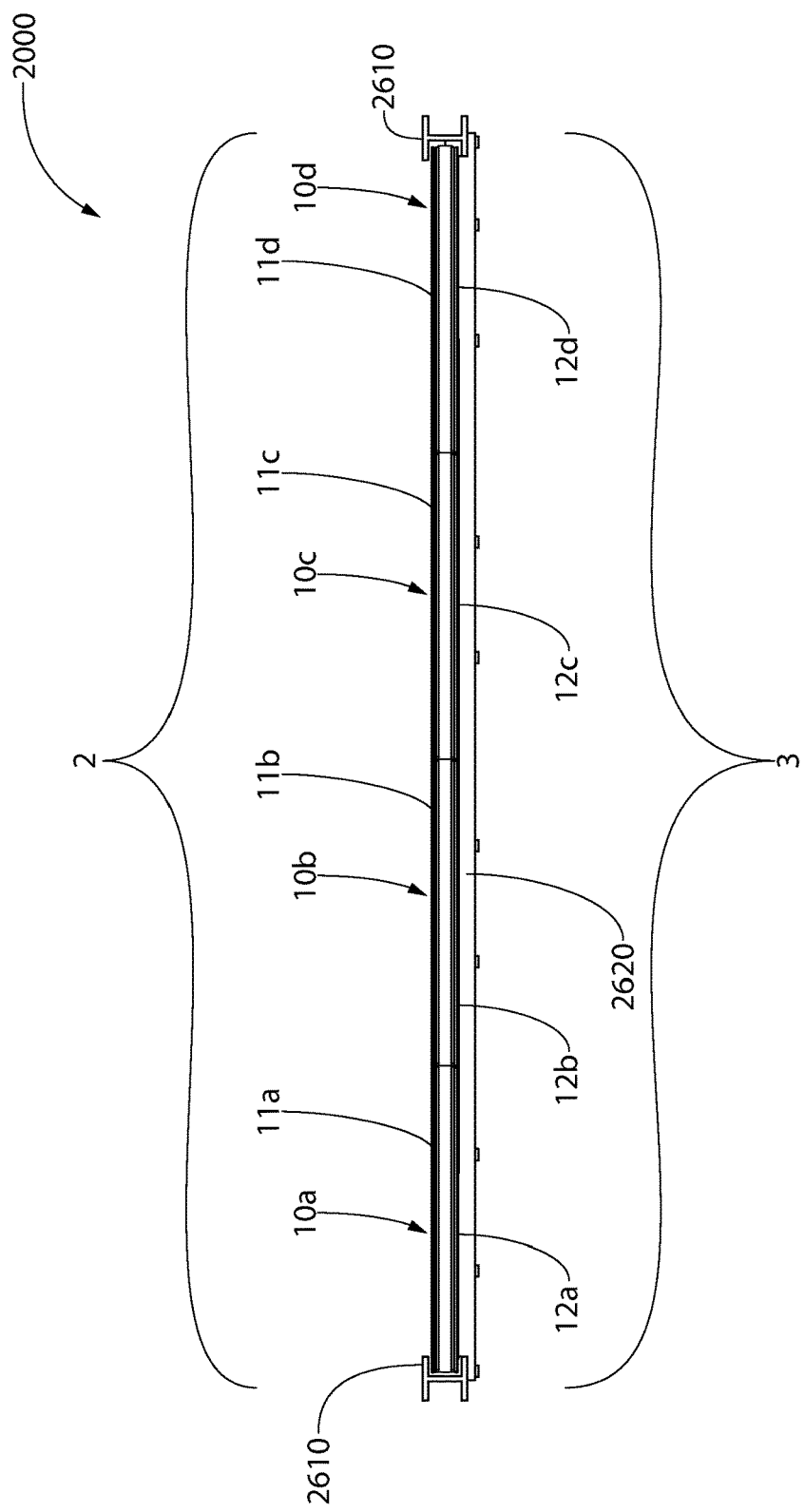
FIG. 20 is a top view of the acoustic wall of FIG. 17.
Figure 21:
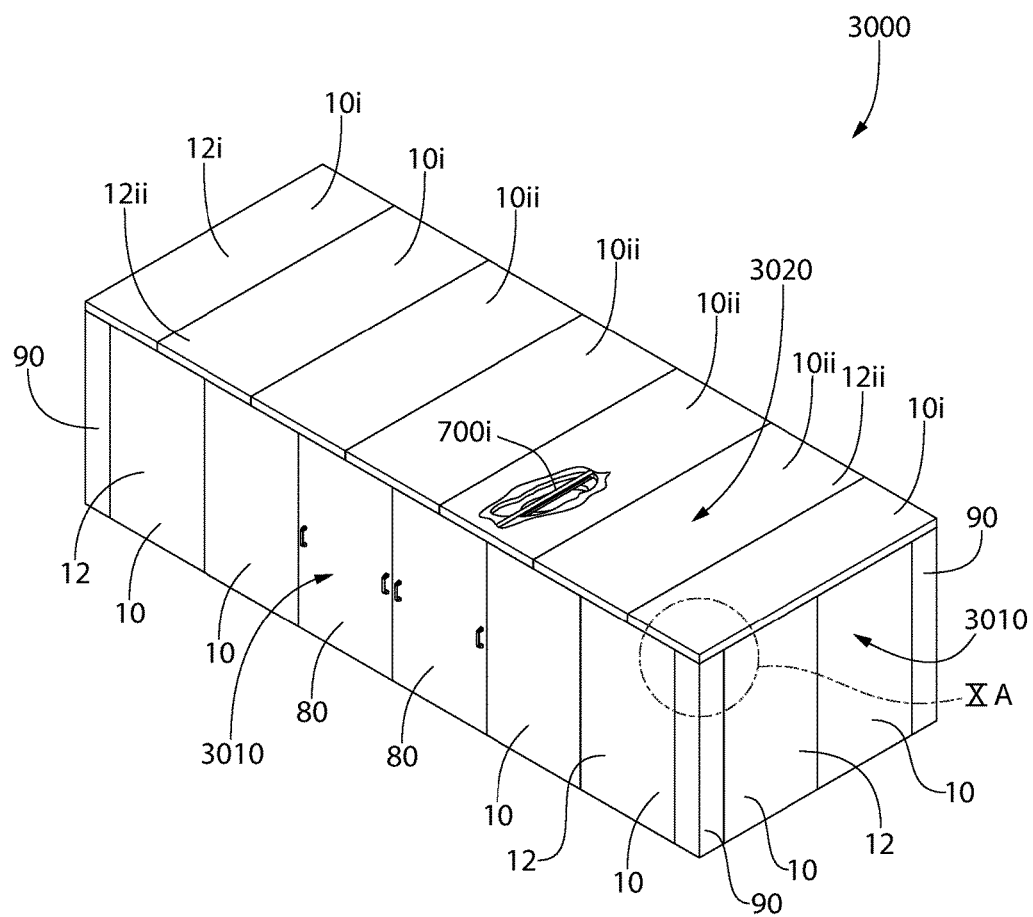
FIG. 21 is a top perspective view of an acoustic enclosure according to another embodiment of the present invention—including an exploded portion revealing the interior of an acoustic panel.
Figure 22:
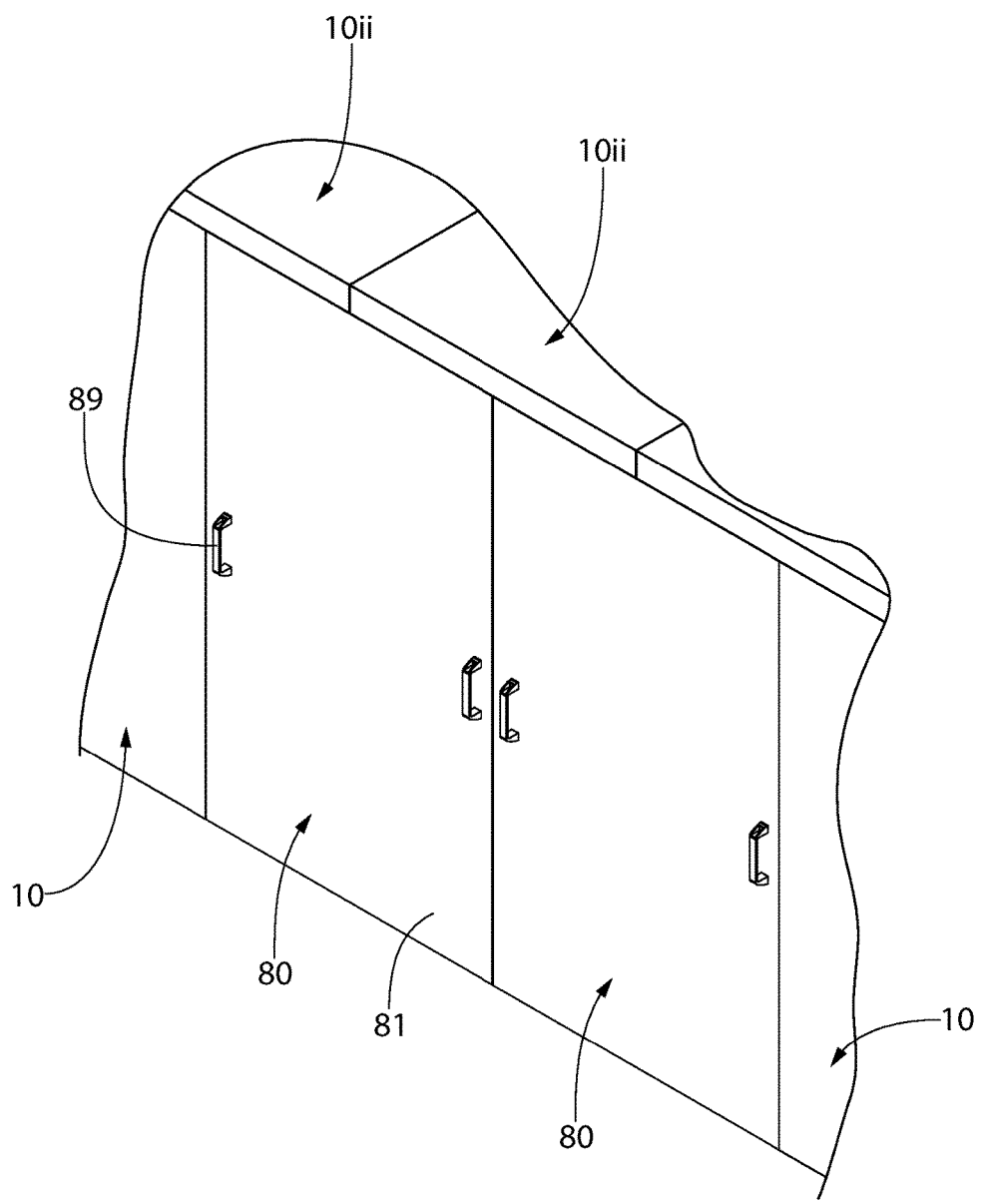
FIG. 22 is a close-up view of the acoustic enclosure according to FIG. 21.
Figure 23:
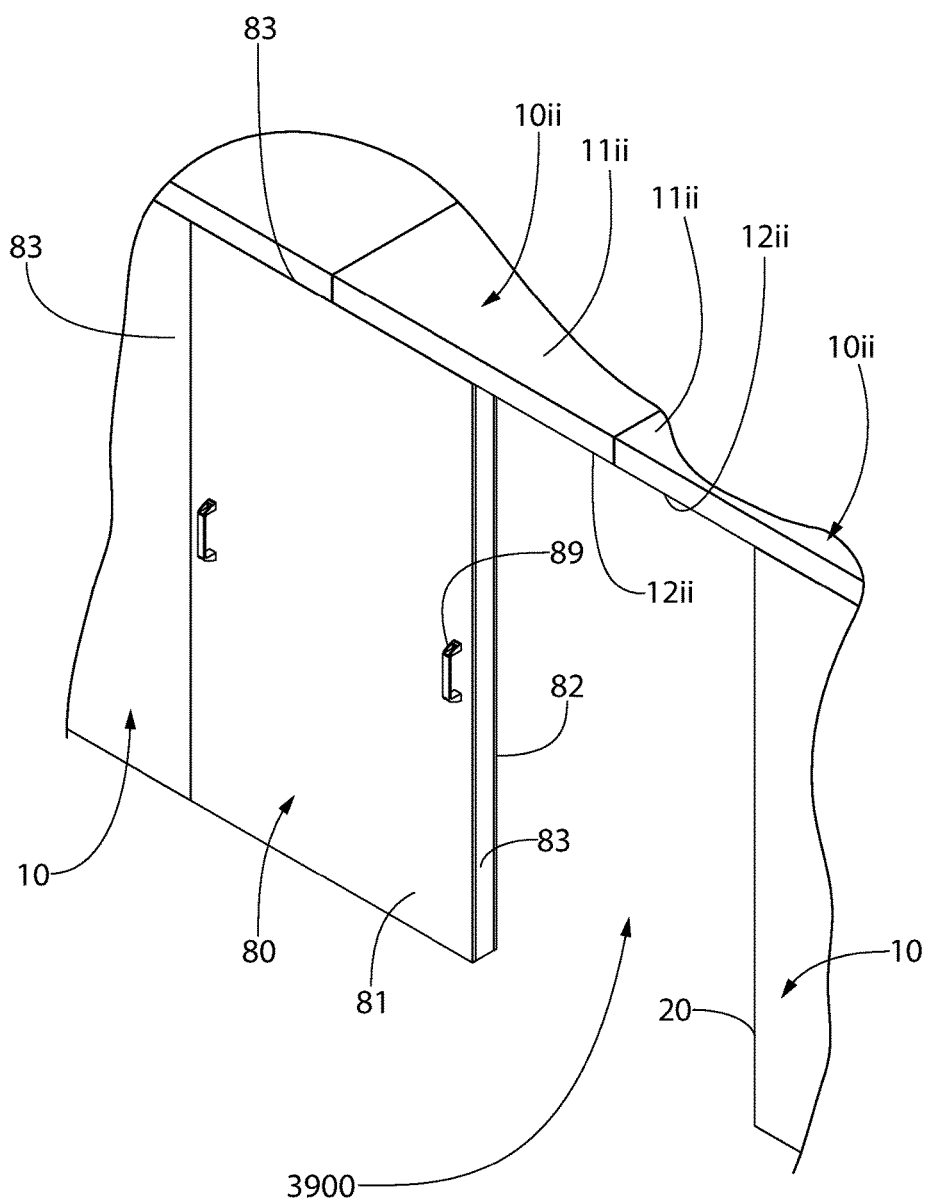
FIG. 23 is a close-up view of the acoustic enclosure according to FIG. 21 with an access door removed.
Figure 24:
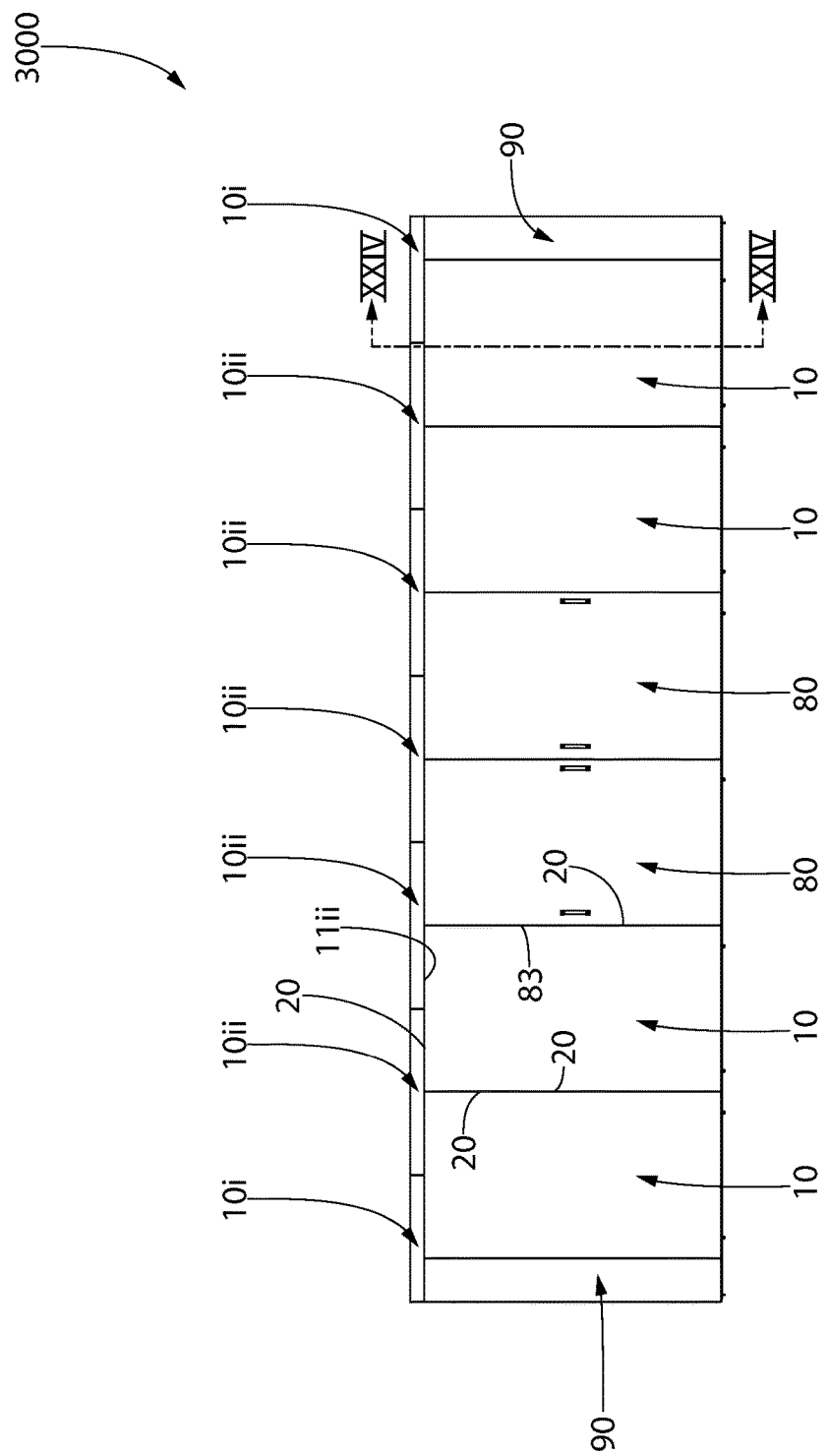
FIG. 24 is a side view of the acoustic enclosure according to FIG. 21.
Figure 25:
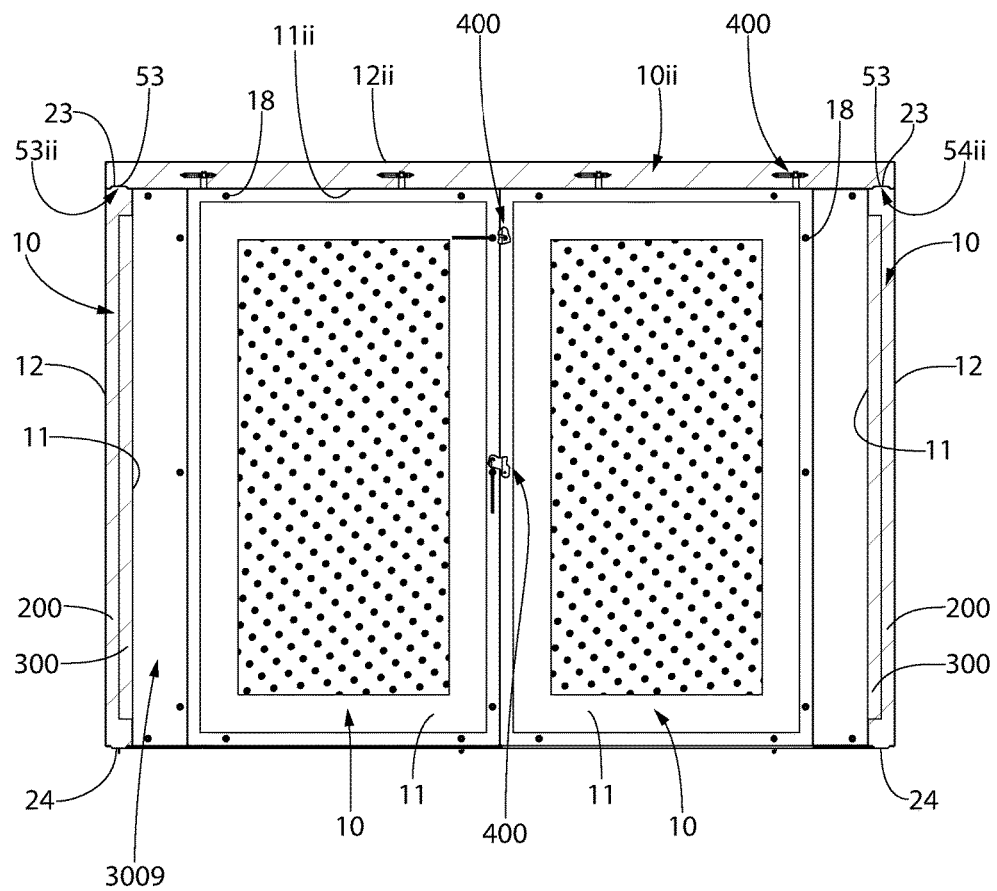
FIG. 25 is a cross-sectional view of the enclosure along line XXIV-XXIV of FIG. 24.
Figure 26:
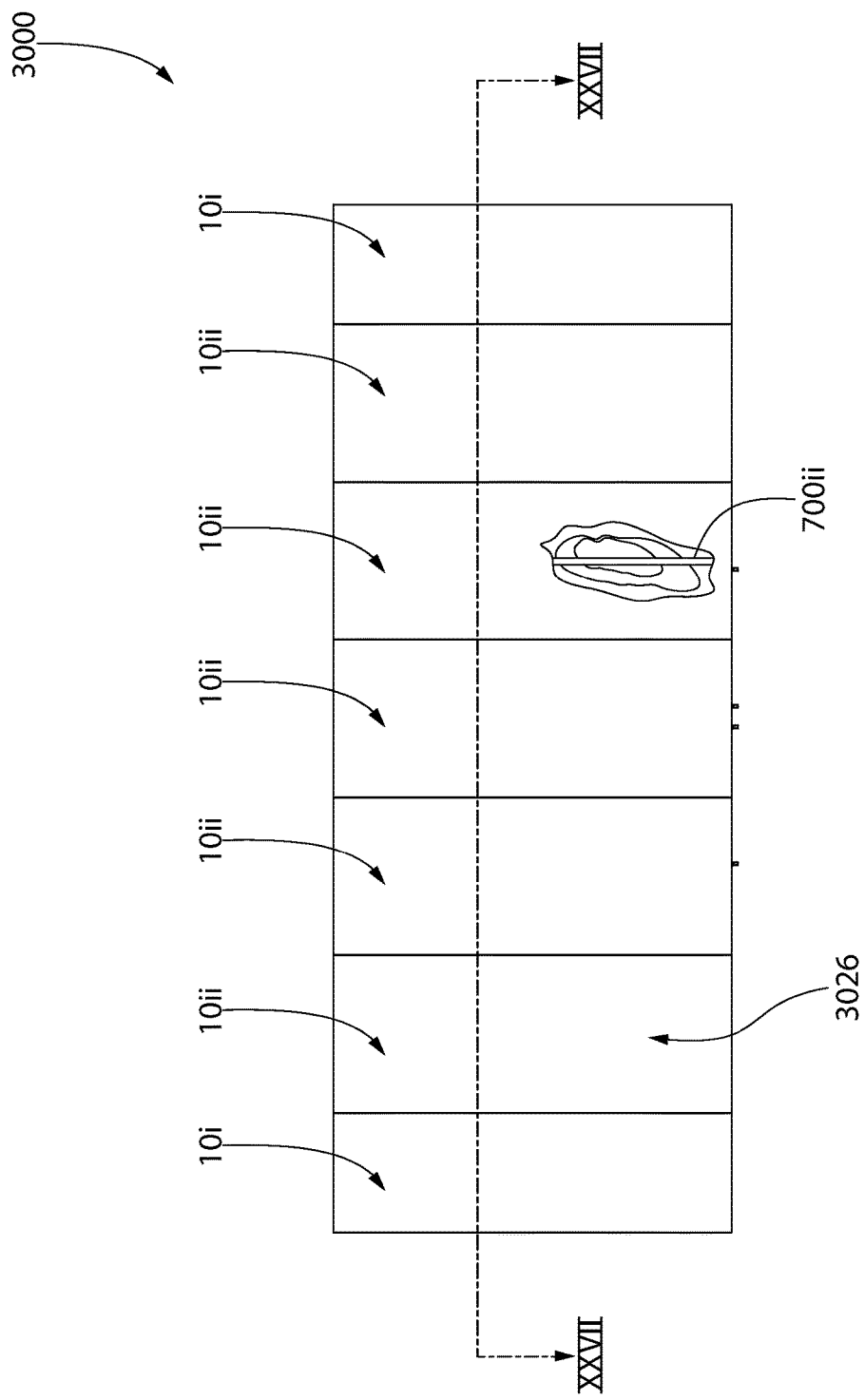
FIG. 26 is a top view of the acoustic enclosure according to FIG. 21 including an exploded portion of a single middle building panel.
Figure 27:
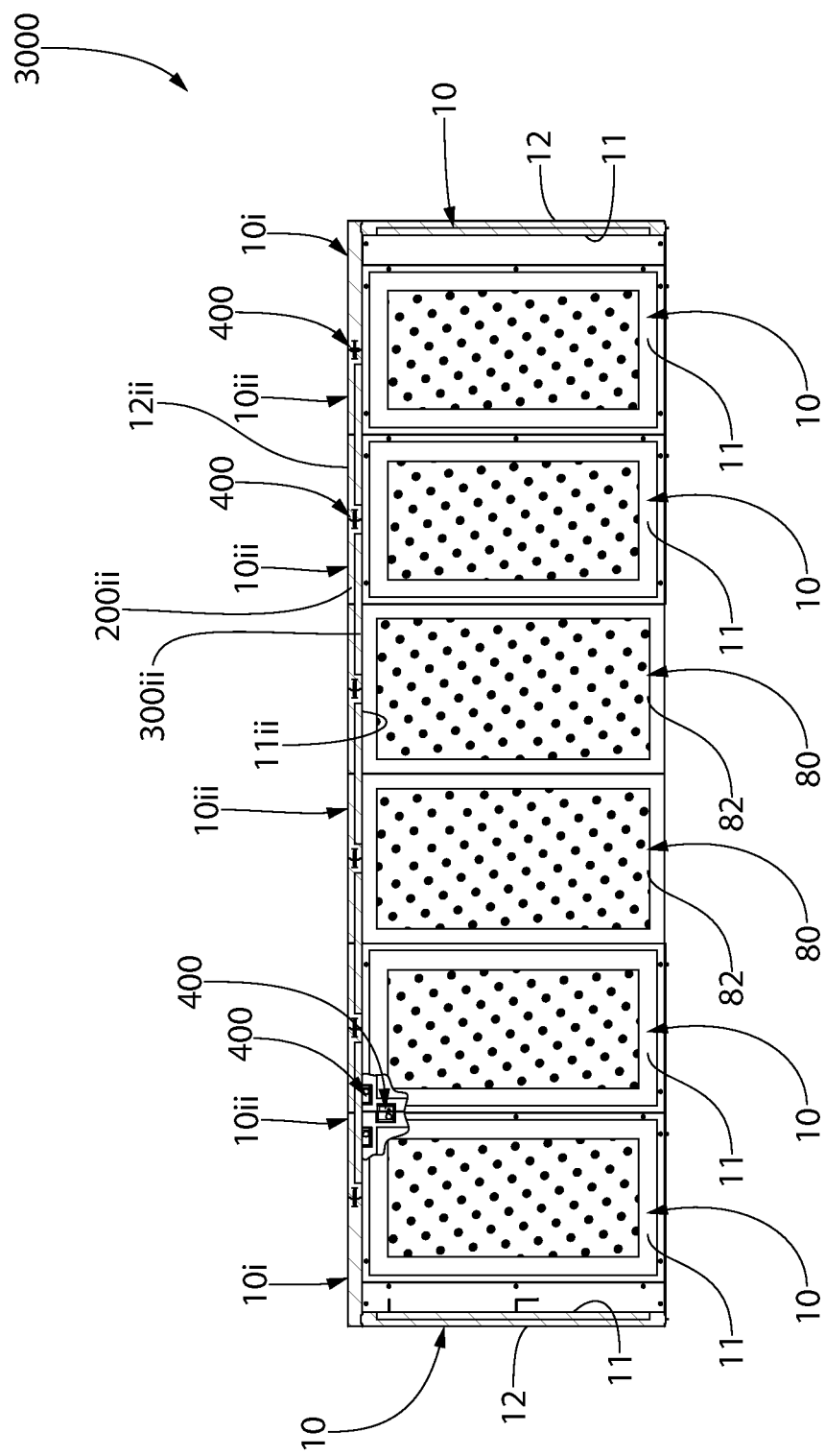
FIG. 27 is a cross-sectional view of the enclosure along line XXVII-XXVII of FIG. 26.

Referring now to FIG. 18, the acoustic wall 2000 may further comprise a horizontal support structure 2620 that extends horizontally and at least partial spans a first and second building panel 10a, 10b. The horizontal support structure 2620 may be a plate formed of metal, whereby the plate is secured to the second exposed major surface 12 of the building panels by one or more fasteners 2200. The horizontal support structure 2620 may also be secured to at least one of the first and/or second vertical supports 2610, 2611.

The horizontal array acoustic wall 2000 may be secured to the ground 8 in the same manner as previously described with respect to the vertically stacked acoustic wall 1000. In some embodiments, the acoustic wall 2000 may further comprise a U-channel 2500 that at least partially spans the distance between the first and second vertical supports 2610, 2611, whereby the fourth side surfaces (or third side surfaces) of each building panel 10 nests within the U-channel 2500 to help give the acoustic wall 2000 further support.

The acoustic walls 2000, 3000 according to the present invention may comprise a louvred cover on the first exposed major surface 11 of the building panels.

Referring now to FIGS. 21-27, the present invention further provides an acoustical enclosure 3000 formed from a plurality of building panels 10, 10i, 10ii according to the present invention. In a non-limiting example, the acoustical enclosure 3000 of the present invention may be suitable for fully or partially enclosing a noise generating device (e.g., a compressor, a generator, a pump, etc.) or may be suitable for creating a climate-controlled enclosure (e.g., a walk-in freezer). In such embodiments, the first exposed major surfaces 11 of each building panel 10, 10i, 10ii may face in the interior of the enclosure 3900 (also referred to as an internal cavity 3900 of the enclosure), and the second exposed major surface 12 of each building panel 10 may form the exterior surface of the enclosure 3000.

The building panels 10i and 10ii used to form the enclosure are illustrated in accordance with another embodiment of the present invention. The building panels 10i and 10ii are similar to the building panel 10 except as described herein below. The description of the building panel 10 above generally applies to the building panels 10i and 10ii described below except with regard to the differences specifically noted below. A similar numbering scheme will be used for the building panels 10i and 10ii as with the building panel 10 except that the (i) and (ii) suffix will be used.

The acoustic enclosure 3000 of the present invention may be formed from a plurality of wall structures 3010 and a ceiling structure 3020. The ceiling structure 30210 may be coupled to the ceiling structure 3020

Each wall structure 3010 comprises a bottom portion 3011 and an upper portion 3012. Each wall structure 3010 may be formed by one or more of the building panels 10 coupled together in a locked state. The ceiling structure 3020 may be formed by one or more of the building panels 10i, 10ii coupled together in a locked state. The ceiling structure 3020 comprises an upper face opposite a lower face 3021. The lower face 3021 of the ceiling structure may mate with the upper portion 3012 of the wall structure 3010. The third and/or fourth sides of the building panels 10 may at least partially form the upper and bottom portions 3011, 3012 of the wall structure.

Figure 28:
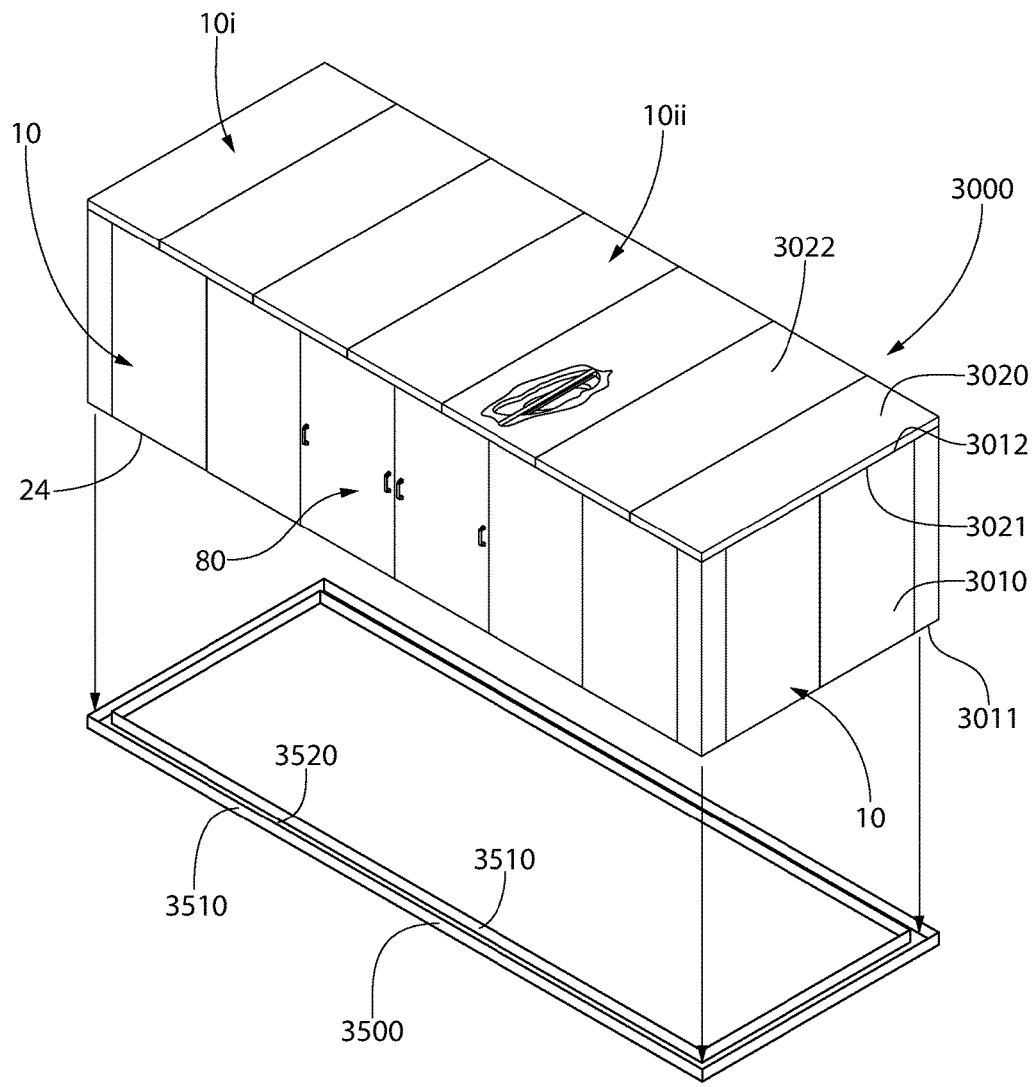
FIG. 28 is a top perspective view of an acoustic enclosure according to another embodiment of the present invention—including an exploded portion revealing the interior of an acoustic panel.
Figure 29:
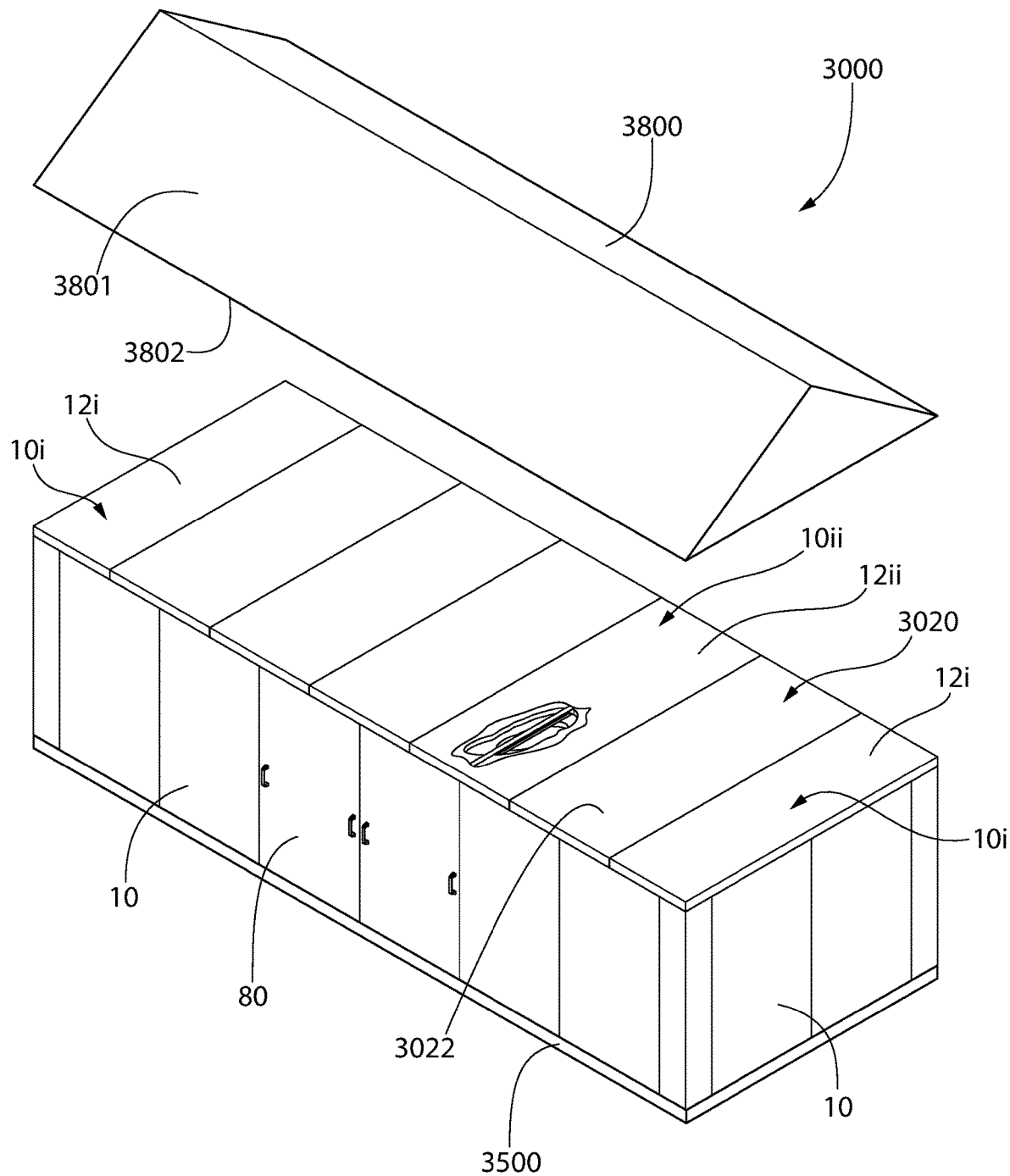
FIG. 29 is a top perspective view of an acoustic enclosure according to another embodiment of the present invention—including an exploded portion revealing the interior of an acoustic panel.
Figure 31:
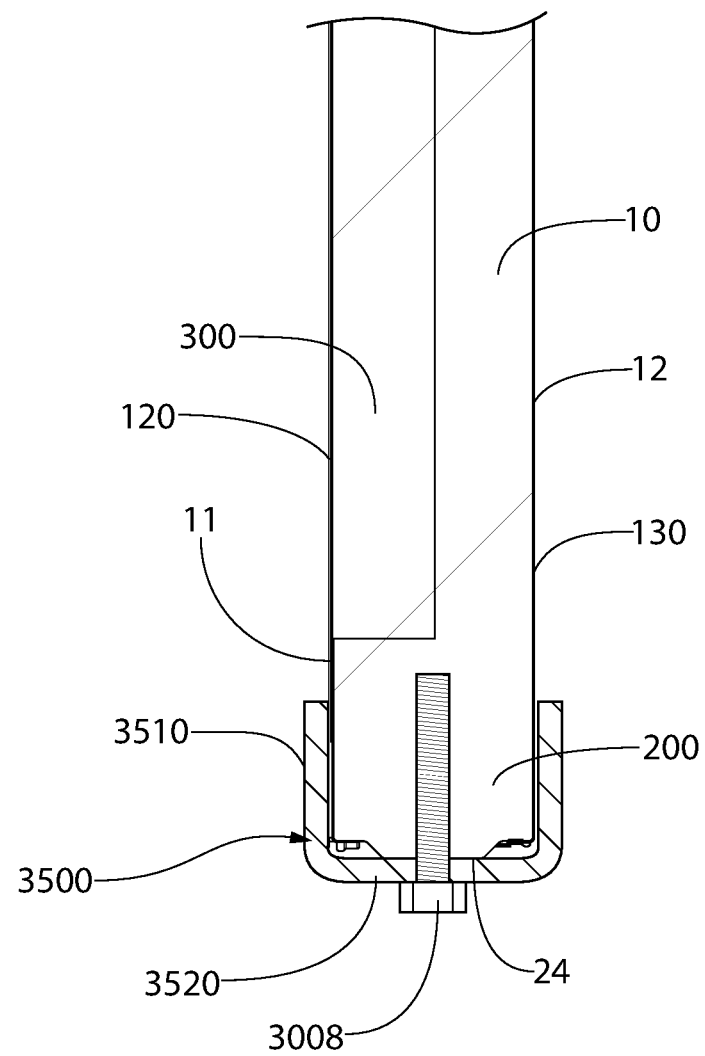
FIG. 31 is a cross-sectional view of the acoustic enclosure along line XXXI-XXXI of FIG. 30.
Figure 32:
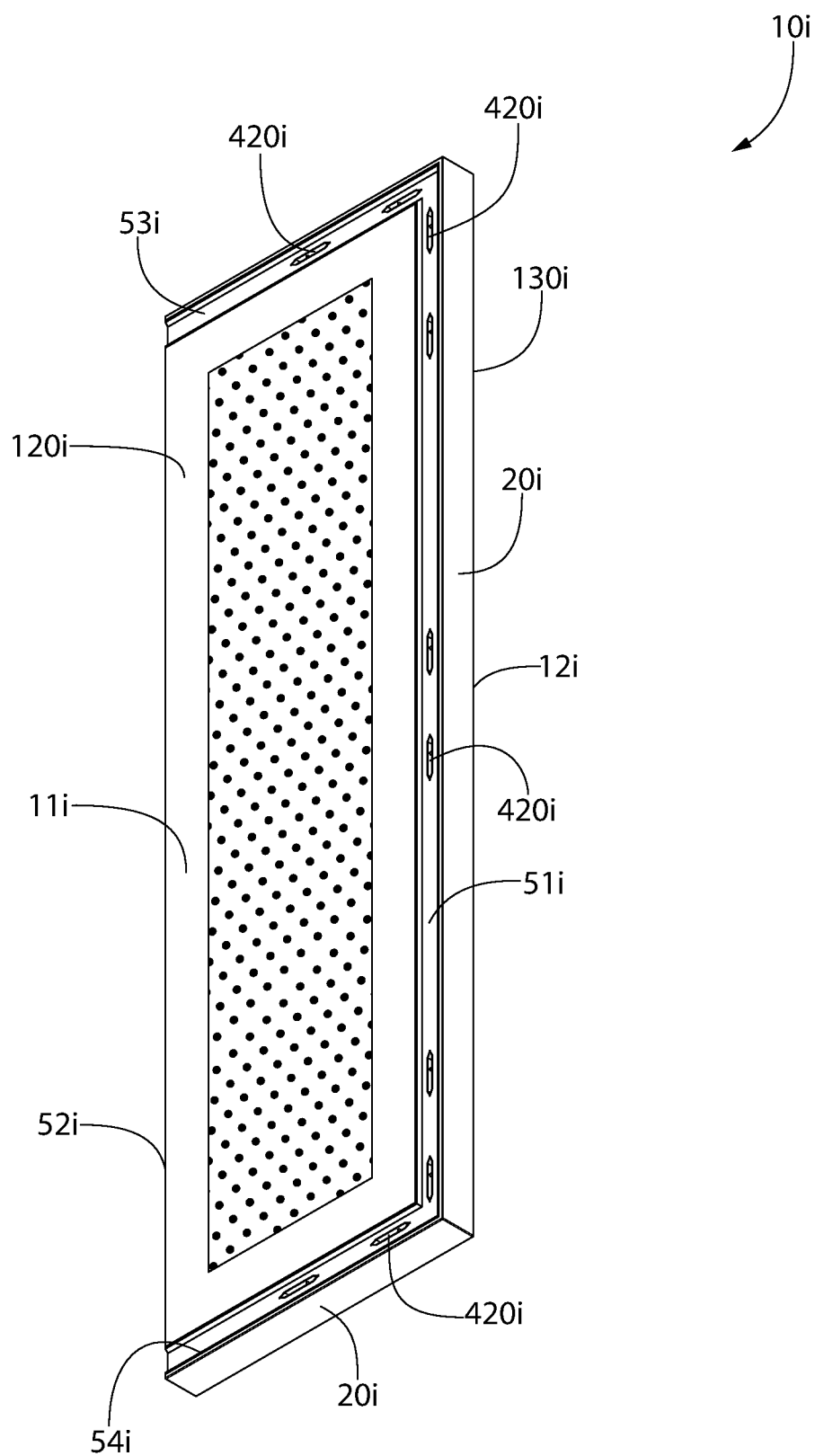
FIG. 32 is front perspective view of an acoustic structural panel according to another embodiment of the present invention.
Figure 33:
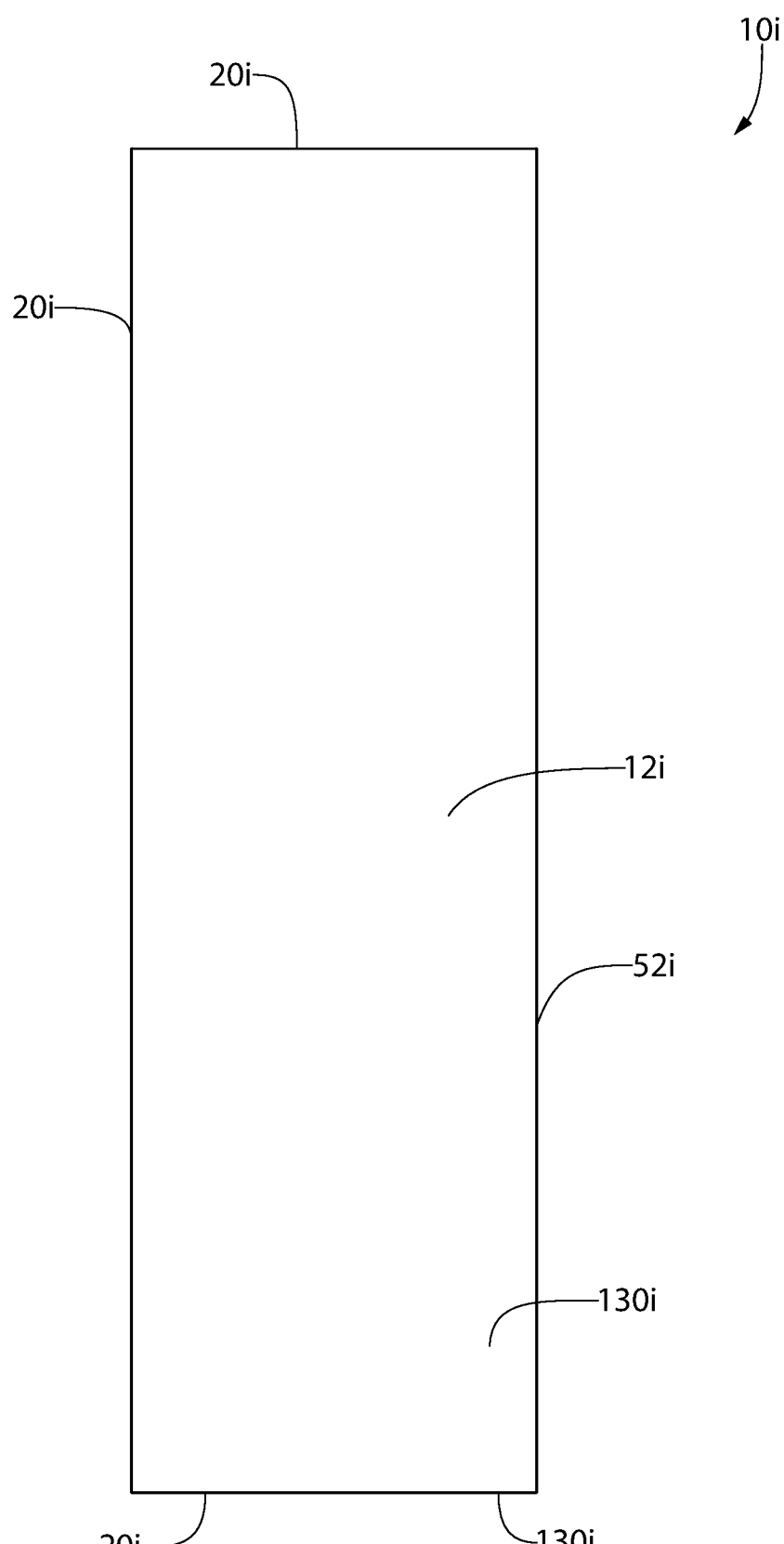
FIG. 33 is rear view of the acoustic structural panel according to FIG. 32.
Figure 34:
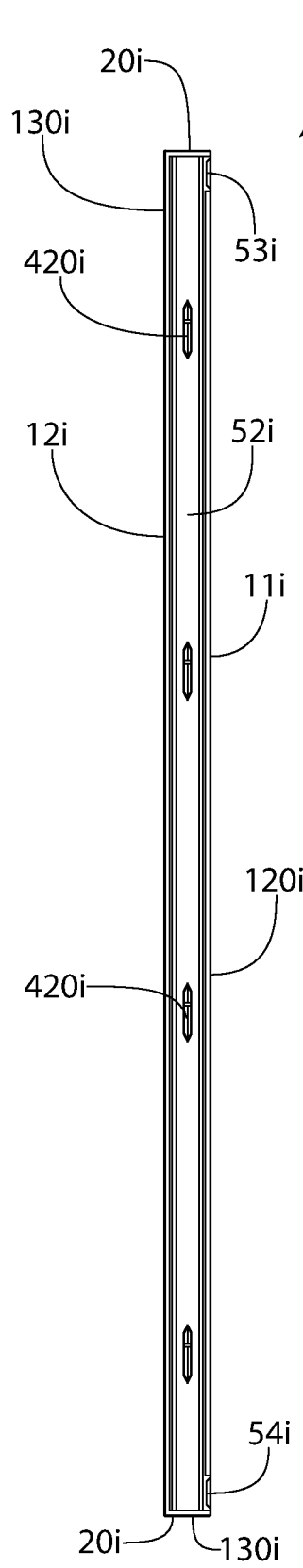
FIG. 34 is side view of the acoustic structural panel according to FIG. 32.
Figure 35:
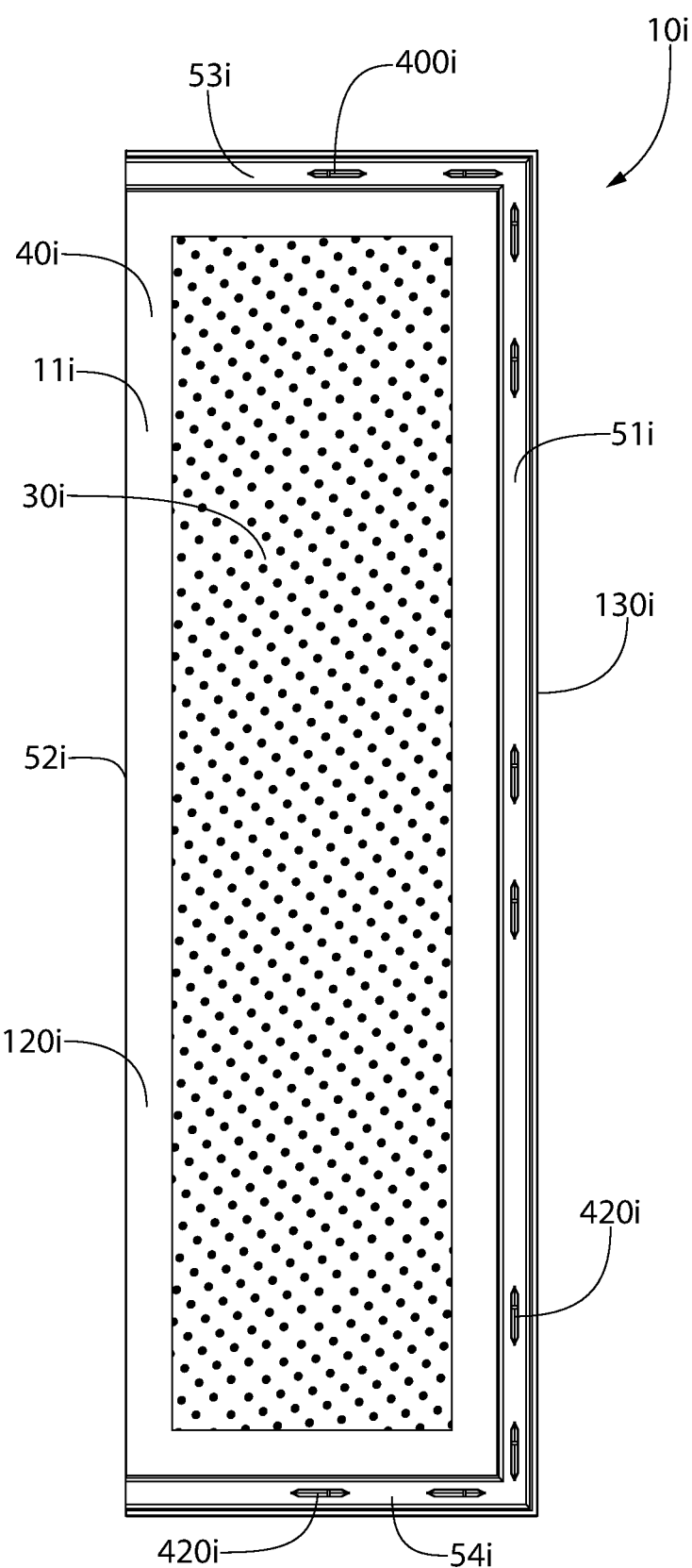
FIG. 35 is front view of the acoustic structural panel according to FIG. 32.
Figure 36:
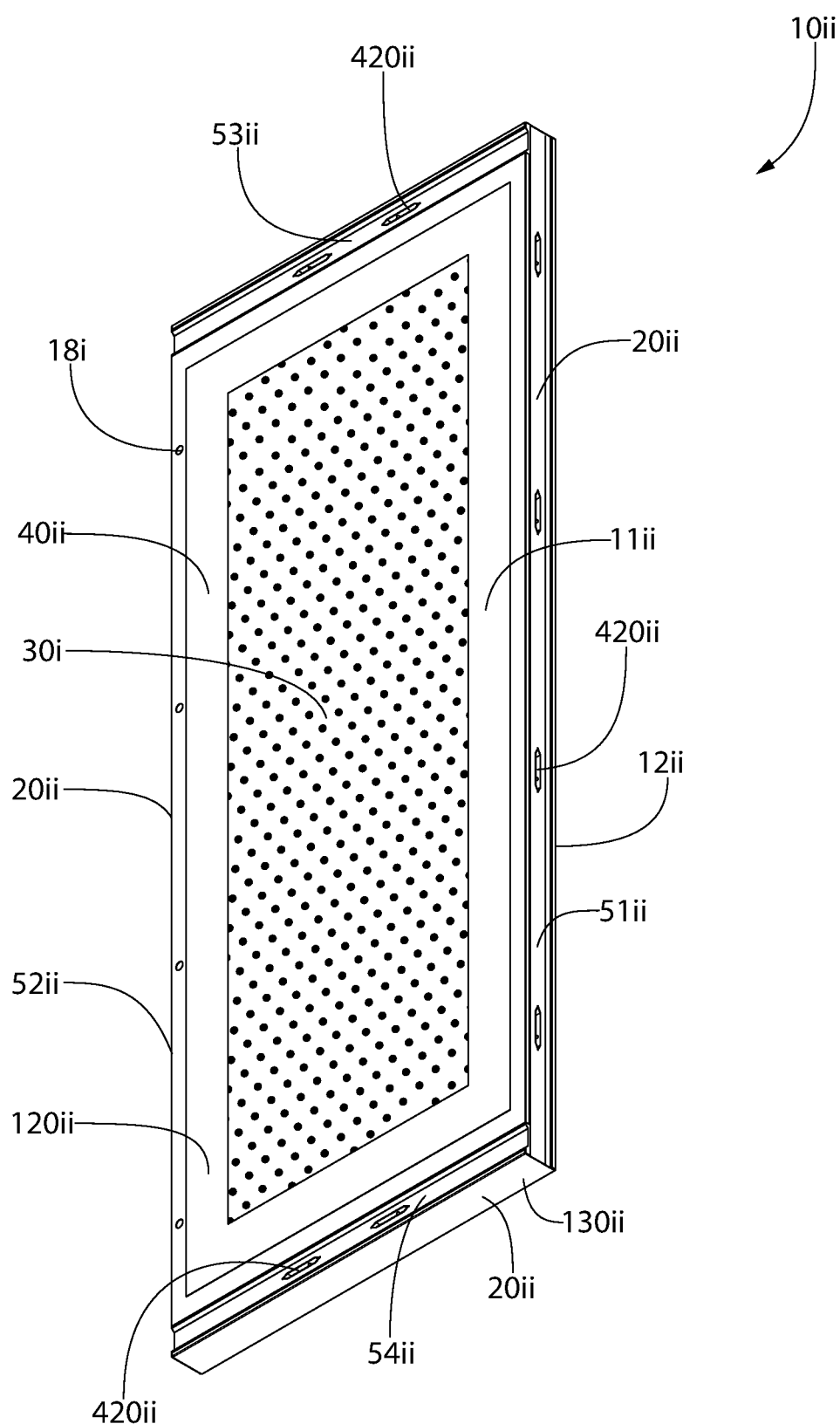
FIG. 36 is front perspective view of an acoustic structural panel according to another embodiment of the present invention.
Figure 37:
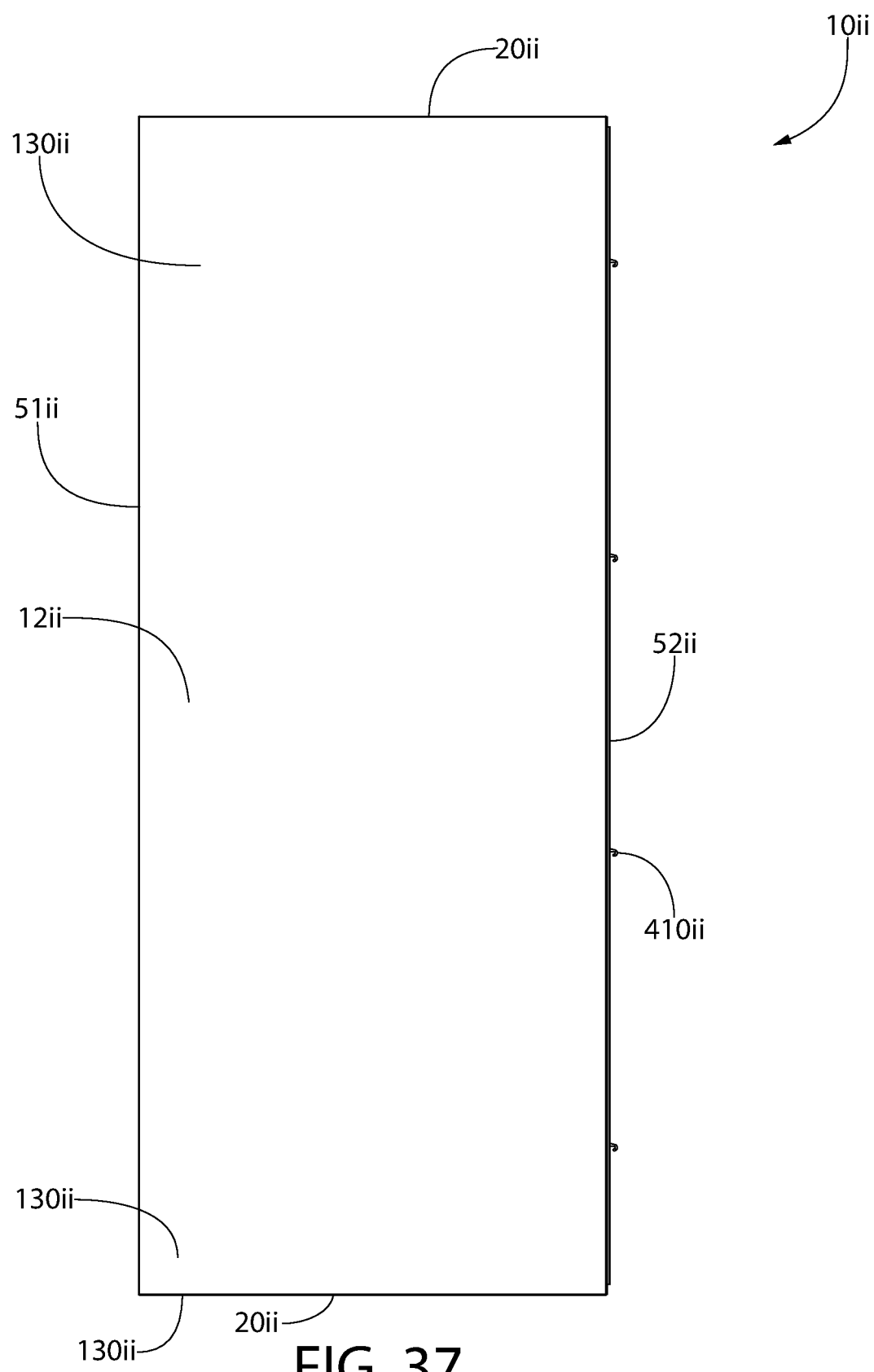
FIG. 37 is rear view of the acoustic structural panel according to FIG. 36.
Figure 38:
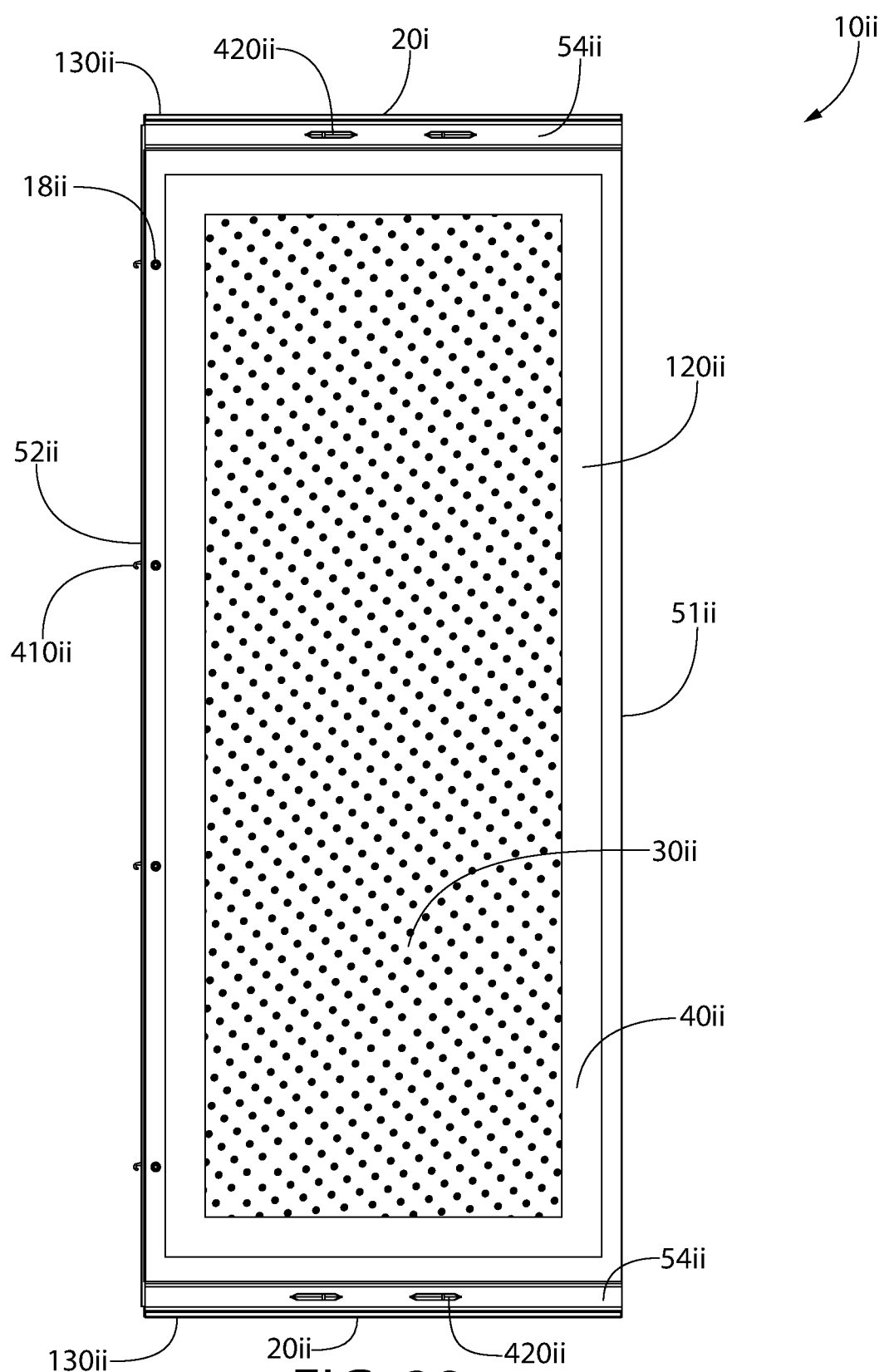
FIG. 38 is side view of the acoustic structural panel according to FIG. 36.
Figure 39:
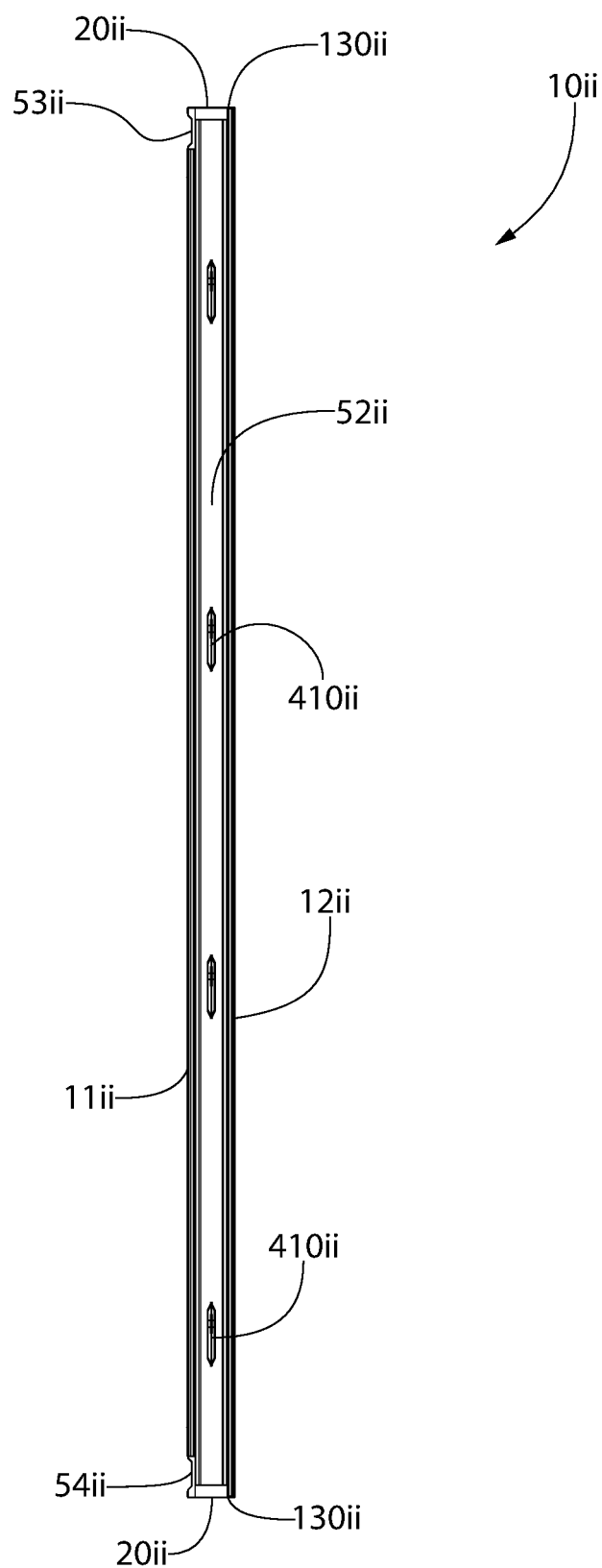
FIG. 39 is front view of the acoustic structural panel according to FIG. 36.
Figure 40:
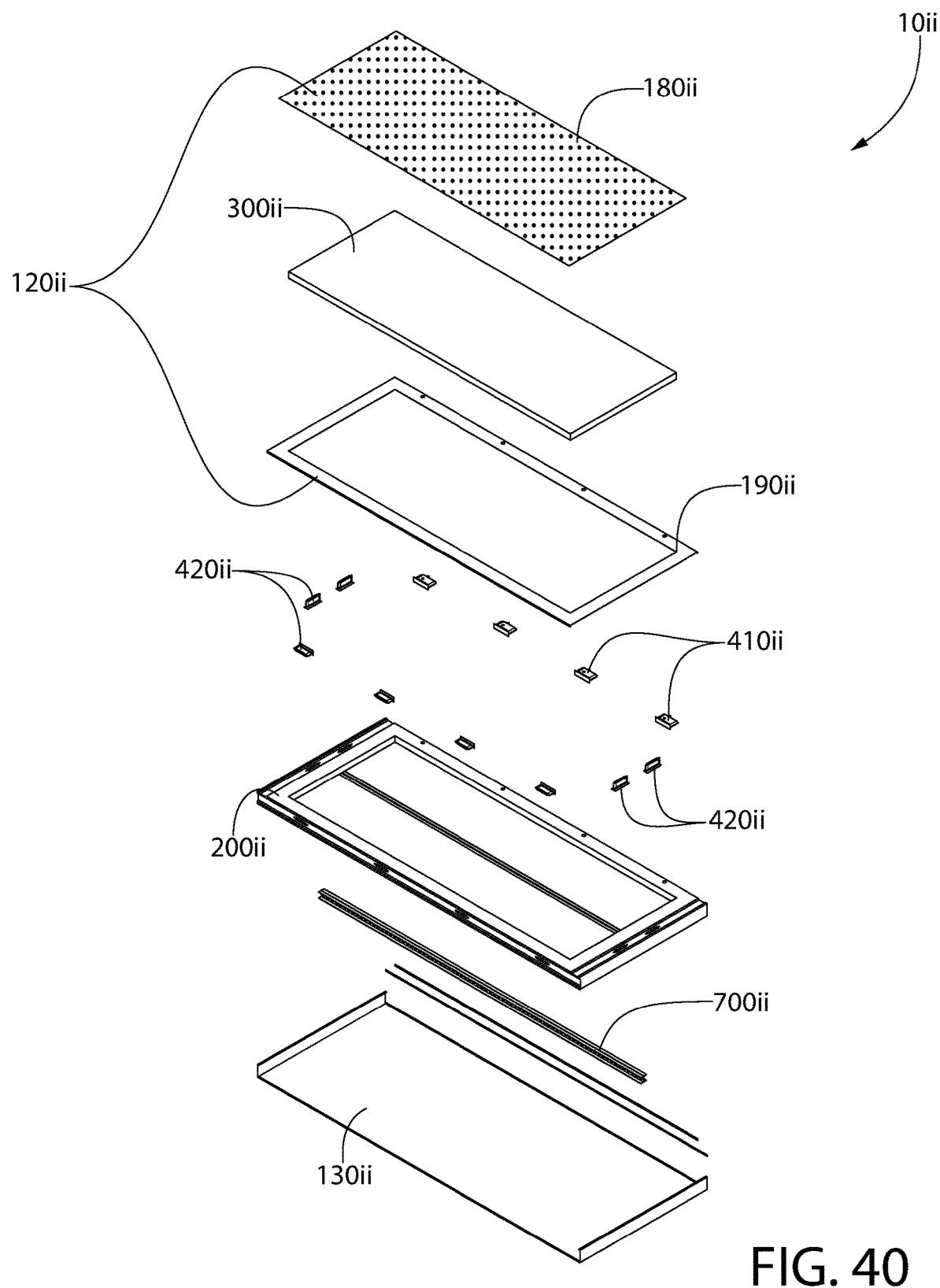
FIG. 40 is an exploded perspective view of the acoustic structural panel of FIG. 36.
Figure 41:
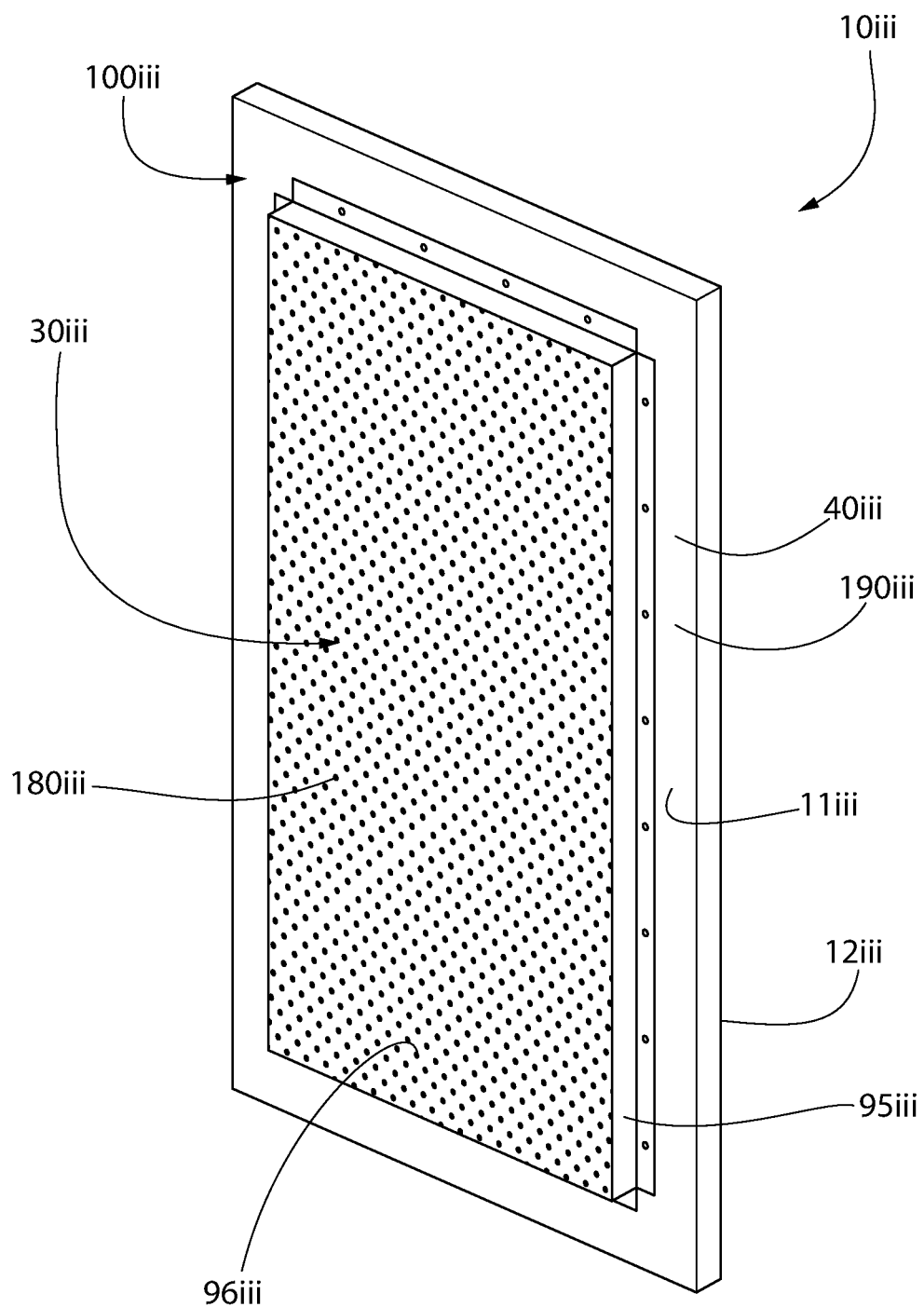
FIG. 41 is front perspective view of an acoustic structural panel according to another embodiment of the present invention.

Referring now to FIGS. 28, 29, and 31, the acoustic enclosure 3000 may further comprise one or more U-channels 3500. The U-channel 3500 may have a floor 3520 and two upstanding walls 3510 that define groove. The bottom portions 3011 of the wall structures 3010 may be inserted into the grooves of the U-channels 3500, thereby further stabilizing the acoustic enclosure 3000. One or more fasteners 3008 (e.g., bolt) may be drilled through the underside of the U-channel floor 3520 into the foam layer 200 of the building panel 10 to stabilize the building panel 10 in place.

Although not pictured, in other embodiments, a gasket or other sealing material may be located between the building panel 10 and the U-channel 3500 to form a water-tight seal therebetween. The bottom portions 3011 of the wall structure may also comprise an overhang extending out and below the upper edge of the upstanding wall of the U-channel, thereby to divert liquid away from the groove of the U-channel 3500/

Together, the wall structures 3010 and the ceiling structure 3020 define an internal cavity 3900, whereby the first exposed major surface 11, 11i, 11ii of each building panel 10, 10i, 10ii faces the cavity 3900. The first exposed major surfaces 11i, 11ii of each building panel 10i, 10ii may form the lower face 3021 of the ceiling structure 3020. According to the present invention one or more noise generating machines may be housed by the acoustic enclosure, whereby the noise generating machine is located in the cavity 3900 and surrounded by the wall structures 3010 and the ceiling structure 3020.

Each of the acoustic wall structures may be connected together by a corner panel 90. The corner panels 90 may form an L-shaped vertical panel have a first and second major edge configured to mate with one of the interlocking profiles 50 of the building panel 10.

The cavity 3900 may be accessible via one or more access panels 80 (also referred to as an access door 80). The access panel 80 may be located between two building panels 10 or between a building panel 10 and a corner panel 90 (not pictured). The access panels 80 may comprise control element 89 for a user to remove or install the access panel 80 into the enclosure 3000. Non-limiting examples of control elements 89 include a handle, a knob, a lever, a push bar, a pull bar, and the like.

The access panel 80 comprises an inner surface 82 that is opposite an outer surface 81 and a side surface 83 extending there-between. The side surface 83 of the access panel 80 may comprise an interlocking profile 50 configured to mate with one of the interlocking profiles 50 of the building panels 10 of the wall structure 3010 and/or the interlocking profiles 50$i$, 50$ii$ of the building panels 10$i$, 10$ii$ of the ceiling structure 3020. The access panel 80 may comprise a foam layer and fibrous layer as described with respect to the building panel 10 of the present invention. In other embodiments, the access panel may comprise only the foam layer, whereby no fibrous layer is present in the access panel 80.

Referring now to FIGS. 24-27 and 32-40, the ceiling structure 3020 may be formed from at least one end building panel 10$i$ and at least one middle building panel 10$ii$.

Referring now to FIGS. 36-40 in particular, the middle building panel 10$ii$ may comprise a plurality of interlocking profiles 50. Specifically, the side surfaces 20$ii$ of the middle building panel 10$ii$ may comprise a first interlocking profile 51$ii$ and a second interlocking profile 52$ii$ that is arranged opposite from the first interlocking profile 51$ii$. The first interlocking profile 51$ii$ and the second interlocking profile 52$ii$ may be located on opposite sides of the longitudinal axis A-A of the middle building panel 10$ii$. In the exemplified embodiment, the first and second interlocking profiles 51$ii$, 52$ii$ are located on the first and second side surfaces of the middle building panel 10$ii$.

In the exemplified embodiment, the middle building panel 10$ii$ may have the first interlocking profile 51$ii$ may comprises a groove and the second locking feature 420$ii$. In the exemplified embodiment, the second interlocking profile 52$ii$ may comprise a tongue and the first locking feature 410$ii$. Under this configuration, a plurality of middle building panels 10$ii$ may be coupled together in an array to form at least a portion of the ceiling structure 3020, whereby the second interlocking profile 52$ii$ of a first middle building panel 10$ii$ is locked to the first interlocking profile 51$ii$ of a second middle building panel 10$ii$.

According to the present invention, the first and/or second side surfaces of the middle building panel 10$ii$ may each independently comprise a groove or a tongue as well as independently comprise the first or second locking feature 410$ii$, 420$ii$.

The difference in the middle building panel 10$ii$ as compared to the building panel 10 of the previous embodiments is that the first major exposed surface 11$ii$ may also comprise at least one interlocking profile 50. In the exemplified embodiment, the first major exposed surface 11$ii$ comprises a third interlocking profile 53$ii$ and a fourth interlocking profile 54$ii$. Specifically, the third and/or fourth interlocking profiles 53$ii$, 54$ii$ may be located on the first exposed major surface 11$ii$ of the middle building panel 10$ii$ adjacent to side surfaces 20$ii$. The third interlocking profile 53$ii$ and the fourth interlocking profile 54$ii$ may be located on opposite sides of the lateral axis B-B of the middle building panel 10$ii$. According to this embodiment, the third and/or fourth side surfaces may be formed by the shell 100—such as the second protective layer 130 of the shell 100. The first and second side surfaces may be at least partially formed by the foam layer 200.

In particular, the third interlocking profile 53$ii$ may be located on the first exposed major surface 11$ii$ of the middle building panel 10$ii$ and intersect the first and second interlocking profiles 51$ii$, 52$ii$. The fourth interlocking profile 54$ii$ may be located on the first exposed major surface 11$ii$ of the middle building panel 10$ii$ and intersect the first and second interlocking profiles 51$ii$, 52$ii$.

The first interlocking profile 51$ii$ may extend in the same direction as the first side surface of the middle building panel 10$ii$. The second interlocking profile 52$ii$ may extend in the same direction as the second side surface of the middle building panel 10$ii$. The third and fourth interlocking profiles 53$ii$, 54$ii$ may extend in the same direction as the outer surface of the first protective layer 120$ii$ of the shell 100$ii$.

In the exemplified embodiment, the third interlocking profile 53$ii$ may comprises a groove and the second locking feature 420$ii$. In the exemplified embodiment, the fourth interlocking profile 54$ii$ may comprise a groove and the second locking feature 420$ii$. Under this configuration, the third side surfaces 23 of a plurality of vertically oriented building panels 10, each of which comprise the third locking profile 53, may mate with the third and fourth interlocking profiles 53$ii$, 54$ii$ of the middle building panel 10$ii$ to support the ceiling structure 3020 in the enclosure 3000—as demonstrated by FIGS. 25 and 27. Additionally, under this configuration, the first locking feature 410 present on the third interlocking profile 53 of the third side surfaces 23 of the vertically oriented building panels 10 may be interlocked with the second locking features 420$ii$ of the middle building panels 10$ii$.

With each of the middle building panels 10$ii$ spanning horizontally across opposite wall structures 3010, the core structure of the middle building panel 10$ii$ may further comprise one or more reinforcing elements 700. Non-limiting examples of reinforcing elements 700 include metal or composite bars extending longitudinally and having an I-beam, L-beam, or T-beam configuration). The reinforcing elements 700 may extend within the middle building panels 10$ii$ in a direction that is substantially parallel to the longitudinal axis. The reinforcing elements may extend through the foam layer 200$ii$ of the middle building panels 10$ii$.

Referring now to FIGS. 32-35 in particular, the end building panel 10$i$ may comprise a plurality of interlocking profiles 50. Like the middle building panel 10$ii$, the first major exposed surface 11$i$ of the end building panel 10$i$ may also comprise at least one interlocking profile 50. In the exemplified embodiment, the side surface 20 may comprise a first interlocking profile 51$ii$, whereby the first interlocking profile 51$ii$ extends in a direction substantially parallel to the longitudinal axis A-A of the end building panel 10$i$.

In the exemplified embodiment, the first major exposed surface 11$i$ comprises a first interlocking profile 51$i$, a third interlocking profile 53$i$, and a fourth interlocking profile 54$i$. Specifically, the first interlocking profile 51$i$, the third interlocking profile 53$i$, and/or fourth interlocking profile 54$i$ may be located on the first exposed major surface 11$i$ of the end building panel 10$i$ and adjacent to side surfaces 20$ii$. The third interlocking profile 53$i$ and the fourth interlocking profile 54$i$ may be located on opposite sides of the lateral axis B-B of the middle building panel 10$ii$. The first and second interlocking profiles 51$i$, 52$i$ may be located on opposite sides of the longitudinal axis A-A of the end building panel 10$i$. According to this embodiment, the first, third, and/or fourth side surfaces may be formed by the shell 100—such as the second protective layer 130 of the shell 100. The second side surface may be at least partially formed by the foam layer 200.

In particular, the first interlocking profile 51*i* may be located on the second side surface of the end building panel 10*i*, the second interlocking profile 52*ii* may be located on the first exposed major surface 11*i* adjacent to the second side surface, the third interlocking profile 53*i* may be located on the first exposed major surface 11*i* adjacent to the third side surface, and the fourth interlocking profile 54*i* may be located on the first major exposed surface 11*ii* adjacent to the fourth side surface. The third and fourth interlocking profiles 53*i*, 54*i* may intersect the first and second interlocking profiles 51*i*, 52*i*.

The first interlocking profile 51*i* may extend in the same direction as the first side surface of the middle building panel 10*i*. The second interlocking profile 52*ii* may extend in the same direction as the first exposed major surface 11*i* of the middle building panel 10*ii*. The first, third, and fourth interlocking profiles 51*i*, 53*i*, 54*i* may extend in the same direction as the outer surface of the first protective layer 120*i* of the shell 100*i*.

In the exemplified embodiment, the first interlocking profile 51*i* may comprise a groove and the second locking feature 420*i*. In the exemplified embodiment, the third interlocking profile 53*i* may comprises a groove and the second locking feature 420*i*. In the exemplified embodiment, the fourth interlocking profile 54*i* may comprise a groove and the second locking feature 420*i*. Under this configuration, the third side surfaces 23 of a plurality of vertically oriented building panels 10, each of which comprise the third locking profile 53, may mate with the first, third, and fourth interlocking profiles 51*i*, 53*i*, 54*i* of the end building panel 10*i* to support the ceiling structure 3020 in the enclosure 3000. Additionally, under this configuration, the first locking feature 410 present on the third interlocking profile 53 of the third side surfaces 23 of the vertically oriented building panels 10 may be interlocked with the second locking features 420*i* of the end building panels 10*i*.

Although not pictured, the enclosure 3000 may further include a reinforcing structure that is located within the cavity 3900 and adjacent to the second exposed major surface 12*ii* of the building panels. In such embodiments, the reinforcing structure may form a skeleton that supports the vertical and horizontally oriented building panels that form the wall structure 3010 and ceiling structure 3020.

In the exemplified embodiment, the end panels 10*i* may be coupled to the ends of the array of middle building panels 10*ii*, thereby forming a continuous perimeter of locking profile on the lower face 3021 of the ceiling structure 3020 of the enclosure—whereby the continuous perimeter mates with the third side surfaces 53 of the vertically oriented building panels 10 to form the enclosure 3000.

Figure 30:
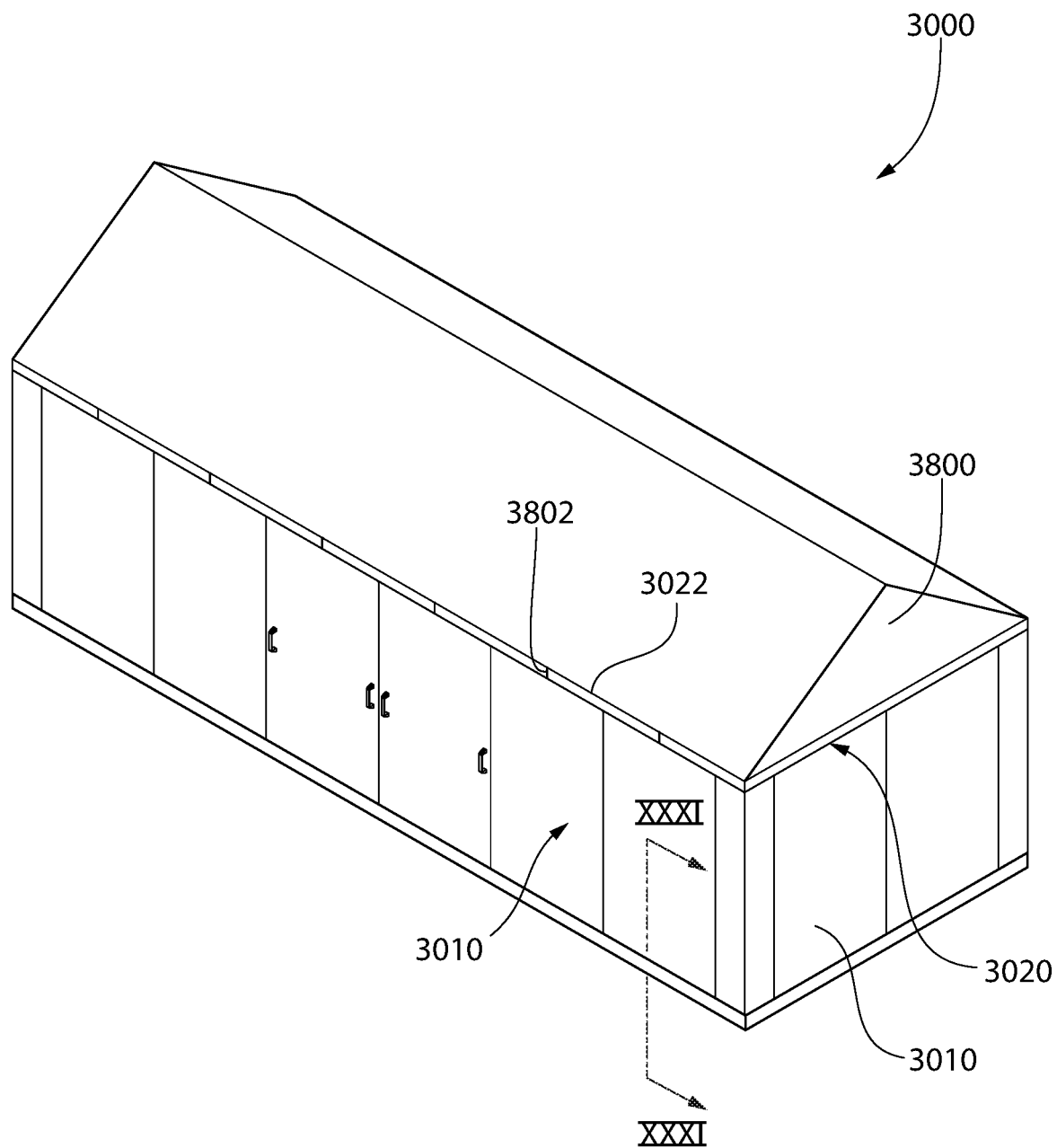
FIG. 30 is a top perspective view of an acoustic enclosure of FIG. 29.

Referring now to FIGS. 29 and 30, the enclosure 3000 of the present invention may further comprise a roof structure 3800. The roof structure 3800 may comprise a downward facing surface 3802 and an upward facing surface 3801. The roof structure 3800 may be configured to be placed atop the ceiling structure 3020, thereby at least partially masking the upper face 3022 of the ceiling structure 3020. Specifically, the roof structure may comprise a downward facing surface 3802 and an upward facing surface 3801, whereby in the installed state the downward facing surface 3802 of the roof structure 3800 faces the upper face 3022 of the ceiling structure 3020. The roof structure 3800 may be secured to the ceiling structure 3020 by suitable fastener.

The roof structure 3800 may be formed from a single continuous body or a combination of panels coupled together to from a single structure. The roof structure 3800 may be configured to have a sloped upward facing surface 3801, thereby providing a surface that redirects rain water, snow, and other natural phenomena from resting atop the upward facing surface 3801. Although not pictured, the roof structure 3800 may further comprise an overhang that extends beyond the second exposed major surface 12 of the vertical building panels 10. The overhang may also extend outward beyond the U-channel 3500. The roof structure 3800 also protects one or more seams that may exist between adjacent ones of the building panels 10*i*, 10*ii* that form the ceiling structure 3020.

Figure 44A:
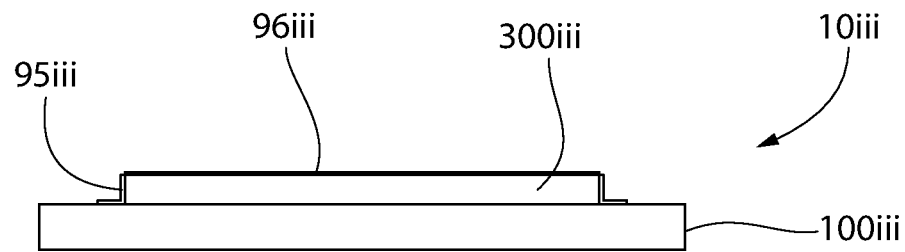
FIG. 44A is side view of the acoustic structural panel according to FIG. 41.
Figure 44B:
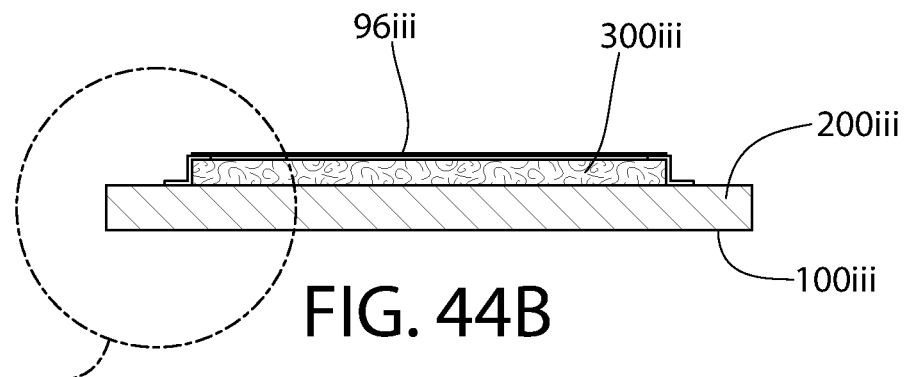
FIG. 44B is cross-sectional view the acoustic structural panel according to FIG. 43 along line XLIVB-XLIVB.
Figure 44C:
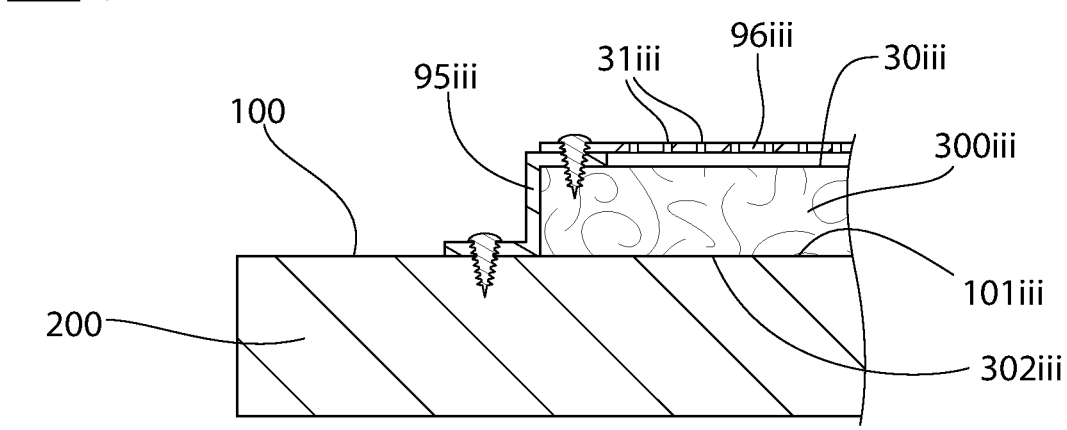
FIG. 44C is close-up cross-sectional view of region XLIVC of FIG. 44B.
Figure 45:
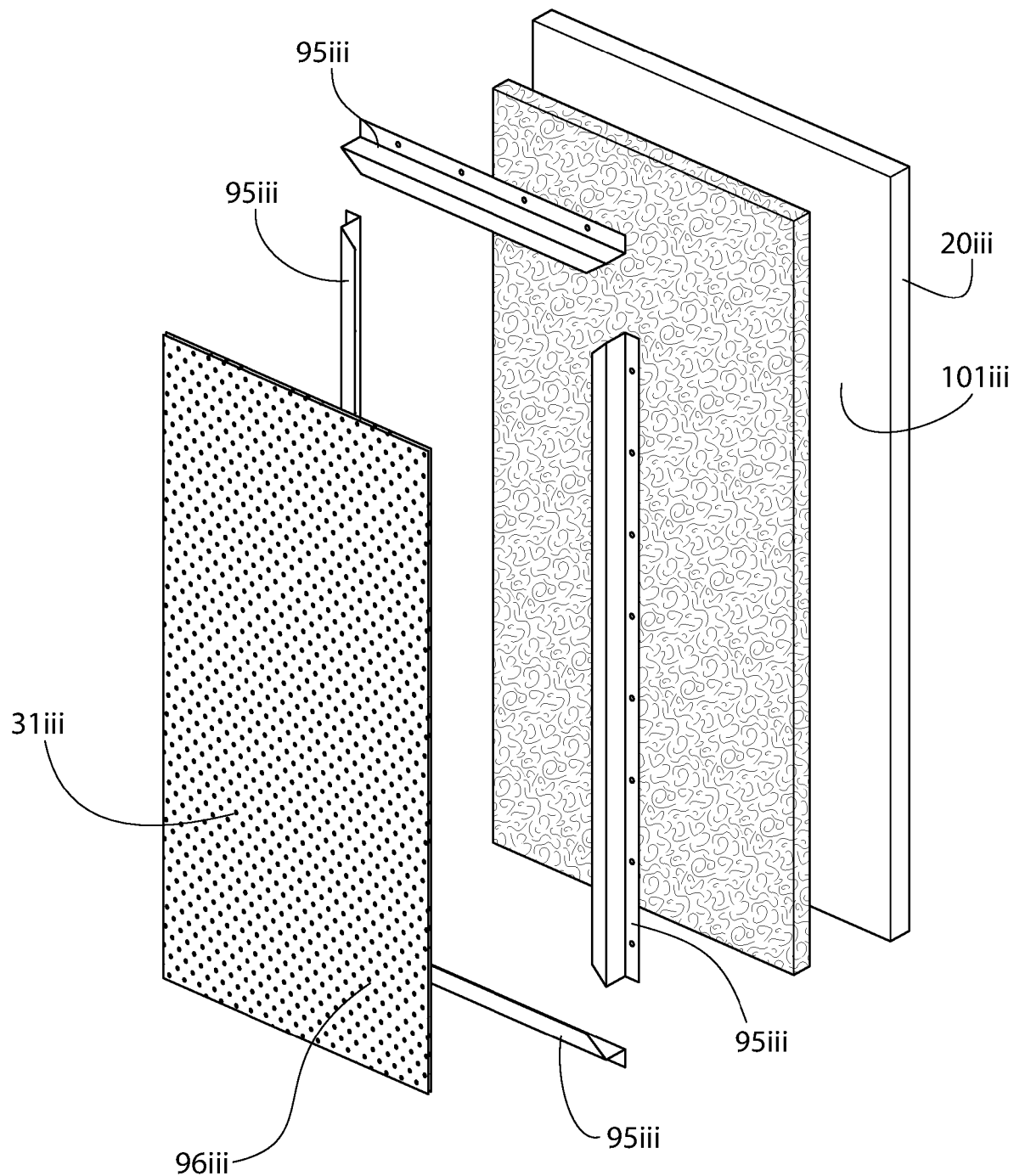
FIG. 45 is perspective exploded view the acoustic structural panel according to FIG. 41.

Referring now to FIGS. 44-45, the present invention further provides a building panel 10*iii* according to another embodiment of the present invention. The building panels 10*iii* are similar to the building panel 10 except as described herein below. The description of the building panel 10 above generally applies to the building panels 10*iii* described below except with regard to the differences specifically noted below. A similar numbering scheme will be used for the building panels 10*iii* as with the building panel 10 except that the (iii) suffix will be used.

Figure 42:
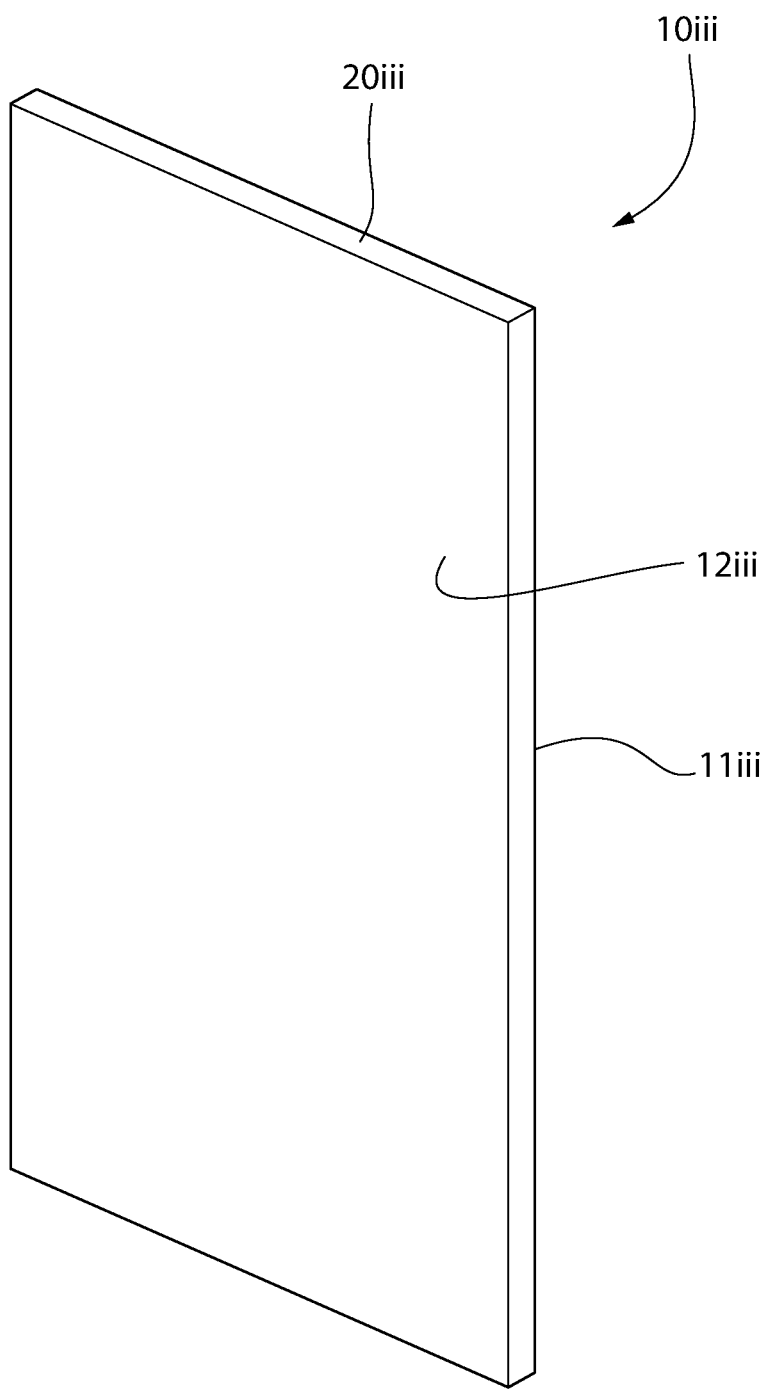
FIG. 42 is rear view of the acoustic structural panel according to FIG. 41.
Figure 43:
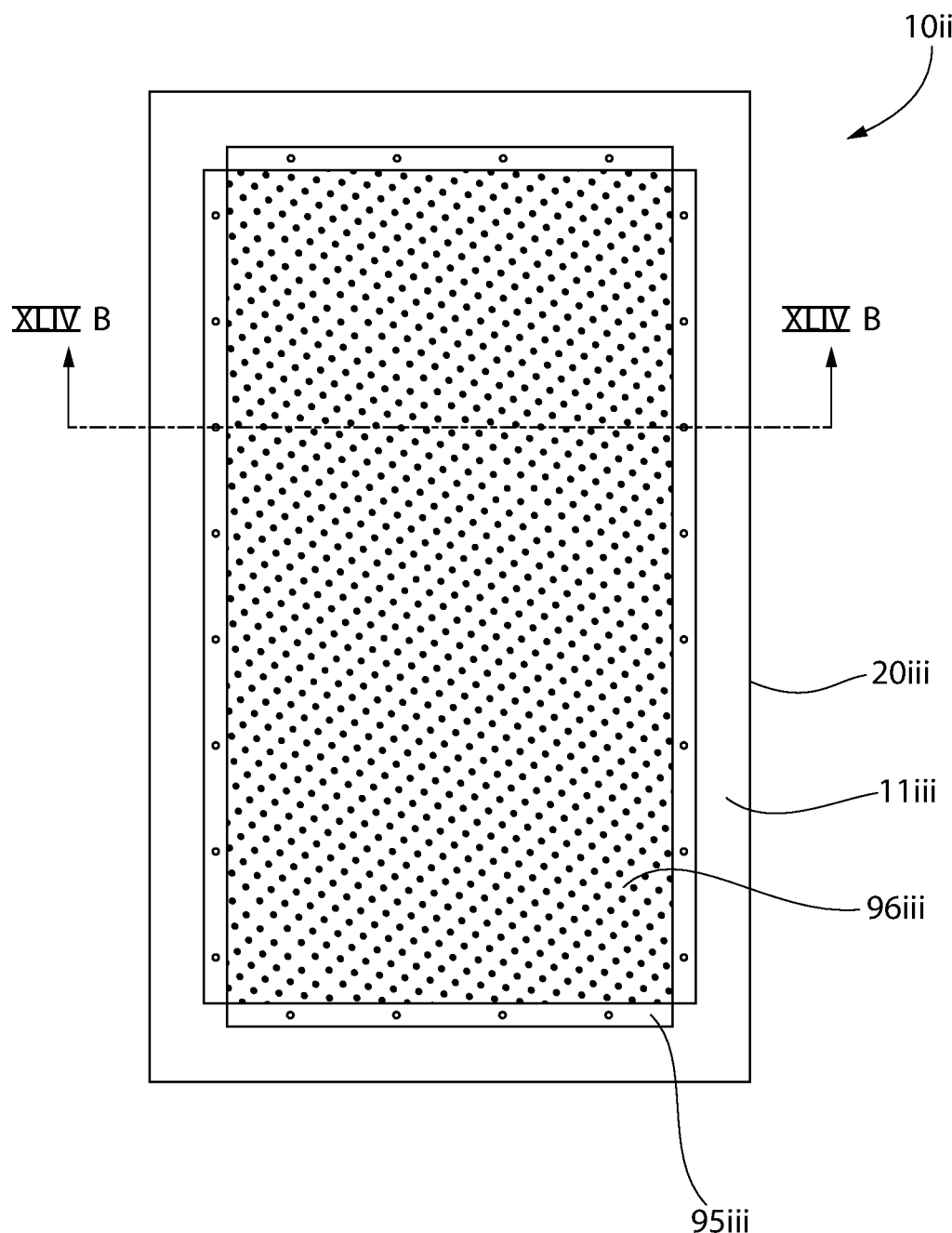
FIG. 43 is front view of the acoustic structural panel according to FIG. 41.

According to this embodiment of the present invention, the building panel 10*iii* comprises a shell 100*iii* and a core structure comprising only the foam layer 200*iii*. Stated otherwise, the core structure of this embodiment does not include a fibrous layer. Rather, the fibrous layer 300*iii* may be positioned external the shell 100*iii*. Specifically, the second major surfaces 302*iii* of the fibrous layer may face the outer surface 101*iii* of the shell 100*iii*. Furthermore, as demonstrated by FIGS. 42 and 45, the shell 100*iii* comprises a first and second major surface that substantially free of perforations.

The fibrous layer 300*iii* may be fixed within the building panel 10*iii* of this embodiment by a combination of a z-trim profile 95*iii* and a perforated sheet 96*iii*. The perforated sheet 96*iii* may be the same that makes up the central region 180 of the previous embodiments. Specifically, the perforated sheet 96*iii* may comprise a plurality of vent apertures 31*iii* that form a vented portion 30*iii* of the building panel. The perforated sheet 96*iii* may be placed into direct contact with the first major surface 301*iii* of the fibrous layer, whereby the perforated sheet 96*iii* is fixed to the shell 100*iii* by the z-trim profile 95*iii* and one or more fasteners.

Under this configuration, a standard non-acoustic panel comprising only the shell 100*iii* and the foam layer 200*iii* may be retrofitted with the fibrous layer 300, thereby rendering the previously non-acoustic panel to be an acoustic panel having a noise reducing surface 11*iii*.

EXAMPLES

Experiment 1

An acoustic structural panel according to the present invention was prepared according to the following methodology. The shell was formed from aluminum zinc alloy coated sheet steel. The foam layer was formed from closed-celled urethane foam having a foam thickness $t_2$ of about 4 inches. The fibrous layer was formed from mineral wool having a fibrous thickness of about 2 inches. The first major surface of the building panel comprises vent apertures 31 having a diameter of about 125 mils at a frequency covering about 40% of the vented portion 30 of the first major surface.

The resulting building panel had a panel length $L_P$ of about 94 inches, a panel width $W_P$ of about 46 inches, and a panel thickness $t_P$ of about 4 inches. The overall building panel exhibited an area weight of about 2.54 lb/ft² as measured along the first major surface of the building panel.

The building panel was positioned between two rooms: (1) a source room having a total volume of 6,298 ft³ and (2) a receive room having total volume of 4,877 ft³. The first major surface of the building panel was positioned such that it faced the (1) source room which contained a noise source, and the second major surface faced the (2) receive room. The noise source emitted a sound for a period of time, whereby the total loss in sound—as measured in dB loss—as measured between the (1) source room and the (2) receive room. The results are set forth below in Tables 1 and 2.

TABLE 1

| | Freq. (Hz) | | | | | | | | | | | | | | | | | |
|---|---|---|---|---|---|---|---|---|---|---|---|---|---|---|---|---|---|---|
| | 100 | 125 | 160 | 200 | 250 | 315 | 400 | 500 | 630 | 800 | 1k | 1.25k | 1.6k | 2k | 2.5k | 3.15k | 4k | 5k |
| T.L. (dB) | 23 | 19 | 19 | 18 | 19 | 21 | 23 | 26 | 27 | 30 | 34 | 37 | 35 | 34 | 44 | 52 | 57 | 57 |

As demonstrated by Table 1, the building panel performed exceptionally well with respect to reducing sound in common frequency ranges—which indicate that the building panel of the present invention would be suitable in a variety of applications that require sound-deadening performance.

TABLE 2

| | Freq. (Hz) | | | | | | | | |
|---|---|---|---|---|---|---|---|---|---|
| | 32 | 40 | 50 | 63 | 80 | 6.3k | 8k | 10k | 12.5k |
| T.L. (dB) | 13 | 18 | 12 | 12 | 14 | 59 | 61 | 59 | 53 |

Additionally, as demonstrated by Table 2, the building panel also performed exceptionally well as particularly high frequencies as well adequately at low frequencies, which indicate the building panel may also be suitable of for non-traditional sound-deadening applications that relate to extreme high and/or low frequency noise generation.

Experiment 2

A second experiment was prepared using two acoustic structural panels according to the present invention. Each building panel included a shell that was formed from aluminum zinc alloy coated sheet steel. The foam layer was formed from closed-celled urethane foam having a foam thickness $t_2$ of about 4 inches. The fibrous layer was formed from mineral wool having a fibrous thickness of about 2 inches. The first major surface of the building panel comprises vents 31 having a diameter of about 125 mils at a frequency covering about 40% of the vented portion 30 of the first major surface.

Each building panel had a panel length $L_P$ of about 94 inches, a panel width $W_P$ of about 46 inches, and a panel thickness $t_P$ of about 4 inches. Each building panel exhibited an area weight of about 2.52 lb/ft² as measured along the first major surface of the building panel. The two building panels were placed adjacent to each other, whereby the locking feature of each side surface was placed into a locked state. The resulting wall formed from the combination of building panels had a wall length of about 94 inches, a wall width of about 93 inches, and a panel thickness $t_P$ of about 4 inches.

The wall formed from the combination of building panels was positioned in a room environment having a total volume of 10,311 ft³ whereby the front major surface 2 of the wall faced the room environment which contained a noise source. The noise source emitted a sound for a period of time, whereby the NRC performance of the wall was measured. The wall exhibits an NRC performance of 0.90.

What is claimed is:

1. An acoustic structural panel having a first exposed major surface opposite a second exposed major surface and side surfaces extending between the first and second exposed major surfaces, the acoustic structural panel comprising:

a first protective layer comprising at least a portion of the first exposed major surface, the first protective layer has an inner surface opposite an outer surface;

a second protective layer comprising at least a portion of the second exposed surface;

a core structure located between the first and second protective layers, the core structure comprising:

a foam body having a first major surface opposite a second major surface, side surfaces extending between the first and second major surfaces of the foam body, and a depression formed into the first major surface into the foam body and extends to a depression floor that is located between the first and second major surfaces of the foam body, and wherein the depression is circumscribed by an upstanding wall that extends from the depression floor and intersects the first major surface of the foam body; and a fibrous body located in the depression of the foam body, the fibrous body comprises a first major surface opposite a second major surface and a side surface extending between the first and second major surfaces of the fibrous body, the first major surface of the fibrous body facing the inner surface of the first protective layer and the second major surface of the fibrous body facing the depression floor of the foam body; and wherein the first major surface of the fibrous body and the first major surface of the foam body face the same direction, and wherein the side surface of the fibrous body faces the upstanding wall of the foam body; and wherein the first major exposed surface of the acoustic structural panel comprises a plurality of apertures exposing the fibrous body, the plurality of apertures extending continuously from the inner surface to the outer surface of the first protective layer.

2. The acoustic structural panel according to claim 1, wherein fibrous body is located adjacent to the plurality of apertures.

3. The acoustic structural panel according to claim 1, wherein the first protective layer has an inner surface opposite an outer surface, and wherein the apertures extend continuously from the inner surface to the outer surface of the first protective layer.

4. The acoustic structural panel according to claim 1, wherein the second protective layer comprises an inner surface opposite an outer surface, the inner surface of the second protective layer facing the second major surface of the foam body, wherein the outer surface of the second protective layer forms at least a portion of the second exposed surface of the acoustic structural panel, and wherein the second protective layer is non-perforated and substantially free of open apertures.

5. The acoustic structural panel according to claim 1, wherein the foam body is a close-celled urethane foam.

6. The acoustic structural panel according to claim 1, wherein the fibrous body comprise inorganic fiber selected from mineral wool, rock wool, stone wool, glass fibers, and combinations thereof.

7. The acoustic structural panel according to claim 1, wherein the fibrous body exhibits an NRC value as measured between the first and second major surfaces that ranges from about 0.5 to about 0.95.

8. The acoustic structural panel according to claim 1, wherein the side surfaces comprise a first side surface opposite a second side surface, the first side surface comprises a first interlocking profile and the second side surface comprises a second interlocking profile, the first interlocking profile being complimentary to the second interlocking profile.

9. The acoustic structural panel according to claim 8, wherein the first interlocking profile is a groove and the second interlocking profile is a tongue.

10. The acoustic structural panel according to claim 8, wherein each of the first interlocking profile and the second interlocking profile are at least partially formed by the core structure.

11. The acoustic structural panel according to claim 8, wherein the first side surface comprises a first locking element and the second side surface comprises a second locking element, the first and second locking elements being configured to interlock together.

12. The acoustic structural panel according to claim 11, wherein the first locking element comprises a pin located within a first housing and the second locking element comprises a rotatable latch located within a second housing.

13. The acoustic structural panel according to claim 12, wherein the first housing is located inset from the first side surface and the second housing is located inset of the second side surface.

14. The acoustic structural panel according to claim 12, wherein the second locking element is convertible from an unlocked-state to a locked-state, whereby in the locked-state a hook portion of the latch protrudes beyond the second side surface.

15. The acoustic structural panel according to claim 1, wherein a first thickness is measured between the first major surface and the second major surface of the foam body, and a second thickness is measured between the first major surface of the foam body and the depression floor, wherein a ratio of the second thickness and the first thickness ranges from about 0.2:1 to about 0.9:1.

16. The acoustic structural panel according to claim 15, wherein a third thickness is measured between the second major surface of the foam body and the depression floor, the third thickness ranging from about 0.5 inches to about 3.5 inches.

17. An acoustic structural panel having a first exposed major surface opposite a second exposed major surface and side surfaces extending between the first and second exposed major surfaces, the acoustic structural panel comprising:
 a first protective layer comprising at least a portion of the first exposed major surface;
 a second protective layer comprising at least a portion of the second exposed surface;
 a core structure located between the first and second protective layers, the core structure comprising
  a first body having a first major surface opposite a second major surface, whereby the first body does not allow for airflow between the first and second major surfaces of the first body under normal atmospheric conditions; and
  a second body having a first major surface opposite a second major surface, whereby the second body allows for airflow between the first and second major surfaces of the second body under normal atmospheric conditions;
 wherein the first major exposed surface of the acoustic structural panel comprises a plurality of apertures adjacent to the second body;
 wherein the first major surface of the second body is adjacent to the first protective layer, and the second body is offset from the second protective layer by a portion of the first body having a thickness ranging from about 0.5 inches to about 3.5 inches.

18. The acoustic structural panel according to claim 17, wherein the second body comprises inorganic fiber.

19. The acoustic structural panel according to claim 17, wherein the second body exhibits and NRC value of at least 0.5 as measured between the first and second major surfaces of the second body.

20. An acoustic structural panel having a first exposed major surface opposite a second exposed major surface and side surfaces extending between the first and second exposed major surfaces, the acoustic structural panel comprising:
 a first protective layer comprising at least a portion of the first exposed major surface;
 a second protective layer comprising at least a portion of the second exposed surface;
 a core structure located between the first and second protective layers, the core structure comprising:
  a foam body comprising:
   a first major surface opposite a second major surface;
   a first thickness as measured between the first major surface and the second major surface of the foam body;
   a depression formed into the first major surface into the foam body and extending to a depression floor that is located between the first and second major surfaces of the foam body;
   a second thickness as measured between the first major surface of the foam body and the depression floor;
   wherein a ratio between the second thickness and the first thickness ranges from about 0.2:1 to about 0.9:1; and
  a fibrous body located in the depression of the foam body, the fibrous body comprises a first major surface opposite a second major surface, the first major surface of the fibrous body facing the first protective layer and the second major surface of the fibrous body facing the depression floor of the foam body; and wherein the first major exposed surface of the acoustic structural panel comprises a plurality of apertures exposing the fibrous body.

\* \* \* \* \*